(12) United States Patent
Lo

(10) Patent No.: US 8,457,409 B2
(45) Date of Patent: Jun. 4, 2013

(54) CORTEX-LIKE LEARNING MACHINE FOR TEMPORAL AND HIERARCHICAL PATTERN RECOGNITION

(76) Inventor: James Ting-Ho Lo, Ellicott City, MD (US)

( * ) Notice: Subject to any disclaimer, the term of this patent is extended or adjusted under 35 U.S.C. 154(b) by 912 days.

(21) Appl. No.: 12/471,341

(22) Filed: May 22, 2009

(65) Prior Publication Data

US 2009/0290800 A1 Nov. 26, 2009

Related U.S. Application Data

(60) Provisional application No. 61/128,499, filed on May 22, 2008.

(51) Int. Cl.
*G06K 9/46* (2006.01)
*G06K 9/62* (2006.01)
*G06E 1/00* (2006.01)

(52) U.S. Cl.
USPC .............. 382/190; 382/159; 382/228; 706/20

(58) Field of Classification Search
USPC .................................. 382/197, 190, 159, 228
See application file for complete search history.

(56) References Cited

U.S. PATENT DOCUMENTS

| | | | |
|---|---|---|---|
| 6,226,408 B1 * | 5/2001 | Sirosh | 382/224 |
| 6,778,701 B1 * | 8/2004 | Okajima | 382/190 |
| 2003/0194113 A1 * | 10/2003 | Yamaguchi et al. | 382/118 |
| 2010/0202669 A1 * | 8/2010 | Hollingsworth et al. | 382/117 |

OTHER PUBLICATIONS

Nandy et al, Generalized Feature Extraction Using Expansion Matching, IEEE Transactions on image Processing, col. 8, No. 1, Jan. 1999, pp. 22-32.*
Kumar et al, Best Bases Fature Extraction Algorithms for classification of Hyperspectral data, IEEE Transations on Geoscience and remote sensing, col. 39, No. 7, Jul. 2000, pp. 1368-1379.*

* cited by examiner

*Primary Examiner* — Kathleen Y Dulaney

(57) ABSTRACT

A cortex-like learning machine, called a probabilistic associative memory (PAM), is disclosed for recognizing spatial and temporal patterns. A PAM is usually a multilayer or recurrent network of processing units (PUs). Each PU expands subvectors of a feature vector input to the PU into orthogonal vectors, and generates a probability distribution of the label of said feature vector, using expansion correlation matrices, which can be adjusted in supervised or unsupervised learning by a Hebbian-type rule. The PU also converts the probability distribution into a ternary vector to be included in feature subvectors that are input to PUs in the same or other layers. A masking matrix in each PU eliminates effect of corrupted components in query feature subvectors and enables maximal generalization by said PU and thereby that by the PAM. PAMs with proper learning can recognize rotated, translated and scaled patterns and are functional models of the cortex.

39 Claims, 38 Drawing Sheets

---

Augmentation Correlation Matrices (ACMs) on a subvector $\mathbf{n}(u)$ of an FSI (feature subvector index) $\mathbf{n}$ $$D(\mathbf{n}(u)) := \Lambda \sum_{t=1}^{T} W_t(\mathbf{n}(u), T) r_t(\mathbf{n}) \breve{x}_t'(\mathbf{n}(u))$$

$$C(\mathbf{n}(u)) := \Lambda \sum_{t=1}^{T} W_t(\mathbf{n}(u), T) \mathbf{I} \breve{x}_t'(\mathbf{n}(u))$$

where $r_t(\mathbf{n}) \neq 0$, $t = 1, \ldots, T$.

Note $\mathbf{I} := \begin{bmatrix} 1 & 1 & \cdots & 1 \end{bmatrix}'$.

6a

Augmentation Correlation Matrices (ACMs) on a subvector $\mathbf{n}(u)$ of an FSI (feature subvector index) $\mathbf{n}$ $$D(\mathbf{n}(u)) := \Lambda \sum_{t=1}^{T} W_t(\mathbf{n}(u), T) r_t(\mathbf{n}) \breve{x}_t'(\mathbf{n}(u))$$

$$C(\mathbf{n}(u)) := \Lambda \sum_{t=1}^{T} W_t(\mathbf{n}(u), T) \mathbf{I} \breve{x}_t'(\mathbf{n}(u))$$

where $r_t(\mathbf{n}) \neq 0$, $t = 1, \ldots, T$.

Note $\mathbf{I} := [1 \ 1 \ \cdots \ 1]'$.

Universal Masking Matrix $M(\mathbf{n}(u))$ on a subvector $\mathbf{n}(u)$ of an FSI (feature subvector index) $\mathbf{n}$ $$M(\mathbf{n}(u)) = I + \sum_{j=1}^{J(\mathbf{n}(u))} \sum_{i_j=j}^{\dim \mathbf{n}(u)} \sum_{i_{j-1}=j-1}^{i_j-1} \cdots \sum_{i_2=2}^{i_3-1} \sum_{i_1=1}^{i_2-1} 2^{-8j} 2^j \operatorname{diag}(\tilde{\mathbf{I}}(i_1^-, i_2^-, \ldots, i_j^-))$$

Note $\mathbf{I} := [1 \ 1 \ \cdots \ 1]'$, $I = \operatorname{diag} \mathbf{I}$ $M = M(\mathbf{n}(u))$ for abbreviation $M\tilde{x}_\tau(\mathbf{n}(u))$ eliminates effect of the "corrupted" components of $x_\tau(\mathbf{n}(u))$ and enables generalization on other components.

FIG. 7

General Orthogonal Augmentation (GOA) of a Feature Subvector $x_t(\mathbf{n})$ and General ACMs (GACMs) on an FSI (feature subvector index) $\mathbf{n}$ with subvectors $\mathbf{n}(1),\ldots,\mathbf{n}(U)$ $\breve{x}'_t(\mathbf{n}) := [\breve{x}'_t(\mathbf{n}(1)) \quad \breve{x}'_t(\mathbf{n}(2)) \quad \cdots \quad \breve{x}'_t(\mathbf{n}(U))]$ $C(\mathbf{n}(u)) = \Lambda \sum_{t=1}^{T} W_t(\mathbf{n}(u), T) \mathbf{I} \breve{x}'_t(\mathbf{n}(u)), \quad u = 1,\ldots,U$ $D(\mathbf{n}(u)) = \Lambda \sum_{t=1}^{T} W_t(\mathbf{n}(u), T) r_t(\mathbf{n}) \breve{x}'_t(\mathbf{n}(u)), \quad u = 1,\ldots,U$ $C(\mathbf{n}) = [C(\mathbf{n}(1)) \quad C(\mathbf{n}(2)) \quad \cdots \quad C(\mathbf{n}(U))]$
$D(\mathbf{n}) = [D(\mathbf{n}(1)) \quad D(\mathbf{n}(2)) \quad \cdots \quad D(\mathbf{n}(U))]$ where $r_t(\mathbf{n}) \neq 0$. Note $\mathbf{I} := [1 \quad 1 \quad \cdots \quad 1]'$

FIG. 8

General Universal Masking Matrix $M(\mathbf{n})$
on an FSI $\mathbf{n}$ with subvectors $\mathbf{n}(1), \mathbf{n}(2), \ldots, \mathbf{n}(U)$ $$M(\mathbf{n}(u)) = I + \sum_{j=1}^{J(\mathbf{n}(u))} \sum_{i_j=j}^{\dim \mathbf{n}(u)} \sum_{i_{j-1}=j-1}^{i_j-1} \cdots \sum_{i_2=2}^{i_3-1} \sum_{i_1=1}^{i_2-1} 2^{-8j} 2^j \operatorname{diag}(\widetilde{\mathbf{I}}(i_1^-, i_2^-, \ldots, i_j^-))$$

$M(\mathbf{n}) = \operatorname{diag}[M(\mathbf{n}(1)) \quad M(\mathbf{n}(2)) \quad \cdots \quad M(\mathbf{n}(U))]$ Note $\mathbf{I} := [1 \ 1 \ \cdots \ 1]'$, $I = \operatorname{diag} \mathbf{I}$ $M = M(\mathbf{n})$ for abbreviation $M\widetilde{x}_\tau(\mathbf{n})$ eliminates the effect of the "corrupted" components of $x_\tau(\mathbf{n})$ and enables generalization on other components.

$y_\tau(\mathbf{n}) \rightarrow$

Conversion

For $k = 1, \ldots, R$, let $p_{\tau k}(\mathbf{n}) = (y_{\tau k}(\mathbf{n}) + 1)/2$
and generate a pseudo-random number $x\{y_{\tau k}(\mathbf{n})\}$
with the probability distribution:
$P\{x\{y_{\tau k}(\mathbf{n})\} = 1\} = p_{\tau k}(\mathbf{n})$
$P\{x\{y_{\tau k}(\mathbf{n})\} = -1\} = 1 - p_{\tau k}(\mathbf{n})$
end (For).
$x\{y_\tau(\mathbf{n})\} = [x\{y_{\tau 1}(\mathbf{n})\} \ x\{y_{\tau 2}(\mathbf{n})\} \ \ldots \ x\{y_{\tau R}(\mathbf{n})\}]'$ $\rightarrow x\{y_\tau(\mathbf{n})\}$ 13a

FIG. 11

$y_\tau(\mathbf{n})$ →

Conversion

For $k = 1, \ldots, R$, if $-1/8 \leq y_{\tau k}(\mathbf{n}) \leq 1/8$, then let $x\{y_{\tau k}(\mathbf{n})\} = [0 \quad 0 \quad 0]^t$ elseif $-1 \leq y_{\tau k}(\mathbf{n}) < -1+1/8$, then let $x\{y_{\tau k}(\mathbf{n})\} = [-1 \quad -1 \quad -1]^t$ elseif $-1+1/8 \leq y_{\tau k}(\mathbf{n}) < -1+3/8$, then let $x\{y_{\tau k}(\mathbf{n})\} = [-1 \quad -1 \quad 1]^t$ elseif $-1+3/8 \leq y_{\tau k}(\mathbf{n}) < -1+5/8$, then let $x\{y_{\tau k}(\mathbf{n})\} = [-1 \quad 1 \quad -1]^t$ elseif $-1+5/8 \leq y_{\tau k}(\mathbf{n}) < -1+7/8$, then let $x\{y_{\tau k}(\mathbf{n})\} = [-1 \quad 1 \quad 1]^t$ elseif $1 \geq y_{\tau k}(\mathbf{n}) > 1-1/8$, then let $x\{y_{\tau k}(\mathbf{n})\} = [1 \quad 1 \quad 1]^t$ elseif $1-1/8 \geq y_{\tau k}(\mathbf{n}) > 1-3/8$, then let $x\{y_{\tau k}(\mathbf{n})\} = [1 \quad 1 \quad -1]^t$ elseif $1-3/8 \geq y_{\tau k}(\mathbf{n}) > 1-5/8$, then let $x\{y_{\tau k}(\mathbf{n})\} = [1 \quad -1 \quad 1]^t$ elseif $1-5/8 \geq y_{\tau k}(\mathbf{n}) > 1-7/8$, then let $x\{y_{\tau k}(\mathbf{n})\} = [1 \quad -1 \quad -1]^t$ end (For).

Let $x\{y_\tau(\mathbf{n})\} = [x'\{y_{\tau 1}(\mathbf{n})\} \quad x'\{y_{\tau 2}(\mathbf{n})\} \quad \ldots \quad x'\{y_{\tau R}(\mathbf{n})\}]^t$.

→ $x\{y_\tau(\mathbf{n})\}$

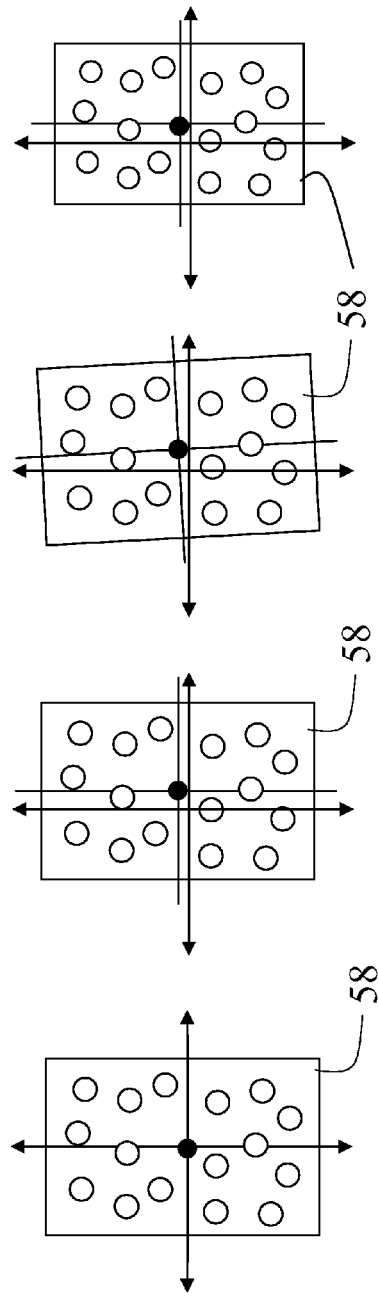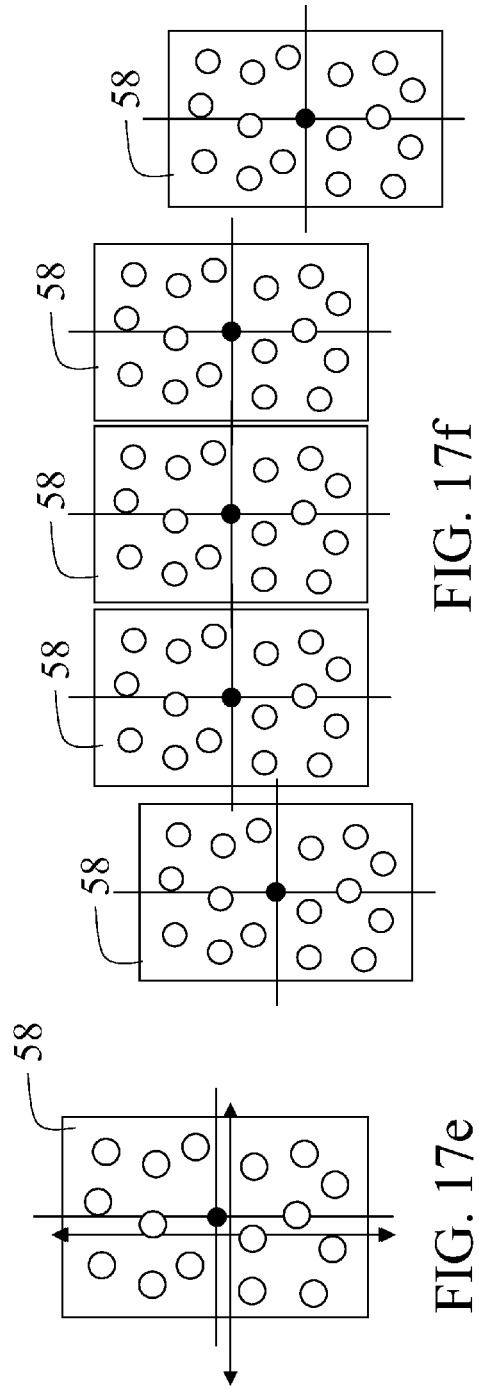

Augmentation Correlation Matrices (ACMs) on an RTS suite $\Omega(\mathbf{n}(u))$ of a subvector $\mathbf{n}(u)$ of an FSI $\mathbf{n}$ $$D(\mathbf{n}(u)) = \Lambda \sum_{t=1}^{T} W_t(\mathbf{n}(u), T) r_t(\mathbf{n}) \sum_{\omega \in \Omega(\mathbf{n})} \tilde{x}_t'(\mathbf{n}(u, \omega))$$

$$C(\mathbf{n}(u)) = \Lambda \sum_{t=1}^{T} W_t(\mathbf{n}(u), T) \mathbf{I} \sum_{\omega \in \Omega(\mathbf{n})} \tilde{x}_t'(\mathbf{n}(u, \omega))$$

where $r_t(\mathbf{n}) \neq 0$. Note $\mathbf{I} := \begin{bmatrix} 1 & 1 & \cdots & 1 \end{bmatrix}'$

FIG. 19

General Orthogonal Augmentation and General ACMs
on an RTS suite $\Omega(\mathbf{n})$ of an FSI $\mathbf{n}$ $$\tilde{x}_t{'}(\mathbf{n},\Omega) = \left[ \sum_{\omega \in \Omega(\mathbf{n})} \tilde{x}_t{'}(\mathbf{n}(1,\omega)) \quad \sum_{\omega \in \Omega(\mathbf{n})} \tilde{x}_t{'}(\mathbf{n}(2,\omega)) \quad \cdots \quad \sum_{\omega \in \Omega(\mathbf{n})} \tilde{x}_t{'}(\mathbf{n}(U,\omega)) \right]$$

$$C(\mathbf{n}(u)) = \Lambda \sum_{t=1}^{T} W_t(\mathbf{n}(u),T) \mathbf{I} \sum_{\omega \in \Omega(\mathbf{n})} \tilde{x}_t{'}(\mathbf{n}(u,\omega)), \; u=1,\ldots,U$$

$$D(\mathbf{n}(u)) = \Lambda \sum_{t=1}^{T} W_t(\mathbf{n}(u),T) r_t(\mathbf{n}) \sum_{\omega \in \Omega(\mathbf{n})} \tilde{x}_t{'}(\mathbf{n}(u,\omega)), \; u=1,\ldots,U$$

$$C(\mathbf{n}) = [C(\mathbf{n}(1)) \quad C(\mathbf{n}(2)) \quad \cdots \quad C(\mathbf{n}(U))]$$
$$D(\mathbf{n}) = [D(\mathbf{n}(1)) \quad D(\mathbf{n}(2)) \quad \cdots \quad D(\mathbf{n}(U))]$$

where $r_t(\mathbf{n}) \neq 0$. Note $\mathbf{I} := [1 \quad 1 \quad \cdots \quad 1]'$ 8b

FIG. 22

General Orthogonal Augmentation $\tilde{x}_t^{l-1}(\mathbf{n}^l)$ and
Common General ACMs on all RTS suites $\Omega(\mathbf{n}^l)$ in layer $l$
(Assume all FSIs $\mathbf{n}^l$ are translations of one another, and
all their subvectors $\mathbf{n}^l(u)$ have the same dimensionality.)

$$\tilde{x}_t^{l-1\prime}(\mathbf{n}) := \left[ \tilde{x}_t^{l-1\prime}(\mathbf{n}^l(1)) \quad \tilde{x}_t^{l-1\prime}(\mathbf{n}^l(2)) \quad \cdots \quad \tilde{x}_t^{l-1\prime}(\mathbf{n}^l(U^l)) \right]$$

$$C^l = \sum_{\mathbf{n}^l=1}^{N^l} C^l(\mathbf{n}^l) = \left[ \sum_{\mathbf{n}^l=1}^{N^l} C^l(\mathbf{n}^l(1)) \quad \sum_{\mathbf{n}^l=1}^{N^l} C^l(\mathbf{n}^l(2)) \quad \cdots \quad \sum_{\mathbf{n}^l=1}^{N^l} C^l(\mathbf{n}^l(U^l)) \right]$$

$$D^l = \sum_{\mathbf{n}^l=1}^{N^l} D^l(\mathbf{n}^l) = \left[ \sum_{\mathbf{n}^l=1}^{N^l} D^l(\mathbf{n}^l(1)) \quad \sum_{\mathbf{n}^l=1}^{N^l} D^l(\mathbf{n}^l(2)) \quad \cdots \quad \sum_{\mathbf{n}^l=1}^{N^l} D^l(\mathbf{n}^l(U^l)) \right]$$

Prob. Distribution Combination

For $i = 1, \ldots, \eta$, set $p_\tau(\mathbf{m}_i) = (1 + y_\tau(\mathbf{m}_i))/2$
and For $k = 1, \ldots R$
   If $c_{\tau k}(\mathbf{m}_i) \neq 0$
      then If $p_{\tau k}(\mathbf{m}_i) > 1-\rho$ or $< \rho$
         then set $\hat{V}_{kii} = (1-\rho)\rho$
         else set $\hat{V}_{kii} = p_{\tau k}(\mathbf{m}_i)(1 - p_{\tau k}(\mathbf{m}_i))$
   else set $p_{\tau k}(\mathbf{m}_i) = 1/2$ and $\hat{V}_{kii} = 10^3 \eta$.

For $k = 1, \ldots R$,
let $p_{\tau k} = [p_{\tau k}(\mathbf{m}_1) \quad p_{\tau k}(\mathbf{m}_2) \quad \ldots \quad p_{\tau k}(\mathbf{m}_\eta)]'$, and
set $\hat{P}_{\tau k} = \left( \sum_{i=1}^{\eta} \hat{V}_{kii}^{-1} \right)^{-1} \sum_{i=1}^{\eta} \hat{V}_{kii}^{-1} p_{\tau k}(\mathbf{m}_i)$ and $s_k^2 = \left( \sum_{i=1}^{\eta} \hat{V}_{kii}^{-1} \right)^{-1}$.

Let $\hat{P}_\tau = [\hat{P}_{\tau 1} \quad \hat{P}_{\tau 2} \quad \ldots \quad \hat{P}_{\tau R}]'$.

FIG. 30

General Orthogonal Augmentations (GOAs) of Feature Subvectors $x_t(\mathbf{n},j)$ & General ACMs (GACMs) on an FSI (feature subvector index) $\mathbf{n}$ with multiple/group adjustment for each exogenous feature vector $x_t^{ex}$ in supervised learning $\breve{x}'_t(\mathbf{n},j) := [\breve{x}'_t(\mathbf{n}(1),j) \quad \breve{x}'_t(\mathbf{n}(2),j) \quad \cdots \quad \breve{x}'_t(\mathbf{n}(U),j)], \; j=1,\ldots,J$ $C(\mathbf{n}(u)) = \Lambda \sum_{t=1}^{T} W_t(\mathbf{n}(u),T) \mathbf{I} \frac{1}{J} \sum_{j=1}^{J} \breve{x}'_t(\mathbf{n}(u),j), \; u=1,\ldots,U$ $D(\mathbf{n}(u)) = \Lambda \sum_{t=1}^{T} W_t(\mathbf{n}(u),T) r_t(\mathbf{n}) \frac{1}{J} \sum_{j=1}^{J} \breve{x}'_t(\mathbf{n}(u),j), \; u=1,\ldots,U$ $C(\mathbf{n}) = [C(\mathbf{n}(1)) \quad C(\mathbf{n}(2)) \quad \cdots \quad C(\mathbf{n}(U))]$
$D(\mathbf{n}) = [D(\mathbf{n}(1)) \quad D(\mathbf{n}(2)) \quad \cdots \quad D(\mathbf{n}(U))]$ where $r_t(\mathbf{n}) \neq 0$. Note $\mathbf{I} := [1 \quad 1 \quad \cdots \quad 1]'$ 8d

FIG. 31

General Orthogonal Augmentations (GOAs) of Feature Subvectors $x_t(\mathbf{n},j)$ & General ACMs (GACMs) on an FSI (feature subvector index) $\mathbf{n}$ with a group adjustment for each exogenous feature vector $x_t^{ex}$ in unsupervised learning $\breve{x}_t'(\mathbf{n},j) := [\breve{x}_t'(\mathbf{n}(1),j) \quad \breve{x}_t'(\mathbf{n}(2),j) \quad \cdots \quad \breve{x}_t'(\mathbf{n}(U),j)], \quad j = 1,\ldots,J$ $C(\mathbf{n}) = \Lambda \sum_{t=1}^{T} W_t(\mathbf{n},T) \mathbf{I} \breve{x}_t'(\mathbf{n},j^*)$ $D(\mathbf{n}) = \Lambda \sum_{t=1}^{T} W_t(\mathbf{n},T) x\{y_t(\mathbf{n},j^*)\} \breve{x}_t'(\mathbf{n},j^*)$ where $j^* = \arg \min_{j \in \{1,\ldots,J\}} \sum_{k=1}^{R} p_{tk}(\mathbf{n},j)(1 - p_{tk}(\mathbf{n},j))$ Note $\mathbf{I} := [1 \quad 1 \quad \cdots \quad 1]'$ and $p_{tk}(\mathbf{n},j) = (y_{tk}(\mathbf{n},j) + 1)/2$.

General Orthogonal Augmentations (GOAs) of Feature Subvectors $x_t(\mathbf{n},j)$ and General ACMs (GACMs) on an RTS suite $\Omega(\mathbf{n})$ of an FSI $\mathbf{n}$ with multiple/group adjustment for each exogenous feature vector $x_t^{ex}$ in supervised learning $$\tilde{x}_t{'}(\mathbf{n},\Omega,j) = \left[ \sum_{\omega \in \Omega(\mathbf{n})} \tilde{x}_t{'}(\mathbf{n}(1,\omega),j) \quad \cdots \quad \sum_{\omega \in \Omega(\mathbf{n})} \tilde{x}_t{'}(\mathbf{n}(U,\omega),j) \right]$$

$$C(\mathbf{n}) = \Lambda \sum_{t=1}^{T} W_t(\mathbf{n},T) \mathbf{I} \frac{1}{J} \sum_{j=1}^{J} \tilde{x}_t{'}(\mathbf{n},\Omega,j)$$

$$D(\mathbf{n}) = \Lambda \sum_{t=1}^{T} W_t(\mathbf{n},T) r_t(\mathbf{n}) \frac{1}{J} \sum_{j=1}^{J} \tilde{x}_t{'}(\mathbf{n},\Omega,j)$$

where $r_t(\mathbf{n}) \neq 0$. Note $\mathbf{I} := [1 \quad 1 \quad \cdots \quad 1]'$ 8f

FIG. 35

General Orthogonal Augmentations (GOAs) of Feature Subvectors $x_t(\mathbf{n},j)$ and General ACMs (GACMs) on an RTS suite $\Omega(\mathbf{n})$ an FSI $\mathbf{n}$ with a group adjustment for each exogenous feature vector $x_t^{ex}$ in unsupervised learning $$\breve{x}_t{'}(\mathbf{n},\Omega,j) = \left[ \sum_{\omega \in \Omega(\mathbf{n})} \breve{x}_t{'}(\mathbf{n}(1,\omega),j) \quad \cdots \quad \sum_{\omega \in \Omega(\mathbf{n})} \breve{x}_t{'}(\mathbf{n}(U,\omega),j) \right]$$

$$C(\mathbf{n}) = \Lambda \sum_{t=1}^{T} W_t(\mathbf{n},T) \mathbf{I} \breve{x}_t{'}(\mathbf{n},\Omega,j_t^*)$$

$$D(\mathbf{n}) = \Lambda \sum_{t=1}^{T} W_t(\mathbf{n},T) r_t(\mathbf{n}) \breve{x}_t{'}(\mathbf{n},\Omega,j_t^*)$$

where $r_t(\mathbf{n}) \neq 0$, $j_t^* = \arg\min_{j \in \{1,\ldots,J\}} \sum_{k=1}^{R} p_{tk}(\mathbf{n},j)(1 - p_{tk}(\mathbf{n},j))$ and $p_{tk}(\mathbf{n},j) = (1 + y_{tk}(\mathbf{n},j))/2$. Note $\mathbf{I} := [1 \quad 1 \quad \cdots \quad 1]'$.

CORTEX-LIKE LEARNING MACHINE FOR TEMPORAL AND HIERARCHICAL PATTERN RECOGNITION

CROSS-REFERENCE TO RELATED APPLICATIONS

This application claims the benefit of provisional patent application Ser. No. 61/128,499, filed 2008 May 22 by the present inventor.

BACKGROUND AND ADVANTAGES OF THE INVENTION

In the terminology of pattern recognition, neural networks and machines learning, a feature vector is a transformation of a measurement vector, whose components are measurements or sensor outputs. This invention is mainly concerned with processing feature vectors and sequences of feature vectors for detecting and recognizing spatial and temporal causes (e.g., objects in images/video, words in speech, and characters in handwriting). This is what pattern recognition, neural networks and machines learning are essentially about. It is also a typical problem in the fields of computer vision, signal processing, system control, telecommunication, and data mining. Example applications that can be formulated as such a problem are handwritten character classification, face recognition, fingerprint identification, DNA sequence identification, speech recognition, machine fault detection, baggage/container examination, video monitoring, text/speech understanding, automatic target recognition, medical diagnosis, prosthesis control, robotic arm control, and vehicle navigation.

A good introduction to the prior art in pattern classification, neural networks and machine learning can be found in Simon Haykin, *Neural Networks and Learning Machines*, Third Edition, Pearson Education, New Jersey, 2009; Christopher M. Bishop, *Pattern Recognition and Machine Learning*, Springer Science, New York, 2006; *Neural Networks for Pattern Recognition*, Oxford University Press, New York, 1995; B. D. Ripley, *Pattern Recognition and Neural Networks*, Cambridge University Press, New York, 1996; S. Theodoridis and K. Koutroumbas, *Pattern Recognition*, Second Edition, Academic Press, New York, 2003; Anil K. Jain, Robert P. W. Duin and Jianchang Mao, "Statistical Pattern Recognition: A Review," in *IEEE Transactions on Pattern Analysis and Machine Intelligence*, Vol. 22, No. 1, January 2000; R. O. Duda, P. E. Hart, and D. G. Stork, *Pattern Classification*, second edition, John Wiley & Sons, New York, 2001; and Bernhard Scholkopf and Alexander J. Smota, *Learning with Kernels*, The MIT Press, Cambridge, Mass., 2002.

Commonly used pattern classifiers include template matching, nearest mean classifiers, subspace methods, 1-nearest neighbor rule, k-nearest neighbor rule, Bayes plug-in, logistic classifiers, Parzen classifiers, Fisher linear discriminants, binary decision trees, multilayer perceptrons, radial basis networks, and support vector machines. They each are suitable for some classification problems. However, in general, they all suffer from some of such shortcomings as difficult training/design, much computation/memory requirement, ad hoc character of the penalty function, or poor generalization/performance. For example, the relatively more powerful multilayer perceptrons and support vector machines are difficult to train, especially if the dimensionality of the feature vectors is large. After training, if new training data is to be learned, the trained multilayer perceptron or support vector machine is usually discarded and new one is trained over again. Its decision boundaries are determined by exemplary patterns from all classes. Furthermore, if there are a great many classes or if there are no or not enough exemplary patterns for some "confuser classes" such as for target and face recognition, training an MLP or SVM either is impractical or incurs a high misclassification rate. Camouflaged targets or occluded faces not included in the training data are known to also cause high misclassification rates.

A pattern classification approach, that is relatively seldom mentioned in the pattern recognition literature, is the correlation matrix memories, or CMMs, which have been studied essentially in the neural networks community (T. Kohonen, *Self-Organization and Associative Memory*, second edition, Springer-Verlag, 1988; R. Hecht-Nielsen, *Neurocomputing*, Addison-Wesley, 1990; Branko Soucek and The Iris Group, *Fuzzy, Holographic, and Parallel Intelligence—The Sixth-Generation Breakthrough*, edited, John Wiley and Sons, 1992; James A. Anderson, *An Introduction to Neural Networks*, The MIT Press, 1995; S. Y. Kung, *Digital Neural Networks*, Pearson Education POD, 1997; D. J. Willshaw, P. P. Buneman and H. C. Longet-Higgins, "Non-holographic associative memory," *Nature*, 222, pp. 960-962, 1969; D. J. Willshaw and H. C. Longet-Higgins, "Associative memory models," *Machine Intelligence*, vol. 5, edited by B. Meltzer & O. Michie, Edinburgh University Press, 1970; K. Nagano, "Association—a model of associative memory," IEEE Transactions on Systems, Man and Cybernetics, vol. SMC-2, pp. 68-70, 1972; G. Palm, "On associative memory," *Biological Cybernetics*, vol. 36, pp. 19-31, 1980; E. Gardner, "The space of interactions in neural network models," Journal of Physics, vol. A21, pp. 257-270, 1988; S. Amari, "Characteristics of sparsely encoded associative memory," *Neural Networks*, vol. 2(6), pp. 451-457, 1989; J. Buckingham and D. Willshaw, "On setting unit thresholds in an incompletely connected associative net," *Network*, vol. 4, pp. 441-459, 1993; M. Turner and J. Austin, "Matching Performance of Binary Correlation Matrix Memories," *Neural Networks*, 1997). The training of CMMs, which are associative memories, is easy and fast even if they have a very high dimensional input. If new training data is to be learned or if the dimensionality of a trained CMM is to be modified, the CMM is not discarded, but can be easily updated or expanded.

Two types of CMM are noteworthy. They are the holographic neural nets (John Sutherland, "Artificial neural device utilizing phase orientation in the complex number domain to encode and decode stimulus response patterns," U.S. Pat. No. 5,214,745, May 25, 1993; John Sutherland, "Neural networks," U.S. Pat. No. 5,515,477, May 7, 1996) and the binary CMMs in the aforementioned papers by Willshaw and Longuet-Higgins (1970), Palm (1980), Gardner (1988), S. Amari (1989), M. Turner and J. Austin (1997), and the references therein.

The main idea of holographic neural nets (HNets) is representing real numbers by phase angle orientations on a complex number plane through the use of a sigmoidal transformation such as a hyperbolic tangent function. After each component of the input stimuli and output responses is converted into a complex number whose phase angle orientation (i.e. argument) represents the component, the correlation matrix is constructed in the standard manner. A holographic neural cell comprises essentially such a correlation matrix. If the dimensionality of the stimulus is large enough, augmented if necessary, and if the phase angle orientations of the stimuli and responses are more or less statistically independent and uniformly distributed on the unit circles in the complex number plane, the "signal part" in the response to an input stimulus is hopefully much greater than the "interference part" in the response to the same input stimulus during its retrieval because of self-destruction of those stored stimuli that are out of phase with said input stimulus like the self-destruction of a random walk on the complex number plane. This idea allows more stimuli to be stored in a complex correlation matrix than does the earlier versions of the correlation matrix.

However, the holographic neural cell approach suffers from the following shortcomings. First, to avoid ambiguity at the point, $(-1, 0)=-1+0i$, in the complex plane, a neighborhood of $(-1, 0)$ must be excluded in the range of the sigmoidal transformation. This prevents the mentioned uniform distribution required for good self-destruction of the interference part. Second, it is not clear how to augment the stimuli without introducing much correlations among the stimuli, which again may reduce self-destruction of the interference part. Third, the argument of a complex number on the unit circle ranges from $-\pi$ to $\pi$. To pack more stimuli on it, better self-destruction of the interference part is needed, which in turn requires a higher dimensionality of the stimuli. Such a higher dimensionality means a higher dimensionality of the correlation matrix, requiring more memory space to hold the matrix.

Binary CMMs have feature vectors encoded either into unipolar binary vectors with components equal to 1 or 0 or into bipolar binary vectors with components equal to 1 or $-1$. Bipolar binary vectors were used in most of the earlier work on binary CMMs. Superiority of sparse unipolar binary encoding (with most of the components of encoded feature vectors being 0 and only a few being 1) to nonsparse unipolar binary encoding and bipolar binary encoding was remarked and proved in the mentioned papers by Willshaw and Longuet-Higgins (1970), Palm (1980), Gardner (1988), and S. Amari (1989). Sparsely encoded CMMs are easy to implement (J. Austin and J. Kennedy, "A hardware implementation of a binary neural network," *MicroNeuro*, IEEE Computer Press, 1994), and have found many applications. Nevertheless, sparsely encoded CMMs have quite a few shortcomings: (a) A large sparse correlation matrix has very low "information density" and takes much memory space. (b) A multistage sparsely encoded CMMs is often necessary. (c) There is no systematic way to determine the dimensionality of the sparse unipolar binary vectors to represent the feature vectors. (d) There is no systematic way to determine the number of stages or the number of neurons in each stage in a multistage sparsely encoded CMM. (e) There is no systematic way to determine whether a sparsely encoded CMM has a minimum misclassification probability for the given CMM architecture. (f) The mapping from the feature vectors to their sparse binary vectors representations must be stored in some memory space, further reducing the overall memory density of the CMM.

Judging from the foregoing shortcomings of the commonly used pattern classifiers, the holographic neural nets, and the sparsely encoded CMMs, there remains a need for alternatives to existing pattern classifiers in the prior art for recognizing patterns.

In this invention disclosure, a cortex-like learning machine, called a probabilistic associative memory (PAM), is disclosed that processes feature vectors or sequence of feature vectors, each feature vector being a ternary feature vector.

A PAM is a network of processing units (PUs). It can be viewed as a new neural network paradigm or a new type of learning machine. Each PU generates a representation of a subjective probability distribution of the label of a feature subvector or a sequence of feature subvectors that are received by the PU. Some PUs convert such representations into ternary vectors, which are included in feature subvectors input to other PUs. Weights in a PU learn an input feature subvector with or without supervision by a Hebb rule of learning. Some advantages of PAMs are the following:

1. As opposed to most of commonly used pattern recognizers, a PAM generalizes not by only a single holistic similarity criterion for the entire input exogenous feature vector, which noise, erasure, distortion and occlusion can easily defeat, but by a large number of similarity criteria for feature subvectors input to a large number of PUs (processing units) in different layers. These criteria contribute individually and collectively to generalization for single and multiple causes. Example 1: smiling; putting on a hat; growing or shaving beard; or wearing a wig can upset a single similarity criterion used for recognizing a face in a mug-shot photograph. However, a face can be recognized by each of a large number of feature subvectors of the face. If one of them is recognized to belong to a certain face, the face is recognized. Example 2: a typical kitchen contains a refrigerator, a counter top, sinks, faucets, stoves, fruit and vegetable on a table, etc. The kitchen is still a kitchen if a couple of items, say the stoves and the table with fruit and vegetable, are removed.

2. Masking matrices in a PU eliminate effects of corrupted ternary components of the feature subvector input to the PU, and thereby enable maximal generalization capability of the PU, and in turn that of the PAM.

3. PAMs are neural networks, but are no more blackboxes with "fully connected" layers much criticized by opponents of such neural networks as multilayer perceptrons (MLPs) and recurrent MLPs, whose weights are iteratively determined through minimizing an error criterion and have no interpretation in the context of their applications. In a PU of a PAM, weights are correlations between orthogonal expansions of subvectors of the PU's input feature subvectors and the labels of these feature subvectors. Each PU has a receptive region in the exogenous feature vector input to the PAM and classifies any cause within the receptive region. Such interpretations can be used to help select the architecture (i.e., layers, PUs, connections, feedback structures, etc.) of a PAM for the application.

4. The weights in each PU of a PAM learn by a Hebb rule and thus the PAM has a "photographic memory." No iterative optimization such as that involved in local-search training methods using backpropagation or backpropagation through time is needed for learning. This allows easy learning of a large number of large exogenous feature vectors in reasonable time as well as easy online adaptive learning.

5. A PU can learn with or without supervision. This allows a PAM to (1) perform unsupervised deep learning in lower layers and supervised learning in higher layers; (2) perform supervised learning when a label is provided from outside the PAM and unsupervised learning when not; and (3) perform autonomous learning.

6. A PAM may have some capability of recognizing rotated, translated and scaled patterns. Moreover, easy learning and retrieving by a PAM allow it to learn translated, rotated and scaled versions of an input image with ease.

7. PUs generate representations of probability distributions of the labels of their input feature subvectors. Such representations of probability distributions of a common label can be combined into a single representation of probability distributions of the common label.

8. PAMs with hierarchical and feedback structures can detect and recognize multiple and hierarchical causes in a spatial or temporal exogenous feature vector.
9. The weight matrices (e.g., expansion correlation matrices) in different PUs can be added to combine the learned knowledge at virtually no additional cost.
10. The architecture of a PAM can be adjusted without discarding learned knowledge in the PAM. This allows enlargement of the feature subvectors, increase of the number of layers, and even increase of feedback connections.
11. Only a small number of algorithmic steps of parallel computing are needed for retrieval, which are suitable for massive parallelization at the bit level and by VLSI implememtation.

SUMMARY

The present invention is embodied in systems, learning machines or methods. In this Section: SUMMARY, embodiments in a system are stated. Replacing the term, "system", in these statements of system embodiments with the term, "learning machine", yields statements of embodiments in a learning machine. It is understood that these statements of embodiments in a learning machine are incorporated in this Section, although they are not explicitly provided.

An objective of the present invention is to provide a system that learns to recognize spatial or temporal patterns or causes.

Another objective of the present invention is to provide a system that can learn and recognize partially erased, smeared, noise-corrupted, covered, distorted, or altered patterns.

Still another objective of the present invention is to provide a system that can perform supervised or unsupervised learning or both.

Still another objective of the present invention is to provide a system whose architecture can be adjusted without discarding already learned knowledge.

Still another objective of the present invention is to provide a system that produces representations of probability distributions of labels of feature vectors and subvectors.

Still another objective of the present invention is to provide a system with a hierarchical structure for recognizing hierarchical causes (or patterns) at different levels such as line segments in a letter, or ears, nose, mouth and eyes on a face, or apples and oranges in baskets on a table.

Still another objective of the present invention is to provide a system with feedback structures for processing sequences of related exogenous feature vectors such as those obtained from examining one single image for a plurality of consecutive time points, images of an object from different angles, consecutive frames in a video or movie, and handwritten letters in a word, words in a sentence, and sentences in a paragraph.

Still another objective of the present invention is to provide a system that can recognize rotated, translated and/or scaled versions of images that have been learned by the system.

Still another objective of the present invention is to provide a system that learns autonomously.

The foregoing objectives, as well as other objectives of the present invention that will become apparent from the discussion below, are achieved by the present invention with the following preferred embodiments.

A first major embodiment of the present invention disclosed herein is a system (or learning machine) for processing feature vectors. Such feature vectors that are input to the system are also called exogenous feature vectors to distinguish them from feature vectors that contain components generated internally by said system. The first major embodiment comprises at least one processing unit that comprises expansion means for generating, in response to a first feature vector input to said processing unit, a first orthogonal expansion of a subvector of said first feature vector, said first orthogonal expansion comprising components of said subvector of said first feature vector and a plurality of products of said components of said subvector of said first feature vector;

at least one first expansion correlation matrix that is a weighted sum of outer products, each being an outer product of a linear combination (or weighted sum) of a vector with components all equal to 1 and a label of a second feature vector input to said processing unit and a second orthogonal expansion of a subvector of said second feature vector, said second orthogonal expansion comprising components of said subvector of said second feature vector and a plurality of products of said components of said subvector of said second feature vector; and estimation means for using at least said at least one first expansion correlation matrix and at least one third orthogonal expansion of a subvector of a third feature vector input to said processing unit, said third orthogonal expansion being generated by said expansion means in response to said third feature vector, to compute a representation of a probability distribution of a label of said third feature vector.

Note that an orthogonal expansion $\check{v}$ of a vector v with m components is displayed in (2). A way to generate $\check{v}$ is to start with $\check{v}(1)=[1\ v_1]'$ and then keep using the recursive formula (I) until $\check{v}=\check{v}(1,\ldots,m)$ is obtained.

Note that said second expansion correlation matrix is a weighted sum of outer products, each being an outer product $(c_1 I+c_2 r_t(n))\check{x}_t'(n(u))$ of a linear combination (or weighted sum) $c_1 I+c_2 r_t(n)$ of a vector $I=[1\ \ldots\ 1]'$ with all components equal to 1 and a label $r_t(n)$ of a feature vector $x_t(n)$ input to said processing unit and an orthogonal expansion $\check{x}_t(n(u))$ of the subvector $x_t(n(u))$ of the feature vector $x_t(n)$, where $t=1,\ldots,T$ for some positive integer T, and $c_1$ and $c_2$ are real-valued weights. Expansion correlation matrices with specific values of $c_1$ and $c_2$ are shown in FIG. 4 and (3), (4), (5) and (6). Note that $p_{r_t}(n)$ is also a representation of the probability distribution.

Note that a label of a feature vector input to a processing unit is defined as follows: A PU in a PAM has a "receptive field" in the exogenous feature vector and a "receptive field" in the measurement vector. These two receptive fields can be found by tracing the feedforward connections in the PAM backforward from a feature vector input to the PU (or the feature subvector index of the PU) to an exogenous feature vector (or the input terminals) of the PAM, and then tracing the transformation, that maps the measurement vector into the exogenous feature vector, backward from the exogenous feature vector to the measurement vector. The components of the measurement vector that can be reached by this backward tracing from a PU to the exogenous feature vector and then to the measurement vector are called the "receptive field" of the PU in the measurement vector. The components of the exogenous feature vector that can be reached by this backward tracing from a PU to the exogenous feature vector are called the "receptive field" of the PU in the exogenous feature vector. The label of a feature vector input to a PU is the label of the corresponding components of measurement vector in the receptive field of the PU in the measurement vector. The label of the corresponding components of the exogenous feature vector in the receptive field of the PU in the exogenous feature vector is also this label.

Note that the weights in said weighted sum of outer products are $\Lambda W_t(n(u), T)$, $t=1, \ldots, T$. If the matrix $W_t(n(u), T)$ is a diagonal matrix with equal entries, then the weights in the weighted sum of outer products are actually scalar weights. Two examples are $W_t(n(u), T)=\lambda^{T-t}I$ and $W_t(n(u), T)=I/\sqrt{T}$. Therefore, the weights in the weighted sum of outer products in the first major embodiment are either matrix weights or scalar weights.

Note that an estimation means for generating a representation $y_\tau(n)$ of a probability distribution $p_\tau(n)$ of the label $r_\tau(n)$ of $x_\tau(n)$ is shown in FIG. 10 and described in Subsection 5.3, "Representations of Probability Distributions".

Another embodiment of the present invention is the first major embodiment, wherein said processing unit further comprises at least one masking matrix that is a sum of an identity matrix and at least one summand masking matrix multiplied by a weight, said summand masking matrix setting certain components of a fourth orthogonal expansion of a subvector of a fourth feature vector input to said processing unit equal to zero, as said masking matrix is multiplied to said fourth orthogonal expansion, said fourth orthogonal expansion comprising components of said subvector of said fourth feature vector and a plurality of products of said components of said subvector of said fourth feature vector, wherein said estimation means also uses said at least one masking matrix in computing a representation of a probability distribution of a label of said third feature vector.

Note that a masking matrix $M(n(u))$ is displayed in FIG. 7 and (26). The masking matrix $M(n(u))$ is a sum of an identity matrx I and $$\sum_{j=1}^{J(n(u))} \sum_{i_j=j}^{dim\, n(u)} \ldots \sum_{i_2=2}^{i_3-1} \sum_{i_1=1}^{i_2-1} 2^{-8j}2^j \mathrm{diag}\left(\tilde{I}(\bar{i_1}, \bar{i_2}, \ldots, \bar{i_j})\right).$$

Because $\mathrm{diag}(\tilde{I}(i_1^-, i_2^-, \ldots, i_j^-))$ appears in a summand $2^{-8j}2^j\mathrm{diag}(\tilde{I}(i_1^-, i_2^-, \ldots, i_j^-))$ in (26) that defines the masking matrix $M(n(u))$, the matrix $\mathrm{diag}(\tilde{I}(i_1^-, i_2^-, \ldots, i_j^-))$ is called a summand masking matrix in $M(n(u))$. A summand $2^{-8j}2^j\mathrm{diag}(\tilde{I}(i_1^-, i_2^-, \ldots, i_j^-))$ of $M(n(u))$ in (26) is a summand masking matrix $\mathrm{diag}(\tilde{I}(i_1^-, i_2^-, \ldots, i_j^-))$ multiplied by a weight $2^{-8j}2^j$. When the masking matrix $M(n(u))$ is multiplied to an orthogonal expansion $\check{x}_\tau(n(u))$ of a subvector $x_\tau(n(u))$ of $x_\tau$, each $\mathrm{diag}(\tilde{I}(i_1^-, i_2^-, \ldots, i_j^-))$ in FIG. 7 or (26) is multiplied to $\check{x}_\tau(n(u))$ to get $\mathrm{diag}(\tilde{I}(i_1^-, i_2^-, \ldots, i_j^-))\check{x}_\tau(n(u))$, in which the components of $\check{x}_\tau(n(u))$ that involve the $i_1$-th, $i_2$-th, ..., and $i_j$-th components of $x_\tau(n(u))$ are set equal to 0. This is explained in Subsection 5.4.

Another embodiment of the present invention are the first major embodiment of the present invention, wherein $c_1=0$ and $c_2=1$ in the linear combination or weighted sum $c_1I+c_2r_t(n)$. In this embodiment the second expansion correlation matrix is $D(n(u))$ displayed in FIG. 4 and (3).

Another embodiment of the present invention is the first major embodiment of the present invention, wherein $c_1=1$ and $c_2=0$ in the linear combination $c_1I+c_2r_t(n)$. In this embodiment the second expansion correlation matrix is $C(n(u))$ displayed in FIG. 4 and (4).

Another embodiment of the present invention is the first major embodiment of the present invention, wherein $c_1=1$ and $c_2=1$ in the linear combination $c_1I+c_2r_t(n)$. In this embodiment the second expansion correlation matrix is $C(n(u))$ displayed in (5).

Another embodiment of the present invention is the first major embodiment of the present invention, wherein $c_1=1$ and $c_2=-1$ in the linear combination $c_1I+c_2r_t(n)$. In this embodiment the second expansion correlation matrix is $B(n(u))$ displayed in (6).

Another embodiment of the present invention is the first major embodiment wherein weights in said weighted sum of outer products are equal.

Another embodiment of the present invention is the first major embodiment, wherein at least one expansion correlation matrix is an expansion correlation matrix on a rotation/translation/scaling (RTS) suite of a subvector of a feature subvector index.

Note that such expansion correlation matrices are shown in FIGS. 19 and (40)-(43), where the rotation/translation/scaling suite is denoted by $\Omega(n)$. These expansion correlation matrices help the above embodiment recognize rotated, translated and scaled causes or objects.

Still another embodiment of the present invention is the first major embodiment, said processing unit further comprising supervised learning means for adjusting, in response to a fifth feature vector input to said processing unit, said at least one first expansion correlation matrix by using at least an outer product of a linear combination of a vector with components all equal to 1 and a label of said fifth feature vector input to said processing unit and a fifth orthogonal expansion of a subvector of said fifth feature vector, said fifth orthogonal expansion comprising components of said subvector of said fifth feature vector and a plurality of products of said components of said subvector of said fifth feature vector, wherein said label of said fifth feature vector is provided from outside said learning machine.

Note that supervised learning is discussed in Subsection 5.6, "Processing Units and Supervised/Unsupervised Learning". Examples of adjusting expansion correlation matrices, $D(n(u))$ and $C(n(u))$, in supervised learning by using outer products, $r_t(n)\check{x}_t'(n(u))$ and $I\check{x}_t'(n(u))$, respectively, are shown in FIG. 5 and FIG. 6, where the label $r_t(n)$ of the feature vector $x_t(n)$ input to said processing unit is provided from outside the system or learning machine.

Still another embodiment of the present invention is the first major embodiment, said processing unit further comprising conversion means for converting said representation of said probability distribution produced by said estimation means into a vector being output from said processing unit as a label of said third feature vector.

Note that conversion of a representation of a probability distribution is discussed in Subsection 5.5. Two conversion means are described in the Section and are shown in FIG. 11 and FIG. 12.

Still another embodiment of the present invention, called embodiment 1, is the first major embodiment, said processing unit further comprising a pseudo-random vector generating means for generating a pseudo-random vector in accordance with said probability distribution produced by said estimation means, said pseudo-random vector being output from said processing unit as a label of said third feature vector.

Note that the pseudo-random vector generating means is shown in FIG. 12 and is the second conversion method described in Subsection 5.5.

Still another embodiment of the present invention is embodiment 1, said processing unit further comprising unsupervised learning means for adjusting, in response to a sixth feature vector input to said processing unit, said at least one first expansion correlation matrix by using at least one outer product of a linear combination of a vector with components all equal to 1 and a label of said sixth feature vector and a sixth orthogonal expansion of a subvector of said sixth feature vector, said sixth orthogonal expansion comprising components of said subvector of said sixth feature vector and a plurality of products of said components of said subvector of said sixth feature vector, wherein said label of said sixth feature vector is a pseudo-random vector generated by said pseudo-random vector generating means as a label of said sixth feature vector.

Note that unsupervised learning is discussed in Subsection 5.6, "Processing Units and Supervised/Unsupervised Learning". Examples of adjusting expansion correlation matrices, $D(n(u))$ and $C(n(u))$, by using outer products, $r_t(n)\check{x}_t'(n(u))$ and $I\check{x}_t'(n(u))$, respectively, are shown in FIG. 5 and FIG. 6, where the label $r_t(n)$ of said sixth feature vector $x_t(n)$ is said pseudo-random vector generated by said pseudo-random vector generating means as a label of said sixth feature vector.

Still another embodiment of the present invention is embodiment 1, wherein a plurality of components of a pseudo-random vector that is output from a processing unit are components of a feature vector that is input to another processing unit.

Note that in this embodiment, there are at least 2 processing units. A plurality of components of a pseudo-random vector output from one of the processing units are components of a feature vector input to another processing unit. Said at least 2 processing units form a network of processing units, which may be a multilayer network of processing units. A multilayer network of processing units is shown in FIG. 15.

Still another embodiment of the present invention is embodiment 1, wherein a plurality of said at least one processing unit form a network with a plurality of ordered layers of said processing units; each exogenous feature vector is input to layer 1 of said network, which is the lowest-ordered layer of said network; and components of a feature vector input to a processing unit in layer l of said network, where l>1, are components of at least one label that is output from at least one processing unit in layer l-1 of said network.

Note that a multilayer network of processing units is shown in FIG. 15.

Still another embodiment of the present invention is embodiment 1 for processing exogenous feature vectors in sequences of exogenous feature vectors, wherein a plurality of components of a pseudo-random vector that is output from a processing unit in processing a certain exogenous feature vector in a sequence of exogenous feature vectors are included as components, after a time delay, in a feature vector that is input to a processing unit in processing an exogenous feature vector subsequent to said certain exogenous feature vector in said sequence.

Note that in this embodiment, a plurality of components of a pseudo-random vector output from a processing unit are, after a time delay, components of a feature vector input to another processing unit. Because of the time delay, said at least 2 processing units can form a network of processing units with "feedback connections", which is a dynamical system by itself.

Still another embodiment of the present invention is embodiment 1 for processing exogenous feature vectors in sequences of exogenous feature vectors, wherein at least one component of a label that is output from a processing unit in layer j in processing a certain exogenous feature vector in a sequence is included as a component, after a time delay, in a feature vector that is input to a processing unit in layer k, where $k \leq j$, in processing an exogenous feature vector subsequent to said certain exogenous feature vector in said sequence. A multilayer network of processing units with feedbacks is shown in FIG. 16.

A second major embodiment is a method for processing feature vectors, said method comprising:
   an expanding step of expanding a subvector of a first feature vector into a first orthogonal expansion that comprises components of said subvector of said first feature vector and a plurality of products of said components of said subvector of said first feature vector, and
   an estimating step of using
      1. at least one orthogonal expansion of a subvector of said first feature vector produced by said expanding step; and
      2. at least one expansion correlation matrix that is a weighted sum of outer products, each being an outer product of a weighted sum of a vector with components all equal to 1 and a label of a second feature vector and a second orthogonal expansion of a subvector of said second feature vector, said second orthogonal expansion comprising components of said subvector of said second feature vector and a plurality of products of said components of said subvector of said second feature vector;
   to compute a representation of a probability distribution of a label of said first feature vector.

Note that all the terms used in the above second major embodiment are those used in the first major embodiment, which are briefly described for the first major embodiment. Note also that the terms used in all the embodiments below are those used in the embodiments above following the first major embodiment.

Another embodiment of the present invention is the second major embodiment, wherein said estimating step also uses at least one masking matrix that is a sum of an identity matrix and at least one summand masking matrix multiplied by a weight, said summand masking matrix setting certain components of a third orthogonal expansion of a subvector of a third feature vector equal to zero, as said masking matrix is multiplied to said third orthogonal expansion, to compute a representation of a probability distribution of a label of said first feature vector, said third orthgonal expansion comprising components of said subvector of said third feature vector and a plurality of products of said components of said subvector of said third feature vector.

Another embodiment of the present invention is the second major embodiment, wherein said weighted sum of a vector with components all equal to 1 and a label of a second feature vector is said label of said second feature vector.

Another embodiment of the present invention is the second major embodiment, wherein said weighted sum of a vector with components all equal to 1 and a label of a second feature vector is said vector with components all equal to 1.

Another embodiment of the present invention is the second major embodiment, wherein said weighted sum of a vector with components all equal to 1 and a label of a second feature vector is a sum of said vector with components all equal to 1 and said label of said second feature vector Another embodiment of the present invention is the second major embodiment, wherein weights in said weighted sum of outer products are equal.

Another embodiment of the present invention, called embodiment 2, is the second major embodiment, further comprising a generating step of generating a pseudo-random vector in accordance with said probability distribution as a label of said first feature vector.

Another embodiment of the present invention is embodiment 2, further comprising a feedforward step of including a plurality of components of a pseudorandom vector generated by said generating step as a label of said first feature vector as components in a fourth feature vector and processing said fourth feature vector by said expanding step and said estimating step.

Another embodiment of the present invention is embodiment 2, further comprising a feedback step of including, after a time delay, a plurality of components of a pseudorandom vector generated by said generating step as a label of said first feature vector as components in a fifth feature vector and processing said fifth feature vector by said expanding step and said estimating step.

Another embodiment of the present invention is embodiment 2, further comprising an unsupervised learning step of adjusting said expansion correlation matrix by using at least one outer product of a weighted sum of a vector with components all equal to 1 and a label of a sixth feature vector and an orthogonal expansion of a subvector of said sixth feature vector produced by said expanding step, wherein said label of said sixth feature vector is a pseudo-random vector generated by said generating step as a label of said sixth feature vector.

Another embodiment of the present invention is embodiment 2, further comprising a supervised learning step of adjusting said expansion correlation matrix by using at least an outer product of a weighted sum of a vector with components all equal to 1 and a label of a seventh feature vector and an orthogonal expansion of a subvector of said seventh feature vector produced by said expanding step, wherein said label of said seventh feature vector is provided.

DESCRIPTION OF DRAWINGS

Embodiments of the invention disclosed herein, which are called probabilistic associative memories (PAMs), comprise at least one processing unit (PU). Component parts of a PU are first shown in the drawings described below. Drawings are then given to show how these component parts are used to construct some embodiments of the present invention. Embodiments of the present invention that can recognize rotated, translated and scaled causes (e.g., objects) and their component parts are also shown in drawings.

In the present invention disclosure, the prime denotes matrix transposition, and a vector is regarded as a subvector of the vector itself, as usual.

evaluates $\check{v}(1,\ldots,j)$ for $j=2,\ldots,k-1$, yielding $\check{v}=\check{v}(1,\ldots,k)$.

Figure 1:
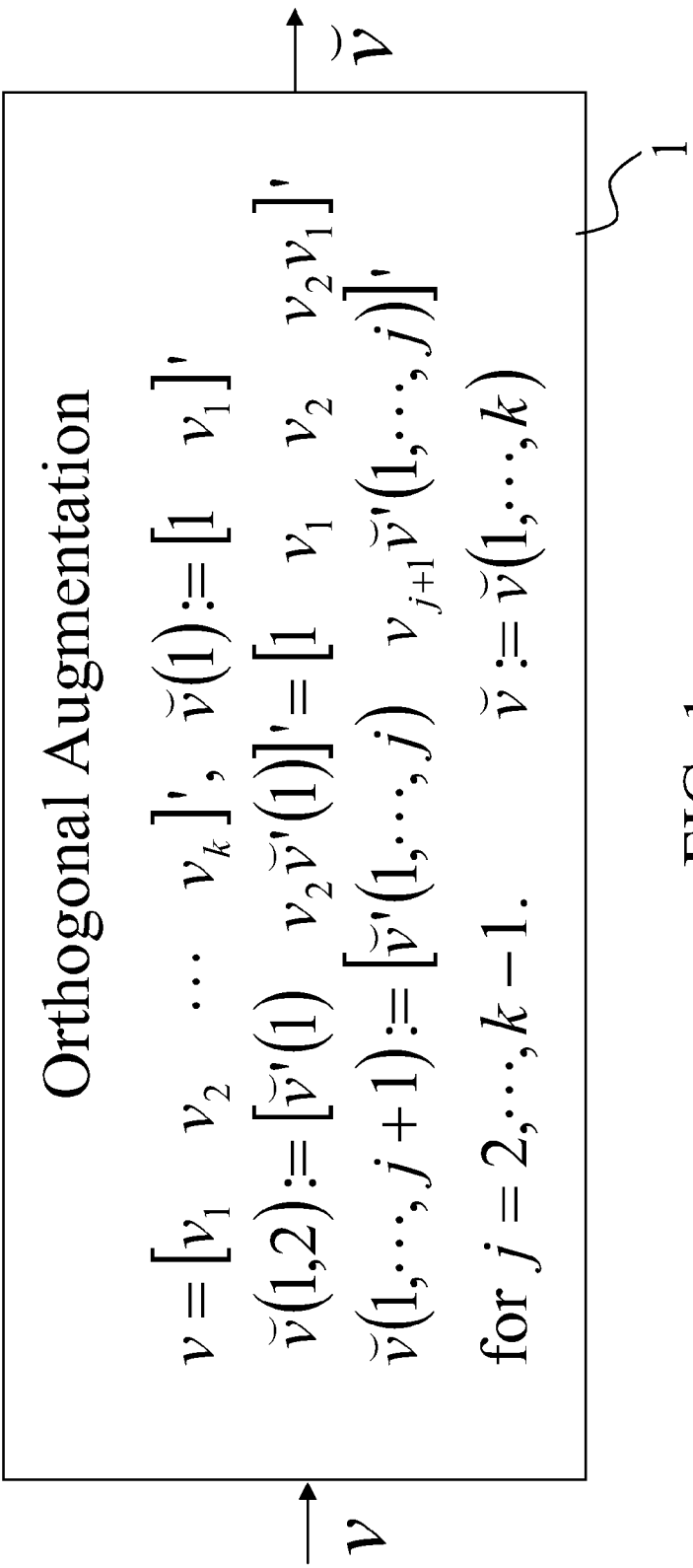
FIG. 1 shows expansion means 1 for generating an orthogonal expansion $\check{v}$ of a given ternary vector $v=[v_1 \ldots v_k]'$ in a recursive manner. Starting with $\check{v}(1):=[1\ v_1]'$, the recursive formula, $$\check{v}(1,\ldots,j+1)=[\check{v}'(1,\ldots,j)v_{j+1}\check{v}'(1,\ldots,j)]',$$
Figure 2:
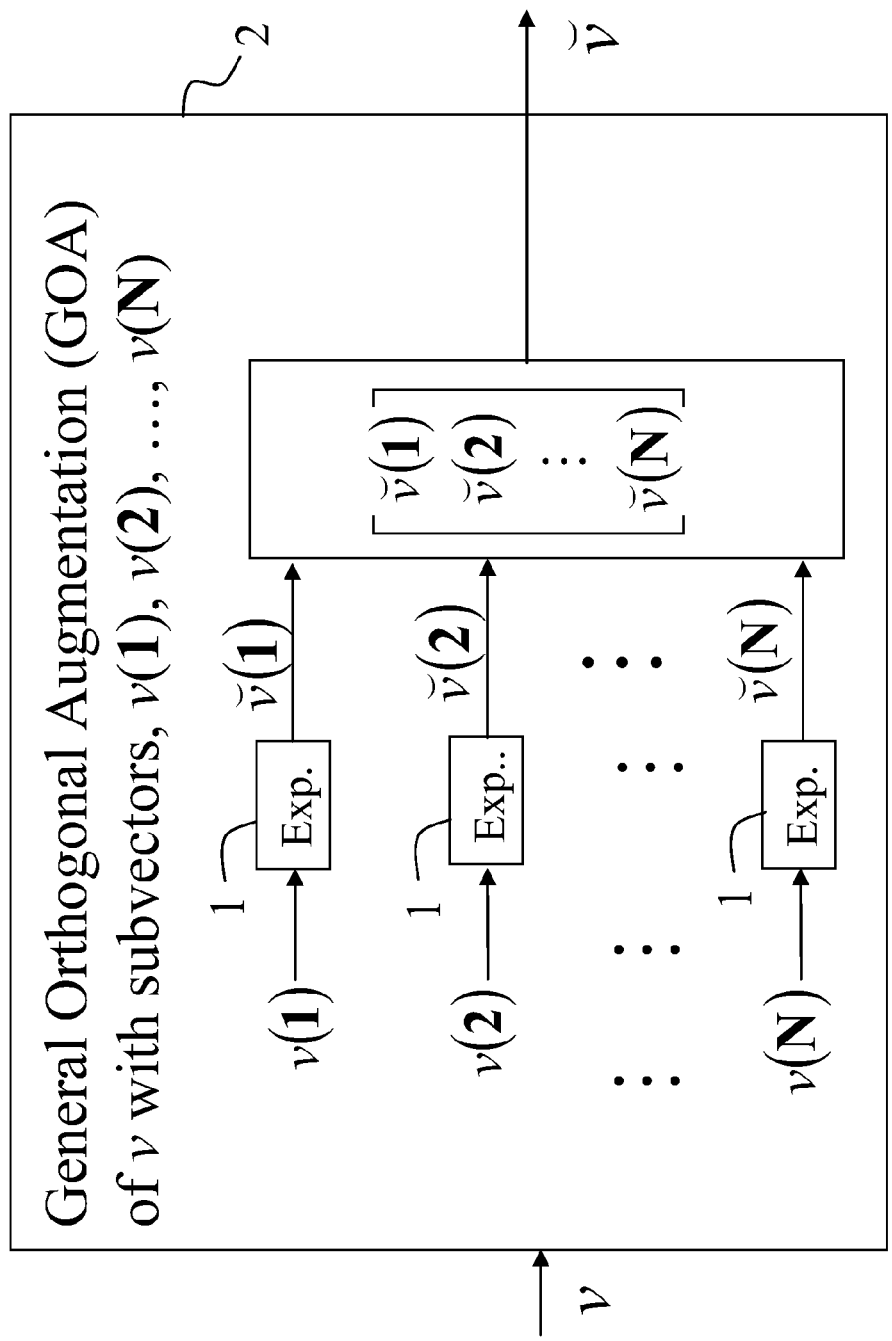

FIG. 2 shows expansion means 2 for generating general orthogonal expansion $\check{v}$ of a given ternary vector $v=[v_1 \ldots v_m]'$. Let $n=[n_1 \ldots n_{k(n)}]'$ be a subvector of $[1 \ldots k]'$ whose components, $n_1, \ldots, n_{k(n)}$ satisfy $1 \leq n_1 < \ldots < n_{k(n)} \leq k$. The subvector n is called a subvector index. The subvector $v(n)=[v_{n_1} \ldots v_{n_{k(n)}}]'$ of v is called a subvector of v on the subvector index n. Given subvector indices, $1, \ldots, N$, which may or may not have common components, the expansion means 2 shown in this figure (FIG. 2) works as follows: The orthogonal expansions, $\check{v}(1), \ldots, \check{v}(N)$, of subvectors, $v(1), \ldots, v(N)$, are first obtained using the expansion means shown in FIG. 1. Then the orthogonal expansions, $\check{v}(1), \ldots, \check{v}(N)$, are included as block components in the vector $\check{v}=[\check{v}'(1) \ldots \check{v}'(N)]'$. The resultant vector $\check{v}$ is called a general orthogonal expansion of v.

A PAM usually has a plurality of ordered layers, and a layer usually has a plurality of PUs (processing units). A vector input to layer l is called a feature vector and denoted by $x_t^{l-1}=[x_{t1}^{l-1}\ x_{t2}^{l-1}\ \ldots\ x_{tM}^{l-1}]'$, t is used to distinguish feature vectors that are input at different times (or with different numberings). A vector that is input to a PU (processing unit) in layer l is a subvector of a feature vector $x_t^{l-1}$. The subvector index of said subvector of the feature vector $x_t^{l-1}$ is called a feature subvector index (FSI). A feature subvector index (FSI) is denoted by a lower-case boldface letter. A symbol to denote a typical FSI is n and the subvector $x_t^{l-1}(n)$ is called the feature subvector on the FSI n.

Figure 3:
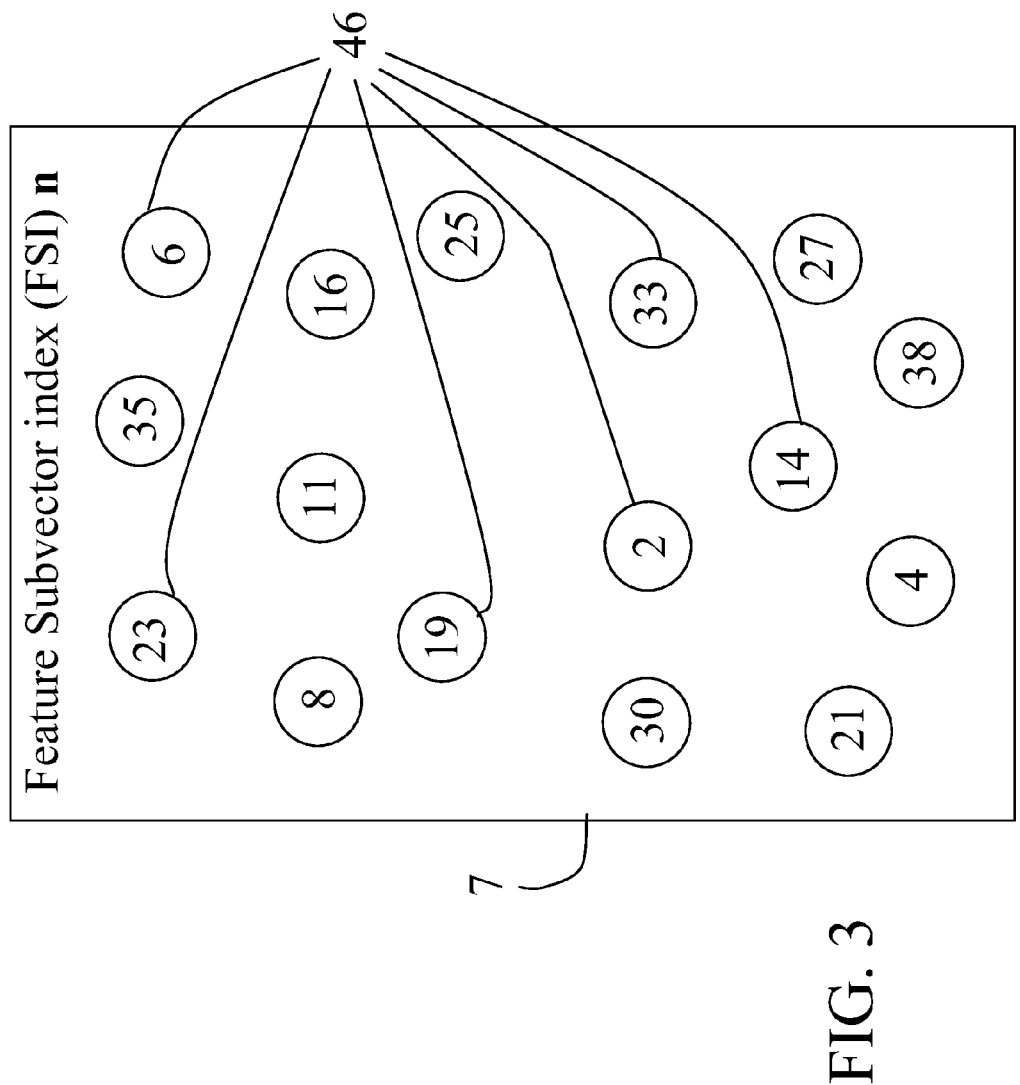

FIG. 3 shows an example FSI (feature subvector index) $n=[2\ 4\ 6\ 8\ 11\ 14\ 16\ 19\ 21\ 23\ 25\ 27\ 30\ 33\ 35\ 38]'$, which is identified with pixel locations. An example subvector $[2\ 6\ 14\ 19\ 23\ 33]'$, say the third subvector, of the feature subvector n is indicated by 46. The example subvector is denoted by $n(3)=[2\ 6\ 14\ 19\ 23\ 33]'$.

FIG. 4 shows expansion correlation matrices (ECMs), C(n(u)) and D(n(u)), on the subvector n(u) of a feature subvector index n, that are defined by the pairs, $(x_t(n(u)), r_t(n))$, $t=1, \ldots, T$, with weight matrices $W_t(n(u), T)$, where $x_t(n(u))$ and $r_t(n)$ are a subvector on n(u) of a feature subvector $x_t(n)$ on n and an R-dimensional label of $x_t(n)$, respectively. Note that here $r_t(n) \neq 0$, for $t=1, \ldots, T$. If a label $r_\tau(n)=0$, $(x_\tau(n(u)), r_\tau(n))$ is skipped and not included in the numbering, $t=1, T$, or in the pairs, $(x_t(n(u)), r_t(n))$, $t=1, \ldots, T$. This is also the case with FIG. 8, FIG. 19 and FIG. 22. Λ denotes a scaling constant, which is usually a small positive number selected to keep the numbers involved in an application of the present invention manageable. Note that $[C'(n(u))\ D'(n(u))]'$ can be viewed as a single ECM. $W_t(n(u), T)$ is usually selected to be equal to $w_t(n(u), T) I$, for some real-valued function $w_t(n(u), T)$, where I is an R×R identify matrix, R being the dimensionality of $r_t(n)$. If this is the case, we define $$C(n(u)) = \Lambda \sum_{t=1}^{T} w_t(n(u), T) \check{x}_t'(n(u))$$

instead. Here C(n(u)) is a row vector, and the ECM $[C'(n(u))\ (n(u))]'$ has R+1 rows.

Figure 5:
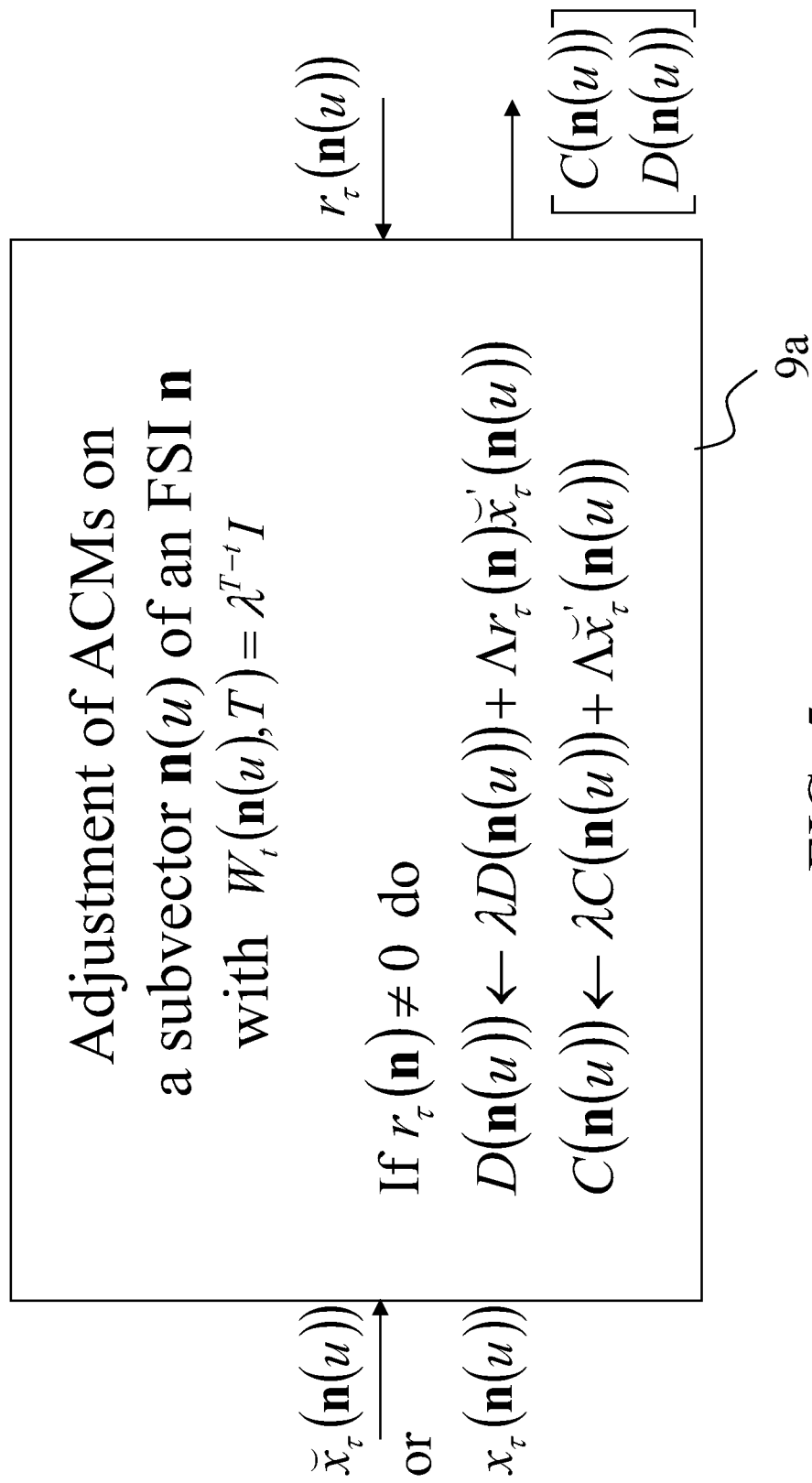

FIG. 5 shows, if the label $r_\tau(n) \neq 0$, how the expansion correlation matrices (ECMs), C(n(u)) and D(n(u)), defined in FIG. 4 with the weight matrix $W_t(n(u), T)=\lambda^{T-t} I$ are adjusted to learn a pair $(x_\tau(n(u)), r_\tau(n))$. If $r_\tau(n)=0$, the pair $(x_\tau(n(u)), r_\tau(n))$ is discarded. λ is a forgetting factor, and Λ is a scaling constant. Note that $W_t(n(u), T)$ is a diagonal matrix with equal diagonal entries, C(n(u)) has only one row, and the ECM $[C'(n(u))\ D'(n(u))]'$ has only R+1 rows.

Figure 6:
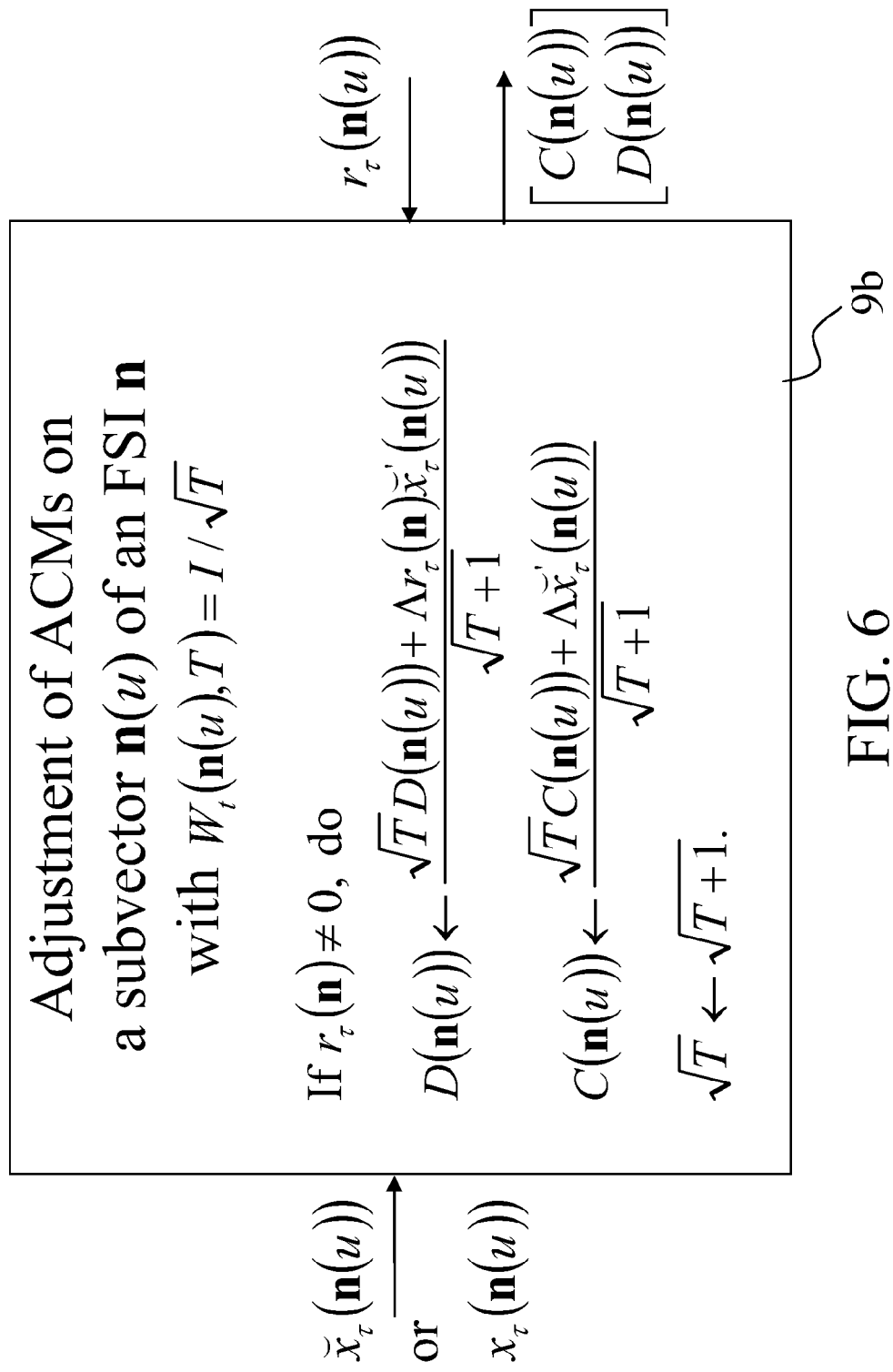

FIG. 6 shows, if the label $r_\tau(n(u)) \neq 0$, how the expansion correlation matrices (ECMs), C(n(u)) and D(n(u)), defined in FIG. 4 for the weight matrix $W_t(n(u), T)=(1/\sqrt{T}) I$ are adjusted to learn a pair $(x_\tau(n(u)), r_\tau(n(u)))$. The number T of learned pairs is updated to T+1 after a pair is learned. If $r_\tau(n)=0$, the pair $(x_\tau(n(u)), r_\tau(n))$ is discarded, and the number is not updated. Note that $W_t(n(u), T)$ is a diagonal matrix with equal diagonal entries, C(n(u)) has only one row, and the ECM $[C'(n(u))\ D'(n(u))]'$ has only R+1 rows.

FIG. 7 shows a masking matrix M(n(u)) on a subvector n(u) of an FSI (feature subvector index) n, where $I=[1 \ldots 1]'$, $I(i_1^-, i_2^-, \ldots, i_j^-)$ is the vector I with its $i_1$-th, $i_2$-th, ..., and $i_j$-th components set equal to 0, $\check{I}(i_1^-, i_2^-, \ldots, i_j^-)$ is the orthogonal expansion $I(i_1^-, i_2^-, \ldots, i_j^-)$, and $\text{diag}(\check{I}(i_1^-, i_2^-, \ldots, i_j^-))$ denotes the diagonal matrix whose diagonal entries are $\check{I}(i_1^-, i_2^-, \ldots, i_j^-)$. Because $\text{diag}(\check{I}(i_1^-, i_2^-, \ldots, i_j^-))$ appears in a summand $2^{-8/j} \text{diag}(\check{I}(i_1^-, i_2^-, \ldots, i_j^-))$ in (26) for the masking matrix $M(n(u))$, the matrix $\text{diag}(\check{I}(i_1^-, i_2^-, \ldots, i_j^-))$ is called a summand masking matrix in $M(n(u))$. A summand $2^{-8/j} 2^j \text{diag}(\check{I}(i_1^-, i_2^-, \ldots, i_j^-))$ in (26) is a summand masking matrix $\text{diag}(\check{I}(i_1^-, i_2^-, \ldots, i_j^-))$ multiplied by a weight $2^{-8/j} 2^j$. When $M(n(u))$ is multiplied to an orthogonal expansion $\check{x}_t(n(u))$ of a subvector $x_t(n(u))$ of $x_t$, each $\text{diag}(\check{I}(i_1^-, i_2^-, \ldots, i_j^-))$ in FIG. 7 or (26) is multiplied to $\check{x}_t(n(u))$ to get $\text{diag}(\check{I}(i_1^-, i_2^-, \ldots, i_j^-)) x_t(n(u))$, in which the components of $\check{x}_{t(n(u))}$ that involve the $i_1$-th, $i_2$-th, $\ldots$, and $i_j$-th components of $x_t(n(u))$ are set equal to 0. A masking matrix $M(n(u))$ is used to set automatically selected components of a subvector $x_t(n(u))$ of a feature subvector $x_t(n)$ equal to 0 in order to retrieve the label of a feature subvector stored in ECMs that shares the largest number of components with $x_t(n(u))$. Note that $2^{-8}$ is an example weight factor selected to differentiate between different levels of maskings to effect the automatic selection. The weight should be selected to suit the application. Note that as usual, I denotes an identity matrix, and $I = \text{diag } I$.

FIG. 8 shows a general orthogonal expansion $\check{x}_t(n)$ of a feature subvector $x_t(n)$ and general expansion correlation matrices, $C(n)$ and $D(n)$, on the FSI n with subvectors $n(u)$, $u=1, \ldots, U$. $r_t(n)$ in the definition formulas of $C(n)$ and $D(n)$ are assumed to be not equal to 0. If a label $r_t(n)=0$, $(x_t(n(u)), r_t(n))$ is skipped and not included in the numbering, $t=1, \ldots, T$, or in the pairs, $(x_t(n(u)), r_t(n))$, $t=1, \ldots, T$. This is also the case with FIG. 4, FIG. 19 and FIG. 22. $\check{x}_t(n)$ has orthogonal expansions $\check{x}_t(n(u))$, $u=1, \ldots, U$, as its subvectors, and $C(n)$ has expansion matrices $C(n(u))$, $u=1, \ldots, U$, as its submatrices, and $D(n(u))$ has expansion matrices $D(n(u))$, $u=1, \ldots, U$, as its submatrices. It is understood that an orthogonal expansion of $x_t(n)$ is a special case of a general orthogonal expansion of $x_t(n)$, and an expansion correlation matrix on n is a special case of a general expansion correlation matrix on n.

FIG. 9 shows a general masking matrix $M(n)$ on an FSI n with subvectors $n(u)$, $u=1, \ldots, U$. $M(n)$ has $M(n(u))$, $u=1, \ldots, U$, as its diagonal blocks. $M(n(u))$ are defined in FIG. 7. $M(n)$ and $M(n(u))$ are represented by M for simplicity if the context makes it clear which M represents. It is understood that a masking matrix on n is a special case of a general masking matrix on n.

Figure 10:
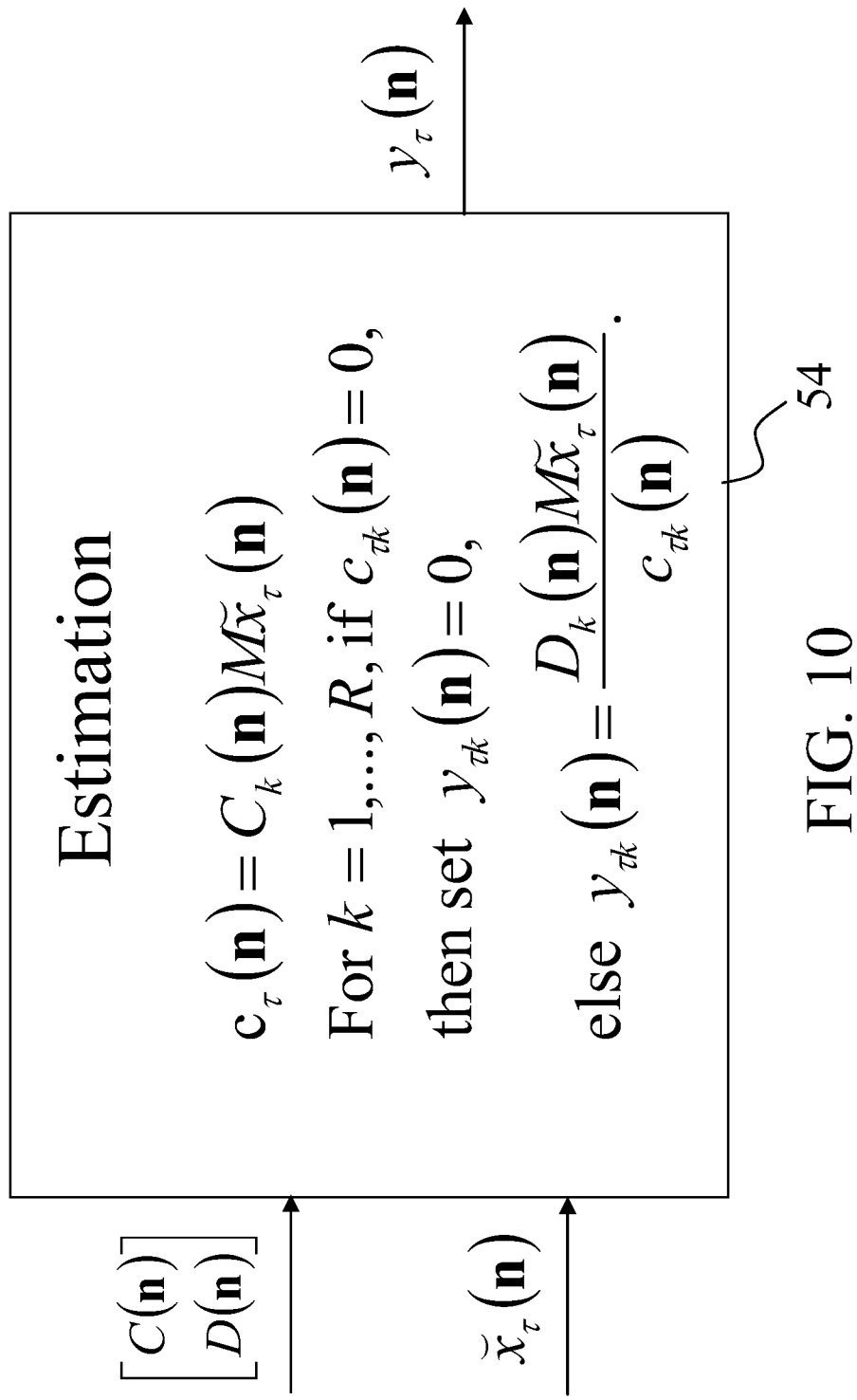

FIG. 10 shows estimation means 54 for using a general orthogonal expansion $\check{x}(n)$ of the input feature subvector $x_t(n)$ and general expansion correlation matrices, $C(n)$ and $D(n)$, to produce a representation, $y_t(n)=2p_t(n)-I$, of a probability distribution of the label $r_t(n)$ of the feature subvector $x_t(n)$ on the feature subvector index n. In the figure, a general masking matrix $M(n)$ is represented by M. Note that as a special case, the general expansion correlation matrices and general orthogonal expansion can be simply expansion correlation matrices on n, and an orthogonal expansion of $x_t(n)$, respectively. Here R is the dimensionality of the label $r_t(n)$, and $p_{tk}(n)$ is the subjective probability that the k-th component of $r_t(n)$ is $+1$. Note that every component of $y_t(n)=2p_t(n)-I$ lies between $-1$ and $1$.

FIG. 11 shows an example conversion means 13a for converting a representation $y_t(n)=2p_t(n)-I$ of a probability distribution into a ternary vector $x\{y_t(n)\}$. This conversion means 13a is pseudo-random vector generating means. Every component $y_{tk}(n)$ of $y_t(n)$ is converted into a ternary number (or a one-dimensional ternary vector) $x\{y_{tk}(n)\}$ as follows:

Generate a pseudorandom number in accordance with the probability distribution of a random variable v: $P(v=1)=p_{tk}(n)$ and $P(v=-1)=1-p_{tk}(n)$, and set $x\{y_{tk}(n)\}$ equal to the obtained pseudo-random number.

The output $x\{y_t(n)\}$ that conversion means generates is an R-dimensional vector with components $x\{y_{tk}(n)\}$, $k=1, \ldots, R$. $x\{y_t(n)\}$ is a point estimate of $r_t(n)$.

FIG. 12 shows an alternative conversion means 13b for converting a representation $y_t(n)=2p_t(n)-I$ of a probability distribution into a ternary vector $x\{y_t(n)\}$. Assume that each component $y_{tk}(n)$ of $y_t(n)$ is to be converted into a three-dimensional ternary vector. Recall that $-1 \leq y_{tk}(n) \leq 1$. If $y_{tk}(n)$ is very close to 0, the probability $p_{tk}(n)$ is very close to $\frac{1}{2}$ and contains little information about the label $r_{tk}(n)$. To eliminate it from further processing, the conversion means converts it into $x\{y_{tk}(n)\}=[0 \ 0 \ 0]$. If $y_{tk}(n)$ is not very close to 0, we convert it into a 3-component ternary vector $x\{y_{tk}(n)\}$ as shown in FIG. 12. The output $x\{y_t(n)\}$ of the converter is a 3R-dimensional concatenation of $x\{y_{tk}(n)\}$, $k=1, \ldots, R$. The method of converting a component $y_{tk}(n)$ of $y_t(n)$ into a 3-dimensional ternary vector can easily be generalized to a method of converting $y_{tk}(n)$ into a ternary vector of any dimensionality.

Figure 13:
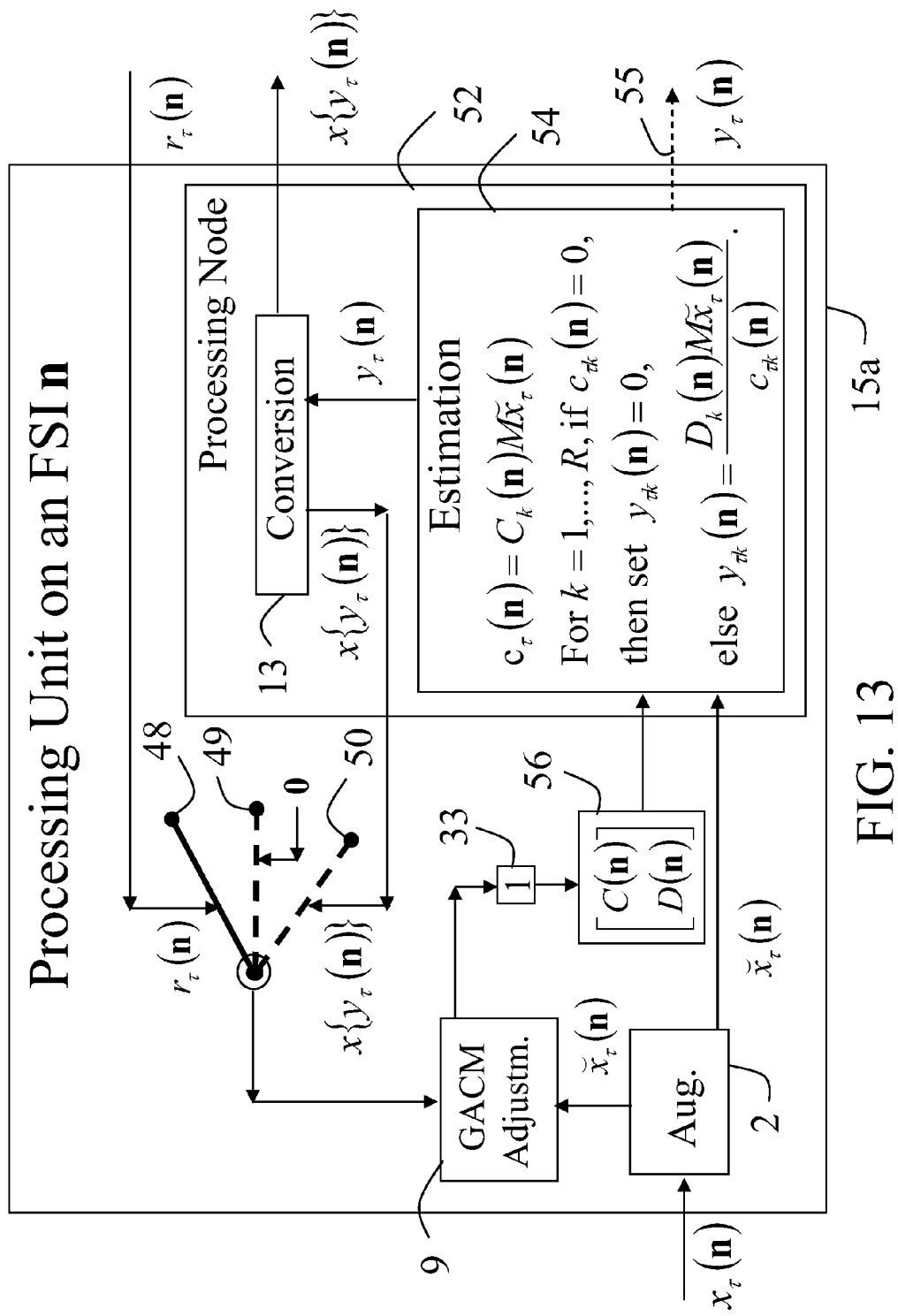

FIG. 13 shows an example processing unit (PU) on a feature subvector index n (PU(n)). In retrieving, a feature suvector $x_t(n)$ on the FSI n is first expanded into a GOE (general orthogonal expansion) $\check{x}_t(n)$ by the expansion means 2. $\check{x}_t(n)$ is then processed by the estimation means 54, using the GECMs (general expansion correlation matrices), $C(n)$ and $D(n)$, from the storage 56, to obtain a representation $y_t(n)$ of a probability distribution of the label of $x_t(n)$. The conversion means 13 converts $y_t(n)$ into a ternary vector $x\{y_t(n)\}$, which is an output of the PU. If a representation of a probability distribution of $x_t(n)$ is needed for use outside the PU, $y_t(n)$ is also output by the PU. The dashed line in the arrow 55 indicates "output as needed." This process of generating $y_t(n)$ and $x\{y_t(n)\}$ by PU(n) is called retrieval of a label of the feature subvector $x_t(n)$ by PU(n).

If a label $r_t(n) \neq 0$ of $x_t(n)$ from outside the PU is available for learning, and learning $x_t(n)$ and $r_t(n)$ is wanted, supervised learning is performed by the PU. In supervised learning, the label $r_t(n) \neq 0$ is received through a lever represented by a thick solid line with a solid dot in the position 48 by an adjustment means 9, which receives also $\check{x}_t(n)$ from the expansion means 2 and uses a method of adjusting ECMs such as those depicted in FIG. 5 and FIG. 6 and assembles the resultant ECMs $C(n(u))$ and $D(n(u))$, $u=1, \ldots, U$, into general ECMs $$C(n)=[C(n(1))C(n(2))\ldots C(n(U))]$$

$$D(n)=[D(n(1))D(n(2))\ldots D(n(U))]$$

These $C(n)$ and $D(n)$ are then stored, after a one-numbering delay (or a unit-time delay) 33, in the storage 56, from which they are sent to the estimation means 54. The one-numbering delay is usually a time delay that is long enough for the estimation means to finish using current $C(n)$ and $D(n)$ in generating and outputting $y_t(n)$, but short enough for getting the next $C(n)$ and $D(n)$ generated by the adjustment means available for the estimation means to use for processing the next orthogonal expansion or general orthogonal expansion from the expansion means.

Supervised learning means is described as follows: If a class label $r_t(n) \neq 0$ of $x_t(n)$ from outside PU(n) is available and learning $x_t(n)$ and $r_t(n)$ is wanted, supervised learning means of the PU for adjusting at least one GECM (general expansion correlation matrix) performs supervised learning by receiving a GOE (general orthogonal expansion) $\check{x}_t(n)$ generated by expansion means 2 and a label $r_\tau(n) \neq 0$ of $x_\tau(n)$ provided from outside the PAM, using adjustment means 9 to adjust each ECM block in GECMs.

If a label $r_\tau(n)$ of $x_\tau(n)$ from outside the PU is unavailable but learning $x_\tau(n)$ is wanted, unsupervised learning is performed by the PU. In this case, the lever (shown in position 48 in FIG. 13) should be in the position 50. The feature subvector $x_\tau(n)$ is first processed by the expansion means 2, estimation means 54, conversion means 13 as in performing retrieval described above. The resultant ternary vector $x\{y_\tau(n)\}$ is received, through the lever in position 50, and used by the adjustment means 9 as the label $r_\tau(n)$ of $x_\tau(n)$. The adjustment means 9 receives $\check{x}_\tau(n)$ also and uses a method of adjusting ECMs such as those depicted in FIG. 5 and FIG. 6 and assembles the resultant ECMs, C(n(u)) and D(n(u)), u=1, ..., U, into general ECMs $$C(n)=[C(n(1))C(n(2))\ldots C(n(U))]$$

$$D(n)=[D(n(1))D(n(2))\ldots D(n(U))]$$

These C(n) and D(n) are then stored, after a one-numbering delay (or a unit-time delay) 33, in the storage 56, from which they are sent to the estimation means 54.

Unsupervised learning means is described as follows: If a label $r_\tau(n)$ of $x_\tau(n)$ from outside PU(n) is unavailable but learning $x_\tau(n)$ is wanted, unsupervised learning means of the PU for adjusting at least one GECM (general expansion correlation matrix) performs unsupervised learning by receiving a GOE (general orthogonal expansion) $\check{x}_\tau(n)$ generated by expansion means 2 and a ternary vector $x\{y_\tau(n)\}$ generated by the conversion means 13 and using adjustment means 9 to adjust each ECM block in GECMs.

If no learning is to be performed by PU(n), the lever represented by a thick solid line with a solid dot is placed in the position 49, through which 0 is sent as the label $r_\tau(n)$ of $x_\tau(n)$ to the adjustment means 9, which then keeps C(n) and D(n) unchanged or stores the same C(n) and D(n) in the storage 56 after a one-numbering delay (or a unit-time delay).

Figure 14:
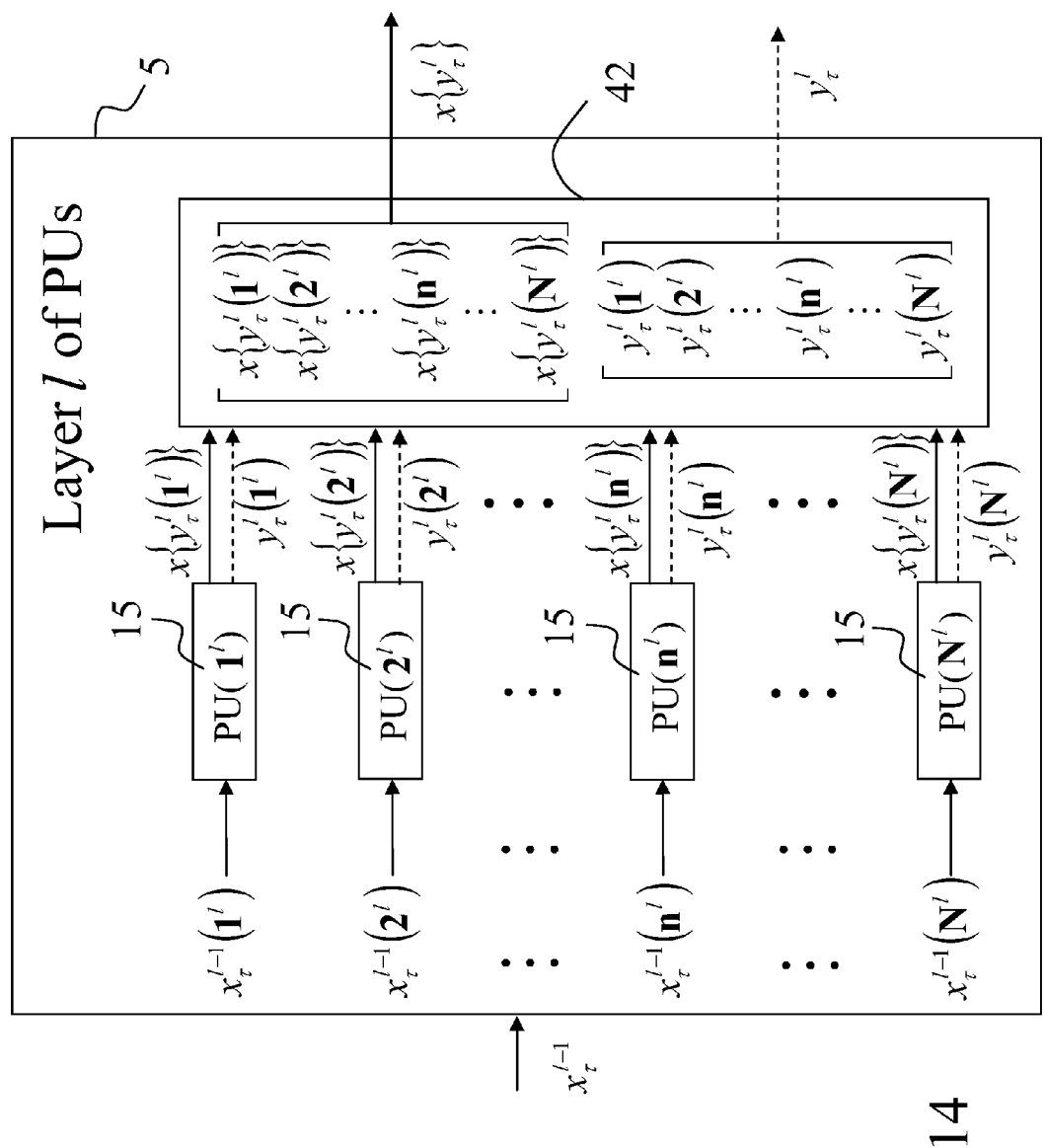

FIG. 14 shows an example layer l of PUs (processing units) 15 in a PAM (probabilistic associative memory). The input to layer l is a feature vector $x_\tau^{l-1}$ from layer l-1, $x_\tau^0$ being or containing an exogenous feature vector input to PAM. The feature subvectors, $x_\tau^{l-1}(n^l)$, $n^l=1^l, \ldots N^l$, of $x_\tau^{l-1}$ are input to the PUs, PU($n^l$), $n^l=1^l, \ldots, N^l$, respectively 15. Their possible output $y_\tau^l(n^l)$ and output $x\{y_\tau^l(n^l)\}$, $n^l=1^l, \ldots, N^l$, are assembled 42 into vectors $y_\tau^l$ and $x\{y_\tau^l\}$. Here $y_\tau^l$ is output if needed as indicated by the dashed arrow.

Figure 15:
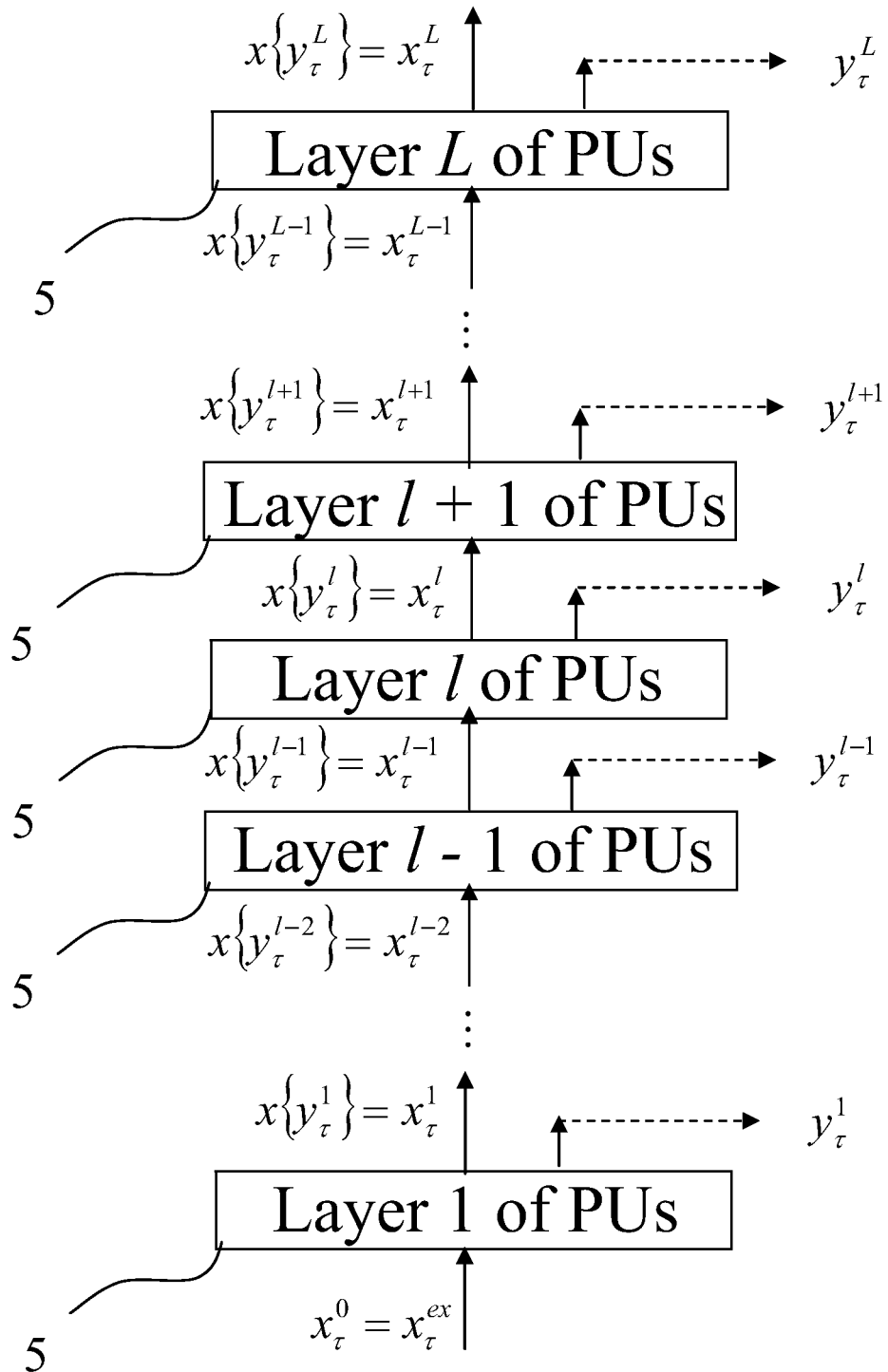

FIG. 15 shows an example hierarchical probabilistic associative memory (HPAM), which has L layers 5 of PUs. The feature vector input to layer l is $x_\tau^{l-1}$, and the vectors output from layer l are $y_\tau^l$ and $x\{y_\tau^l\}$. The feature vector $x_\tau^{l-1}$ input to layer l comprises the vector $x\{y_\tau^{l-1}\}$ output from layer l-1. $y_\tau^l(n^l)$ is output if needed for each layer l. Note that the feature vector $x_\tau^0$ input to layer 1 is the exogenous feature vector $x_\tau^{ex}$ input to the HPAM.

Figure 16:
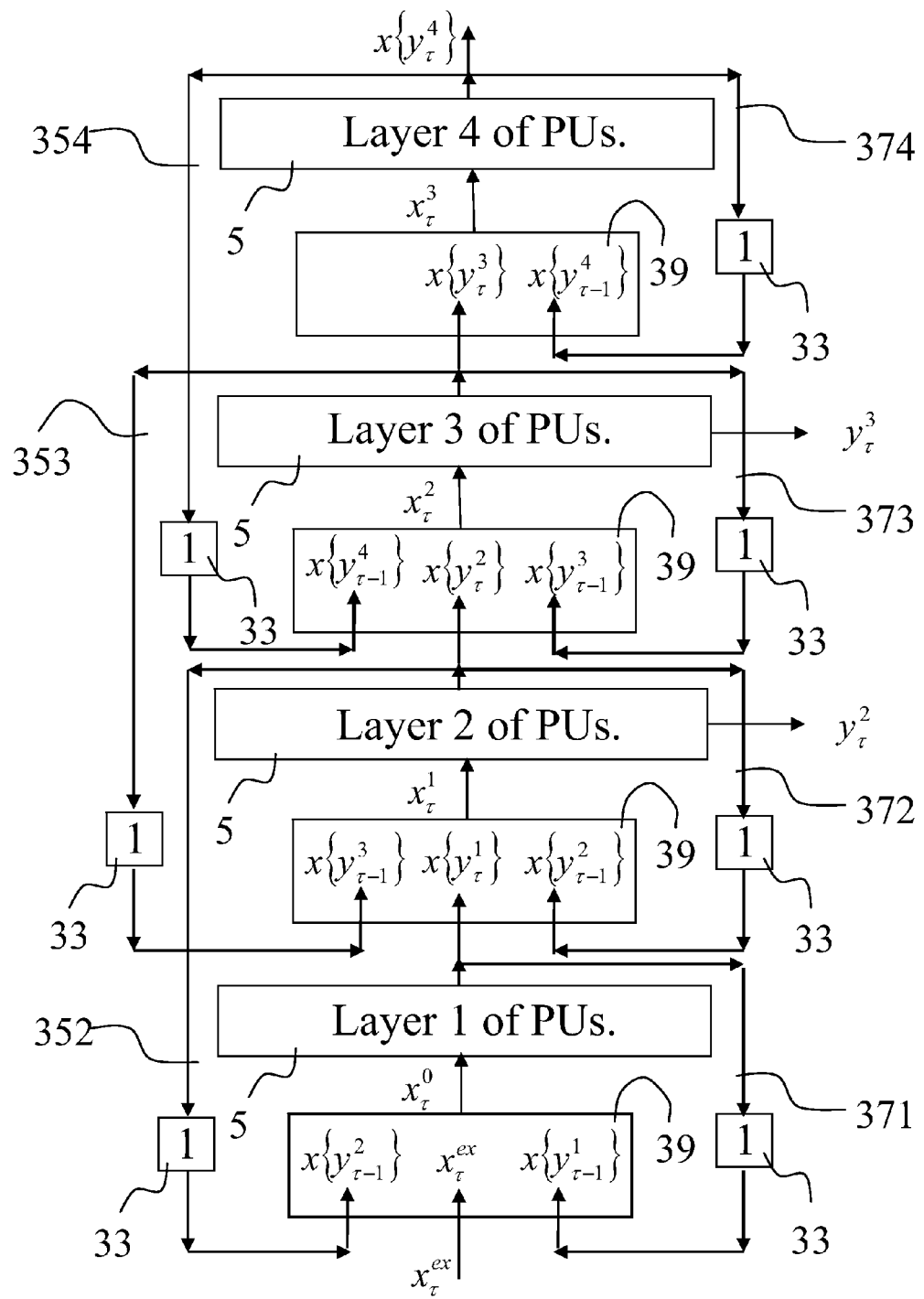

FIG. 16 shows an example temporal hierarchical probabilistic associative memory (THPAM), which is a probabilistic associative memory with 0-layer (i.e., same-layer) and 1-layer feedbacks, for processing sequences of exogenous feature vectors. The example THPAM has 4 layers 5 of PUs, four same-layer feedback paths 371, 372, 373, 374, and three 1-layer feedback paths 352, 353, 354. A small square box 33 containing the numeral 1 represents a delay device (e.g., storage/memory) that holds the output from a layer of PUs in processing an exogenous feature vector in a sequence until the output is included in the feature vector input to the same or a lower-ordered layer of PUs in processing the exogenous feature vector subsequent to said exogenous feature vector in the same sequence (i.e., one exogenous feature vector later). A box 39 enclosing ternary vectors preceding a layer of PUs indicates symbolically assembling or inclusion of the enclosed ternary vectors into a feature vector input to said layer.

For instance, in processing a sequence $\{x_t^{ex}, t=1, 2, \ldots\}$ of exogenous feature vectors input to the PAM, the output $x\{y_{\tau-1}^3\}$ of layer 3 of PUs in processing $x_{\tau-1}^{ex}$, which has been held in a delay device, is included in the feature vector $x_\tau^2$ input to the same layer, $$x_\tau^2 = [x'\{y_{\tau-1}^4\} x'\{y_\tau^2\} x'\{y_{\tau-1}^3\}]'$$

through the feedback path 373 in processing $x_\tau^{ex}$, which is subsequent to $x_{\tau-1}^{ex}$ in the same sequence $\{x_t^{ex}, t=1, 2, \ldots\}$. $x\{y_{\tau-1}^3\}$ is also included in the feature vector input to layer 2 of PUs, $$x_\tau^1 = [x'\{y_{\tau-1}^3\} x'\{y_\tau^1\} x'\{y_{\tau-1}^2\}]'$$

through the feedback path 353, in processing $x_\tau^{ex}$, which is subsequent to $x_{\tau-1}^{ex}$ in the same sequence $\{x_t^{ex}, t=1, 2, \ldots\}$.

Before a new sequence of exogenous feature vectors is started to be processed, the feedbacked ternary vectors, which form the dynamical state of the THPAM, are usually all set equal to zero.

Note that the exogenous feature vector $x_\tau^{ex}$ input to the PAM is part of the feature vector $x_\tau^0$ that is input to layer 1 of the PAM.

FIG. 17a-17e show examples of rotation, translation and scaling in an RTS (rotation, translation and scaling) suite of a feature subvector index n, which is shown in FIG. 17a. The components of n are the numberings (of a feature subvector) shown in the small circles within the retangular box 58. The cross with arrow heads indicate the orientation and position of n. FIG. 17b shows a translation to the right. FIG. 17c shows a rotation of the translation in FIG. 17b. FIG. 17d and FIG. 17e show a compression and an expansion of the translation in FIG. 17b. Five examples of translations of n are shown in FIG. 17f.

Figure 18:
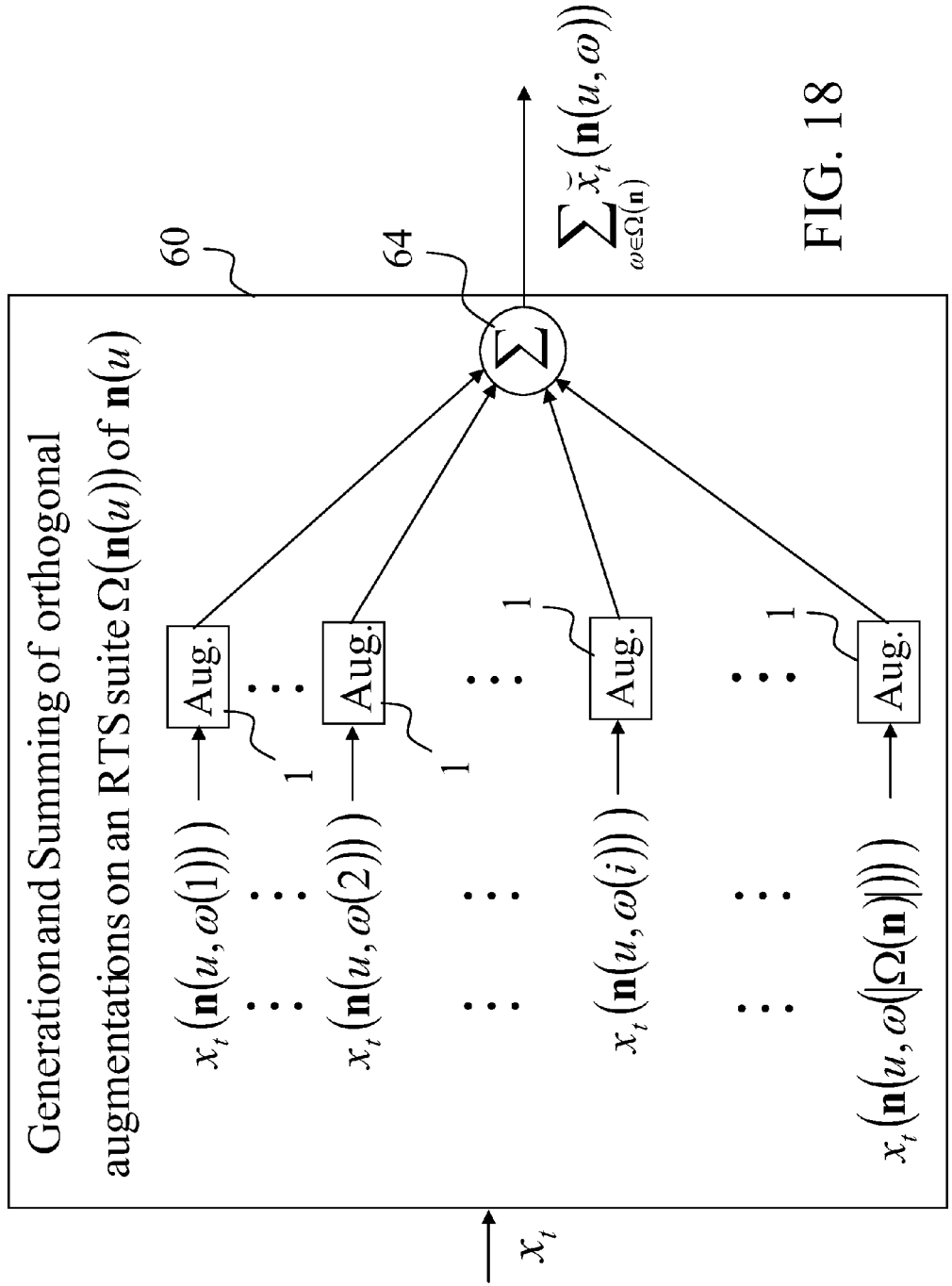

FIG. 18 shows generation & summing of orthogonal expansions on a rotation/translation/scaling (RTS) suite of a subvector n(u) of n. Let $\Omega(n)=\{w(i), i=1, \ldots, |\Omega(n)|\}$ be a set of rotations, translations, and scalings as described in FIG. 17. $\Omega(n)$ is called a RTS suite of n, and $|\Omega(n)|$ denotes the number of elements in $\Omega(n)$. Although w(i) is a rotation, translation, or scaling of n, this dependence on n is not indicated in the symbol w(i) for notational simplicity. As n is rotated, translated or scaled into w(i), n(u) as a subvector of n is rotated, translated or scaled into a subvector of w(i). This subvector of w(i) is denoted by n(u,w(i)). The set $\{n(u,w(i)), i=1, \ldots, |\Omega(n)|\}$ of such subvectors of w(i), i=1, ..., $|\Omega(n)|$, is denoted by $\Omega(n(u))$ and called a RTS suite of n(u). Note that $|\Omega(n(u))|=|\Omega(n)|$. The set $\{x_t(n(u,w(i))), i=1, \ldots, |\Omega(n)|\}$, which is also denoted by $\{x_t(n(u,w)), w \in \Omega(n)\}$, is called the RTS suite of $x_t(n(u))$ on $\Omega(n(u))$. In generation and summing of orthogonal expansions on an RTS suite $\Omega(n(u))$, vectors $x_t(n(u,w))$ in the RTS suite of $x_t(n(u))$ on $\Omega(n(u))$, first go through orthogonal expansion 1. The resultant orthogonal expansions $\check{x}_t(n(u,w(i)))$ are then added up to form the sum $$\sum_{\omega \in \Omega(n)} \check{x}_t(n(u,\omega))$$

on the RTS suite $\Omega(n(u))$ of n(u).

FIG. 19 shows expansion correlation matrices (ECMs), C(n(u)) and D(n(u)), on a rotation/translation/scaling (RTS)

suite $\Omega(n(u))$ of the subvector $n(u)$ of a feature vector index n. $C(n(u))$ and $D(n(u))$ are defined by the pairs, $(x_t(n(u,w)), r_t(n))$, $w \in \Omega(n)$, $t=1, \ldots, T$, with weight matrices $W_t(n(u), T)$. Note that $[C'(n(u)) D'(n(u))]'$ can be viewed as a single expansion correlation matrix.

Figure 20:
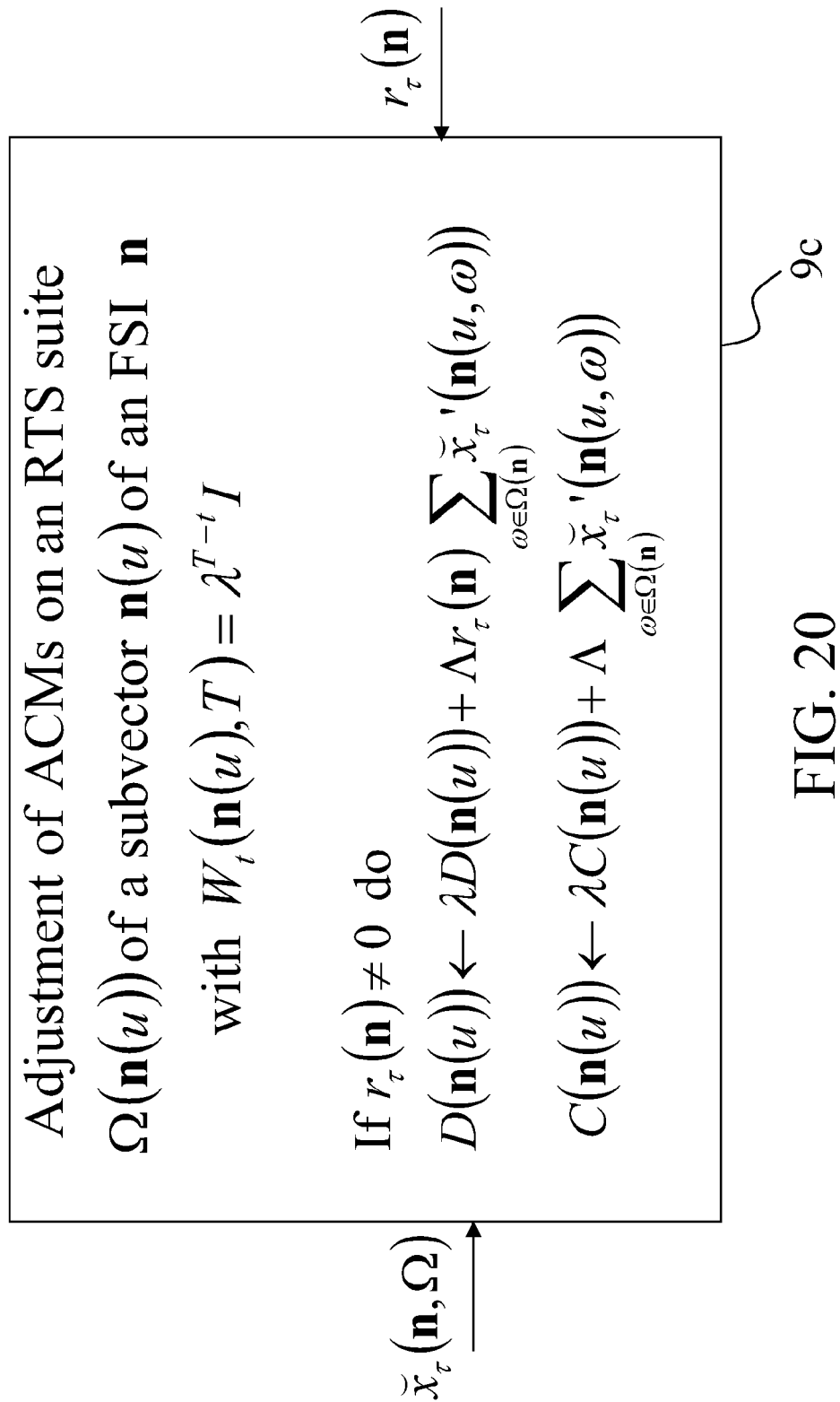

FIG. 20 shows, if the label $r_\tau(n(u)) \neq 0$, how the expansion correlation matrices (ECMs), $C(n(u))$ and $D(n(u))$, defined in FIG. 19, are adjusted to learn a pair $(x_\tau(n(u,w)), r_\tau(n))$, for the weight matrix $W_t(n(u), T) = \lambda^{T-t} I$. If $r_\tau(n)=0$, the pair $(x_\tau(n(u)), r_\tau(n))$ is discarded. $\lambda$ is a forgetting factor, and $\Lambda$ is a scaling constant.

Figure 21:
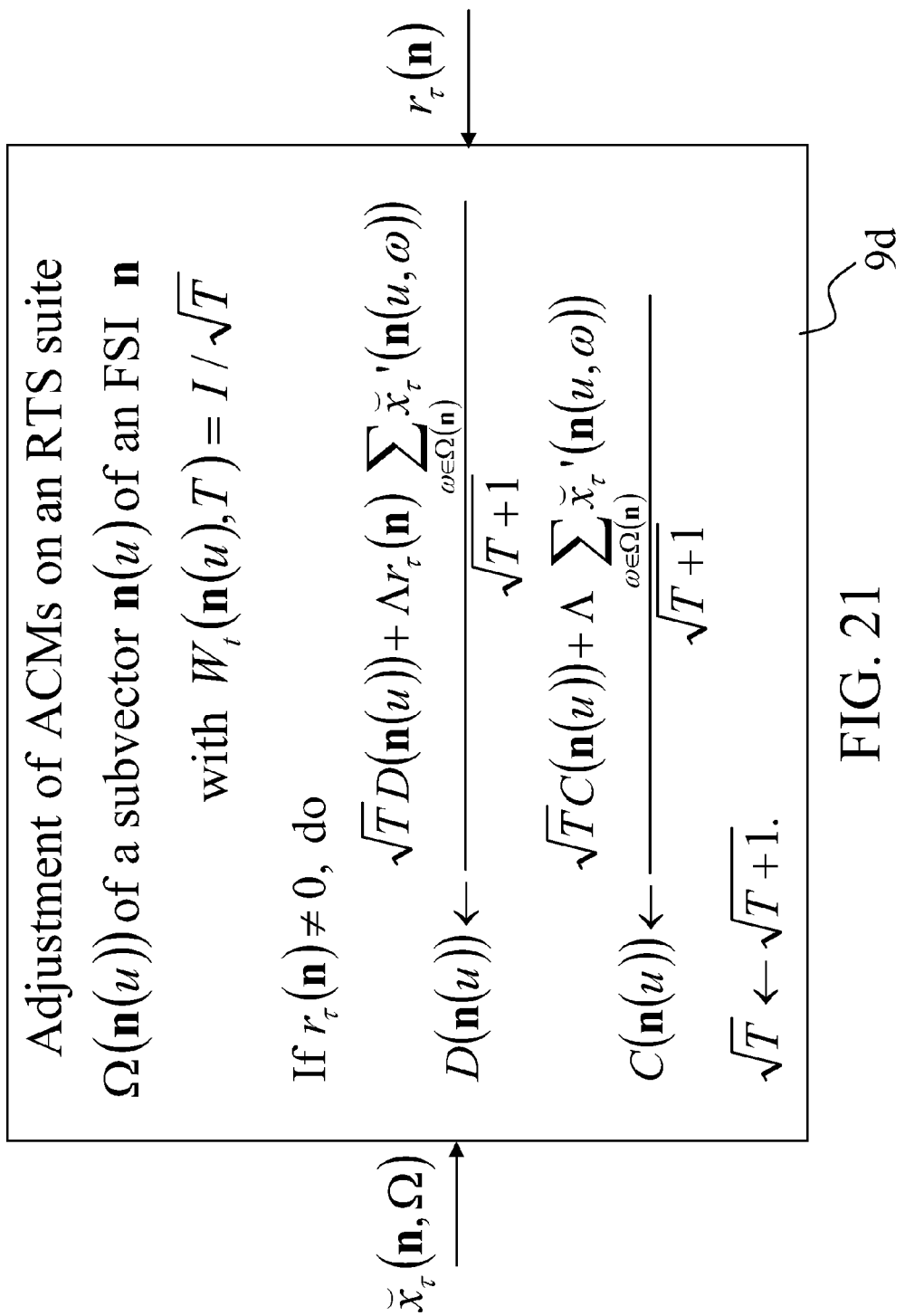

FIG. 21 shows, if the label $r_\tau(n(u)) \neq 0$, how the expansion correlation matrices (ECMs), $C(n(u))$ and $D(n(u))$, defined in FIG. 19, are adjusted to learn a pair $(x_\tau(n(u,w)), r_\tau(n))$ for the weight matrix $W_t(n(u), T) = (1/\sqrt{T}) I$. The number $\sqrt{T}$ is updated to $\sqrt{T+1}$ after a pair is learned. If $r_\tau(n)=0$, the pair $(x_\tau(n(u)), r_\tau(n))$ is discarded, and the number $\sqrt{T}$ is not updated.

FIG. 22 shows that a general orthogonal expansion $\check{x}(n,\Omega)$ on a rotation/translation/scaling (RTS) suite $\Omega(n)$ of an FSI n has sums $\tau_{w \in \Omega(n)} \check{x}_t(n(u,w))$, $u=1, 2, \ldots, U$, of orthogonal expansions on an RTS suite $\Omega(n(u))$, $u=1, 2, \ldots, U$, as subvectors, general expansion correlation matrices, $C(n)$ and $D(n)$, on the RTS suite $\Omega(n)$ has expansion correlation matrices, $C(n(u))$ and $D(n(u))$, $u=1, 2, \ldots, U$, on an RTS suite $\Omega(n(u))$, $u=1, 2, \ldots, U$, as submatrices. $C(n(u))$ and $D(n(u))$ are defined in FIG. 19. Note that $n(u)$, $u=1, \ldots, U$, are subvectors of the FSI n. It is understood that an orthogonal expansion of $x_t(n)$ is a special case of a general orthogonal expansion of $x_t(n)$ on $\Omega(n)$, and an expansion correlation matrix on the RTS suite $\Omega(n)$ (defined in FIG. 19, where $n(u)=n$) is a special case of a general expansion correlation matrix on the RTS suite $\Omega(n)$.

Figure 23:
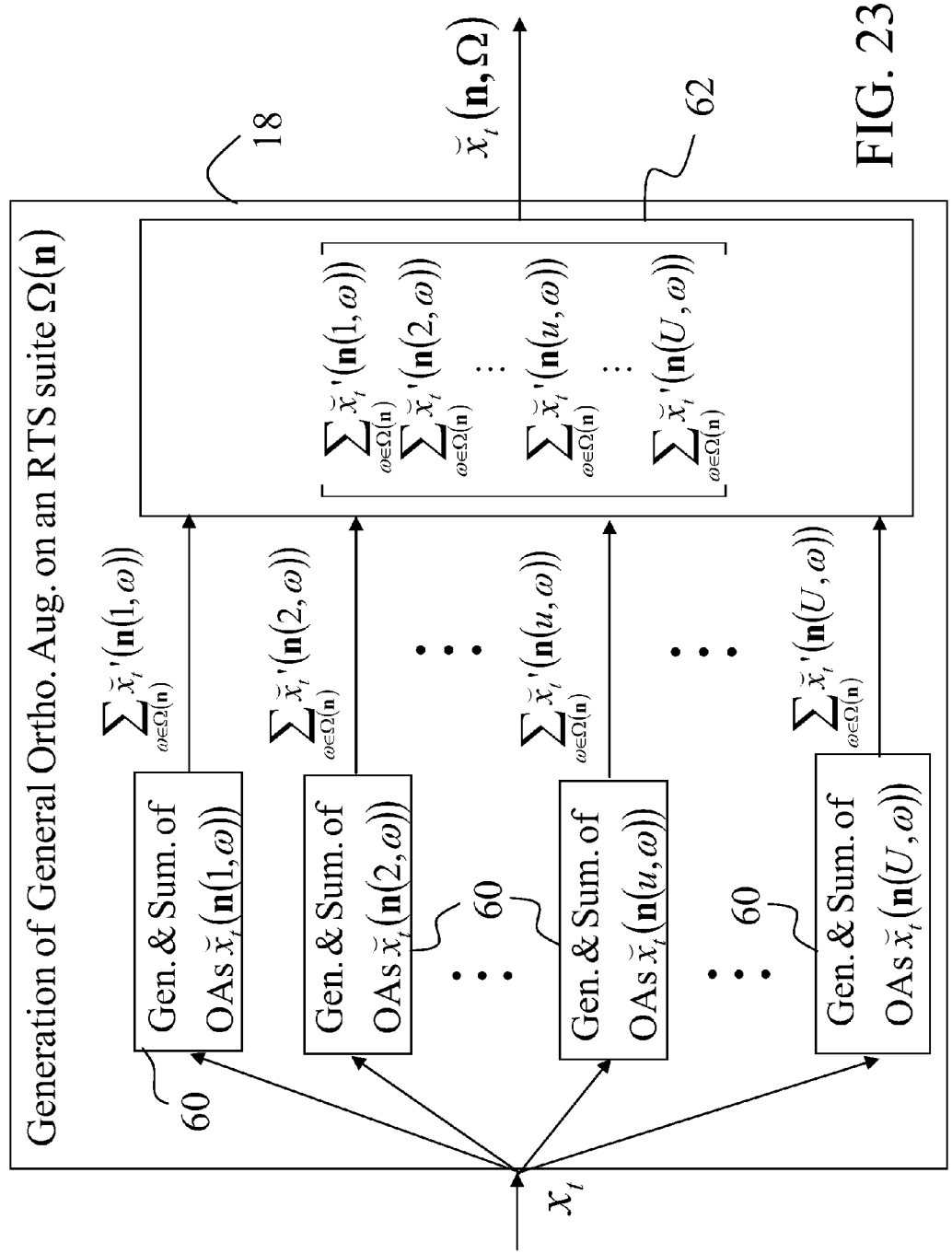

FIG. 23 shows how a GOE (general orthogonal expansion) $\check{x}_t(n,\Omega)$ on an RTS suite $\Omega(n)$, is generated. $\check{x}_t(n,\Omega)$ is defined in FIG. 22.

Figure 24:
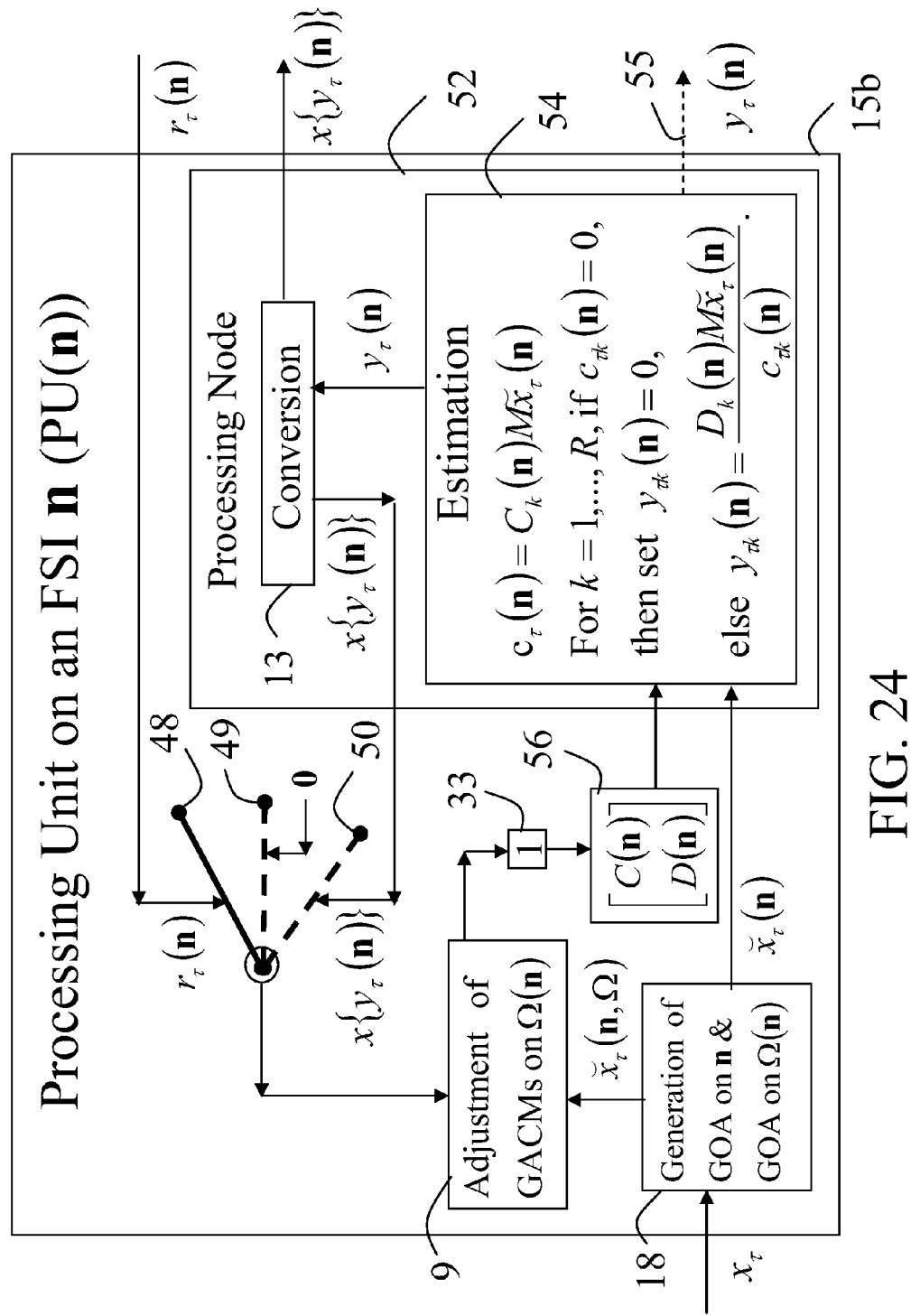

FIG. 24 shows an example processing unit (PU) on a feature subvector index n (PU(n)) that has the capability to recognize rotated, translated and scaled causes (e.g., objects) in an exogenous feature vector. In performing retrieval, a GOE (general orthogonal expansion) $\check{x}_t(n)$ defined in FIG. 8 and a GOE $\check{x}_t(n,\Omega)$ on an RTS suite $\Omega(n)$ (defined in FIG. 22) are generated by the expansion means 18. $\check{x}_t(n)$ is then processed by the estimation means 54, using the general expansion correlation matrices, $C(n)$ and $D(n)$ on $\Omega(n)$ (defined in FIG. 22), from the storage 56, into a representation of a probability distribution $y_\tau(n)$ of a label $r_\tau(n)$ of $x_\tau(n)$. The conversion means 13 converts $y_\tau(n)$ into a ternary vector $x\{y_\tau(n)\}$, which is an output of the PU. If a representation of a probability distribution of $x_\tau(n)$ is needed for use outside the PU, $y_\tau(n)$ is also output by the PU. The dashed line in the arrow 55 indicates "output as needed."

If a label $r_\tau(n) \neq 0$ of $x_\tau(n)$ from outside the PU is available for learning, and learning $x_\tau(n)$ and $r_\tau(n)$ is wanted, supervised learning is performed by the PU. In supervised learning, the label $r_\tau(n) \neq 0$ is received through a lever represented by a thick solid line with a solid dot in the position 48 by an adjustment means 9, which receives also $\check{x}(n,\Omega)$ and uses a method of adjusting expansion correlation matrices (ECMs) on an RTS suite $\Omega(n(u))$ such as those depicted in FIG. 20 and FIG. 21 and assembles the resultant ECMs $C(n(u))$ and $D(n(u))$ on $\Omega(n(u))$, $u=1, \ldots, U$, into general ECMs on the RTS suite $\Omega(n)=\{\Omega(n(1)), \Omega(n(2)), \ldots, \Omega(n(U))\}$, $$C(n)=[C(n(1))C(n(2))\ldots C(n(U))]$$

$$D(n)=[D(n(1))D(n(2))\ldots D(n(U))]$$

These $C(n)$ and $D(n)$ are then stored, after a one-numbering delay (or a unit-time delay) 33, in the storage 56, from which they are sent to the estimation means 54.

Supervised learning means is described as follows: If a label $r_\tau(n) \neq 0$ of $x_\tau(n)$ from outside PU(n) is available and learning $x_\tau(n)$ and $r_\tau(n)$ is wanted, supervised learning means of the PU for adjusting GECMs (general expansion correlation matrices) on $\Omega(n)$ performs supervised learning by receiving a GOE (general orthogonal expansion) $\check{x}_t(n)$ generated by expansion means 2 and a label $r_\tau(n) \neq 0$ of $x_\tau(n)$, provided from outside the PAM, and using adjustment means 9 to adjust each ECM block in GECMs on $\Omega(n)$.

If a label $r_\tau(n)$ of $x_\tau(n)$ from outside the PU is unavailable but learning $x_\tau(n)$ is wanted, unsupervised learning is performed by the PU. In this case, the lever (shown in position 48 in FIG. 13) should be in the position 50. The feature subvector $x_\tau(n)$ is first processed by the expansion means 2, estimation means 54, conversion means 13 as in performing retrieval described above. The resultant ternary vector $x\{y_\tau(n)\}$ is received, through the lever in position 50, and used by the adjustment means 9 as the label $r_\tau(n)$ of $x_\tau(n)$. The adjustment means 9 receives $\check{x}_t(n,\Omega)$ also and uses a method of adjusting ECMs such as those depicted in FIG. 20 and FIG. 21 and assembles the resultant ECMs $C(n(u))$ and $D(n(u))$ on $\Omega(n(u))$, $u=1, \ldots, U$, into general ECMs on $\Omega(n)$, $$C(n)=[C(n(1))C(n(2))\ldots C(n(U))]$$

$$D(n)=[D(n(1))D(n(2))\ldots D(n(U))]$$

These $C(n)$ and $D(n)$ on $\Omega(n)$ are then stored, after a one-numbering delay (or a unit-time delay) 33, in the storage 56, from which they are sent to the estimation means 54.

Unsupervised learning means is described as follows: If a label $r_\tau(n)$ of $x_\tau(n)$ from outside PU(n) is unavailable but learning $x_\tau(n)$ is wanted, unsupervised learning means of the PU for adjusting GECMs (general expansion correlation matrices) on $\Omega(n)$ performs unsupervised learning by receiving a GOE (general orthogonal expansion) $\check{x}_t(n,\Omega)$ on $\Omega(n)$ generated by expansion means 18 and the ternary vector $x\{y_\tau(n)\}$ (generated in processing $x_\tau(n)$ in performing retrieval) as the label $r_\tau(n)$ of $x_\tau(n)$ and using adjustment means 9 to adjust each ECM block in GECMs on $\Omega(n)$.

If no learning is to be performed by PU(n), the lever represented by a thick solid line with a solid dot is placed in the position 49, through which 0 is sent as the label $r_\tau(n)$ of $x_\tau(n)$ to the adjustment means 9, which then keeps $C(n)$ and $D(n)$ unchanged or stores the same $C(n)$ and $D(n)$ in the storage 56 after a one-numbering delay (or a unit-time delay).

Figure 25:
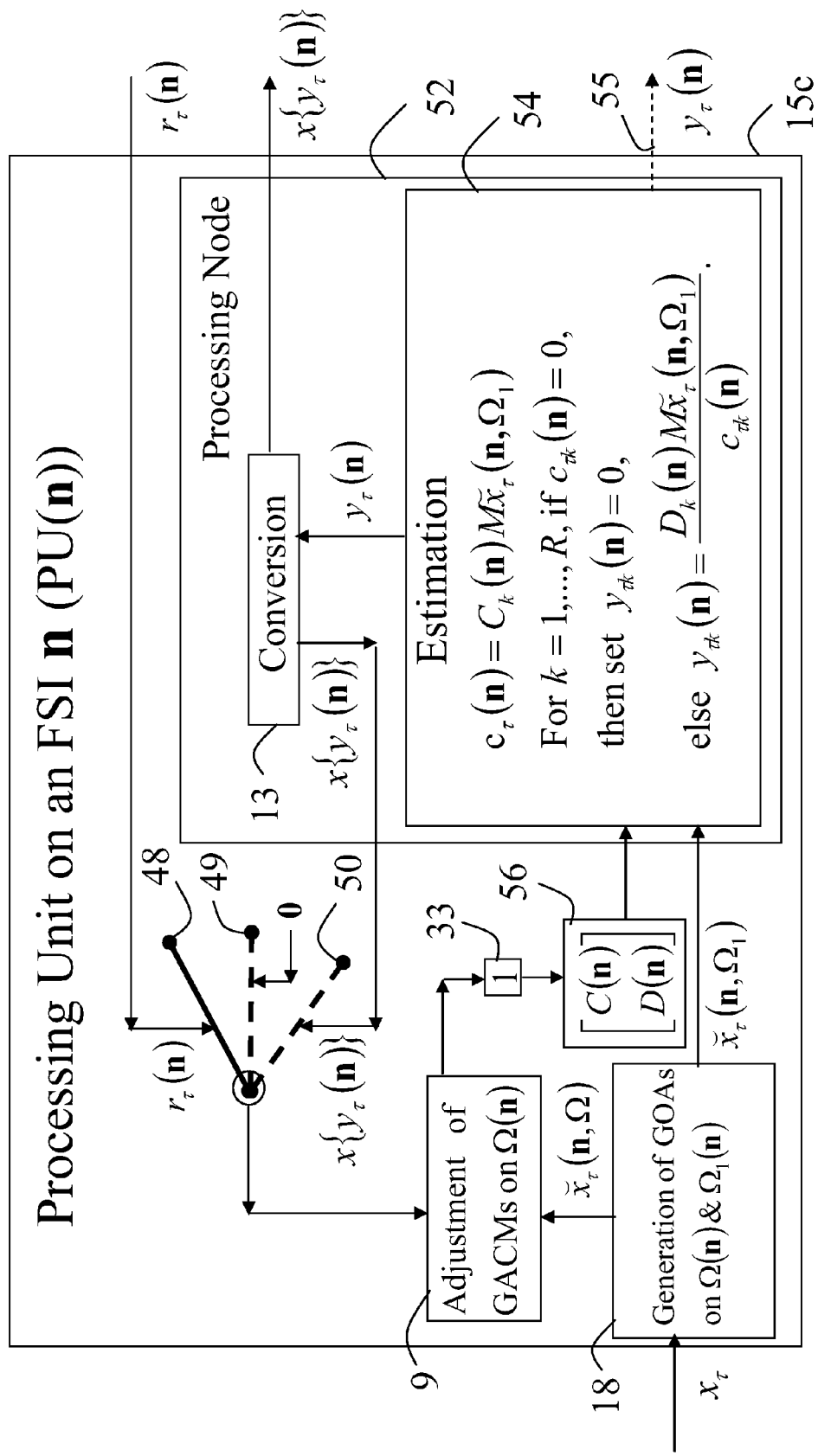

FIG. 25 is the same as FIG. 24 except that in addition to the GOE $x_\tau(n,\Omega)$ on the RTS suite $\Omega(n)$, the GOE $\check{x}_\tau(n,\Omega_1)$ on another RTS suite $\Omega_1(n)$ is generated by the expansion means 18. $\check{x}_\tau(n,\Omega_1)$ is sent to and processed by the estimation means 54. The purpose of processing $\check{x}_\tau(n,\Omega_1)$ instead of $\check{x}_\tau(n)$ is to recognize object and causes that are more rotated, translated and scaled.

FIG. 26 shows a general orthogonal expansion $\check{x}_t^{l-1}(n)$ from FIG. 8, CGECMs (common general expansion correlation matrices), $C^l$ and $D_l$, on all RTS suites $\Omega(n^l)$ in layer l under the assumption that all FSIs $n^l$ (including their subvectors $n^l(u)$) are translations of one another, and for simplicity and clarity in this disclosure, dim $n^l(u)=m$, for $u=1, \ldots, U$. $C^l(n^l(u))$ and $D^l(n^l(u))$ are ECMs on an RTS suite $\Omega(n^l(u))$ defined in FIG. 19. $1^l, 2^l, \ldots, N^l$ are feature subvector indices for PUs in layer l. Note that $[C^{l\prime} D^{l\prime}]'$ can be viewed as a single CGECM on all RTS suites $\Omega(n^l)$ in layer l.

Figure 27:
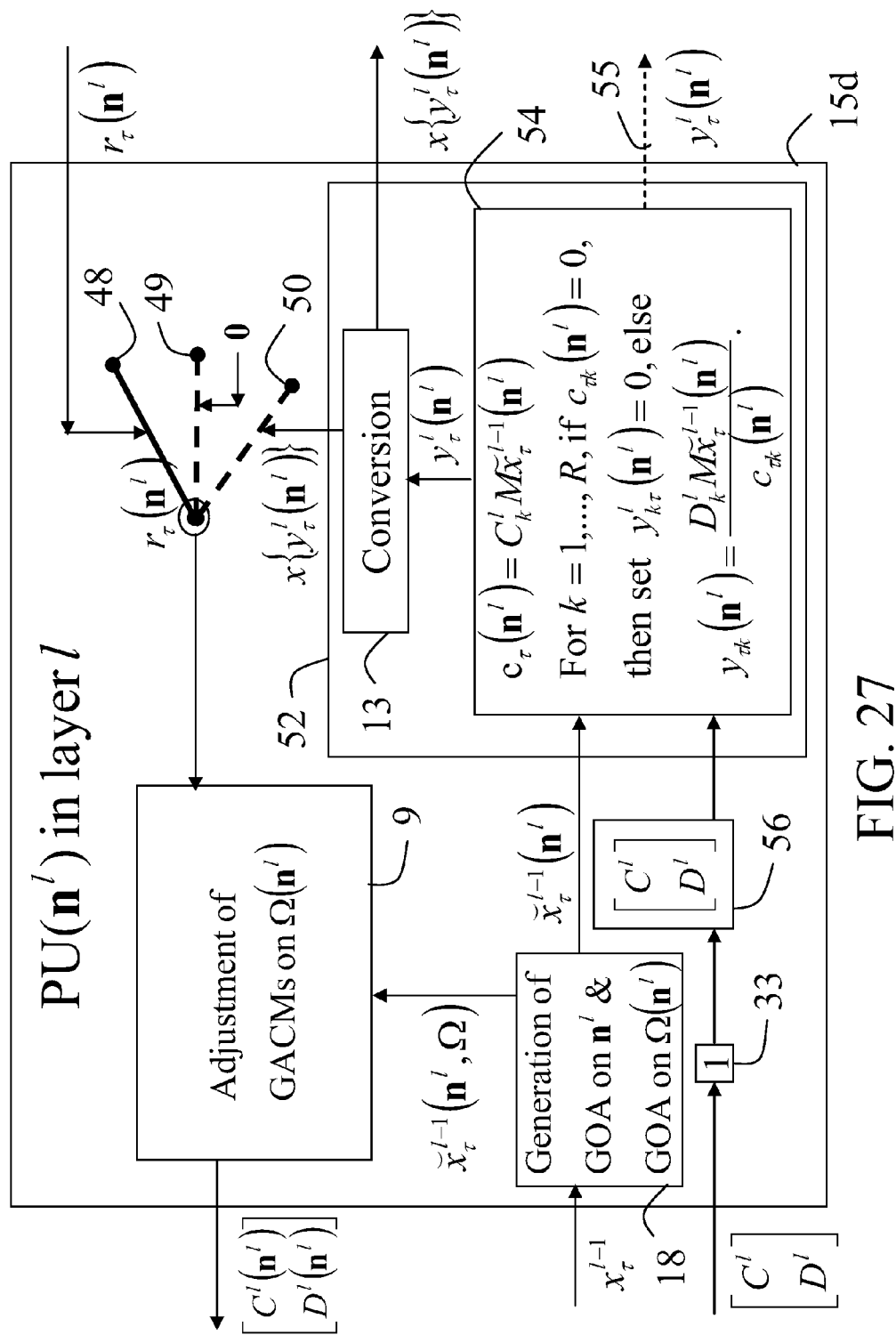

FIG. 27 is the same as FIG. 24 except that in FIG. 27, the GECMs $[C^{l\prime}(n^l) D^{l\prime}(n^l)]'$ on $\Omega(n^l)$ generated by the adjustment means 9 are output from PU($n^l$), and $C^l$ and $D^l$, which denote CGECMs (common general expansion correlation matrices) on all RTS suites $\Omega(n^l)$ in layer l, are input to PU($n^l$) and after a unit-time delay (or one-numbering delay), stored in the storage 56.

Figure 28:
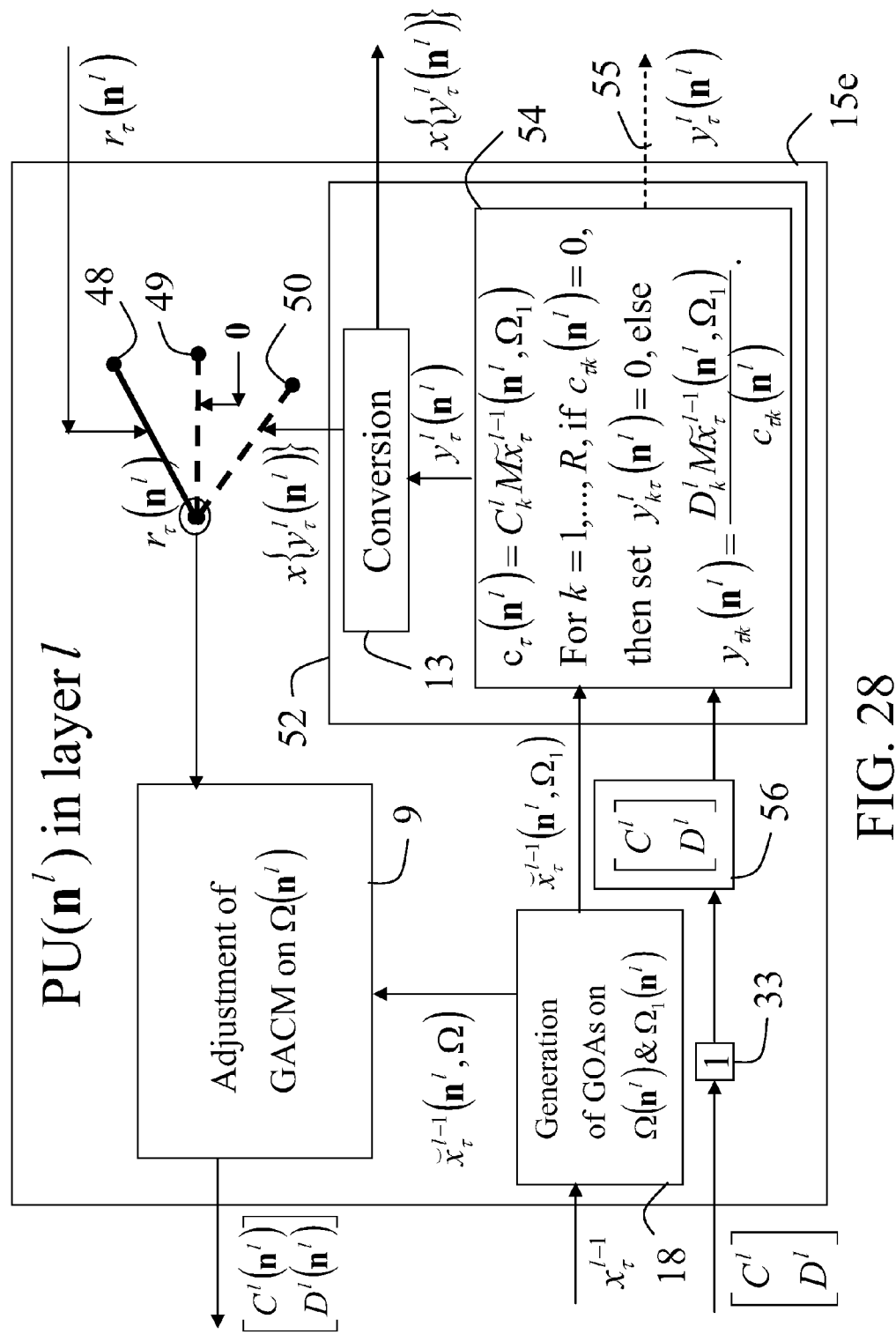

FIG. 28 is the same as FIG. 25 except that in FIG. 28, the GECMs [$C^{lh}(n^l) D^{lh}(n^l)$]' on $\Omega(n^l)$ generated by the adjustment means 9 are output from PU($n^l$), and $C^l$ and $D^l$, which denote CGECMs (common general expansion correlation matrices) on all RTS suites $\Omega(n^l)$ in layer l, are input to PU($n^l$) and after a unit-time delay (or one-numbering delay), stored in the storage 56.

Figure 29:
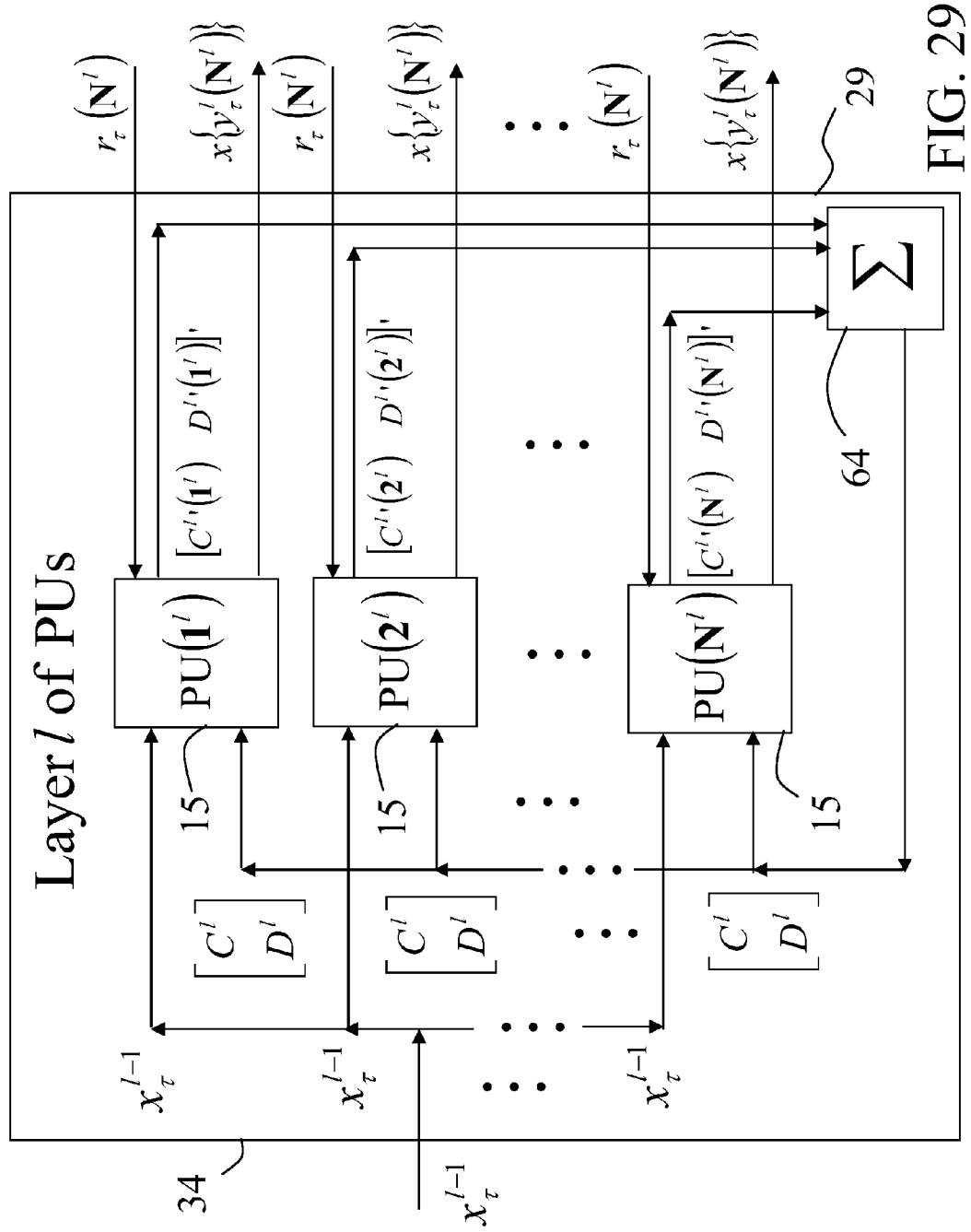

FIG. 29 how the GECMs [$C^{lh}(n^l) D^{lh}(n^l)$]' on $\Omega(n^l)$ for $n^l=1^l$, $2^l, \ldots, N^l$, which are feature subvector indices for PUs in layer l, are output from the PUs and summed up 64 to obtain the CGECM [$C^{lh} D^{lh}$]' on all RTS suites $\Omega(n^l)$ in layer l and how the CGECM [$C^{lh} D^{lh}$]' is distributed to each PU in layer l.

FIG. 30 shows one way to combine $y_\tau(m_i)=2p_\tau(m_i)-1$, $i=1, \ldots, n$, that are representations of probability distributions of a common label $r_T$, into a representation $\hat{P}_T$ of a probability distribution of said common label. Here, $m_1, m_2, \ldots, m_n$ are FSIs, which may come from a single layer or from different layers of PUs, but the labels, $r_\tau(m_1), r_\tau(m_2), \ldots, r_\tau(m_n)$, of the feature vectors, $x_\tau(m_1), x_\tau(m_2), \ldots, x_\tau(m_n)$, on these FSIs are equal. Recall that $p_{\tau k}(m_1)$ denotes the probability that the k-th component $r_{\tau k}$ of the label $r_T$ of $x_\tau(m_1)$ is equal to 1, and that $p_{\tau k}(m_1)=(y_{\tau k}(m_1)+1)/2$, where $y_{\tau k}(m_1)$ is generated by the estimation means in the PU on $m_1$. The R-dimensional vector $\hat{P}_\tau=[\hat{P}_{\tau 1} \ldots \hat{P}_{\tau R}]'$ is a representation of a probability distribution of $r_\tau$.

FIGS. 31-38 are concerned with multiple adjustments of GECMs on an FSI n or on an RTS suite $\Omega(n)$ in PU(n) for each exogenous feature vector $x_t^{ex}$. For an exogenous feature vector $x_t^{ex}$, the multiple adjustments are completed between the arrival of $x_t^{ex}$ and the arrival of $x_{t+1}^{ex}$. The expansion means, estimation means, conversion means, and adjustment means in PU(n) all function multiple times for each exogenous feature vector. If a pseudo-random number generator is used in the conversion means, its outputs form bipolar binary pulse trains for each exogenous feature vector. They help eliminate possible pattern recognition errors due to randomness caused by the pseudo-random number generator.

FIG. 31 shows multiple generations of GOEs and multiple/ group adjustments of GECMs on an FSI for each exogenous feature vector in supervised learning. In FIG. 31, the j-th feature subvector input to PU(n) is denoted by $x_t(n,j)$ while an exogenous feature vector $x_t^{ex}$ is received and held constant before the next exogenous feature vector is received. As usual, the GOE of $x_t(n,j)$ is denoted by $\check{x}_t(n,j)$. If the FSI n of PU(n) has subvectors (also called subvector indices), $n(1), \ldots, n(U)$, then $\check{x}_t(n(1),j), \ldots, \check{x}_t(n(U),j)$ are orthogonal expansions and are block components of the GOE $\check{x}_t(n,j)$. C(n(u)) and D(n(u)) for u=1, U are defined in the figure and are the block columns of the GECMs, C(n) and D(n). In the definition of C(n(u)) and D(n(u)), labels $r_\tau(n)$ are not zero, because if a label $r_\tau(n)$ is zero, the corresponding pair $\check{x}_\tau(n,j)$ and $r_\tau(n)$ is discarded. The weight factor 1/J is an example. Other weight factor can be used. There are two ways to adjust C(n(u)) and D(n(u)). First, they are adjusted for each $\check{x}_t(n,j)$, and hence are adjusted J times for each exogenous feature vector $x_t^{ex}$. Second, C(n(u)) and D(n(u)) are adjusted only once, after $\check{x}_t(n,j), j=1, \ldots, J$, are all received and $$\frac{1}{J}\sum_{j=1}^{J} \check{x}_\tau(n, j)$$

is obtained. In the first way, $\check{x}_\tau(n,j), j=1, \ldots, J$, have been generated with different GECMs by PUs. In the second way, all PUs in the PAM keep their GECMs unchanged for $j=1, \ldots, J$. The first way is called multiple adjustments of GECMs, and the second a group adjustment of the same. To faciliate multiple adjustments, we need a delay device in each PU that holds the GECMs for 1/J unit of time, before sends them to the storage 56.

Figure 32:
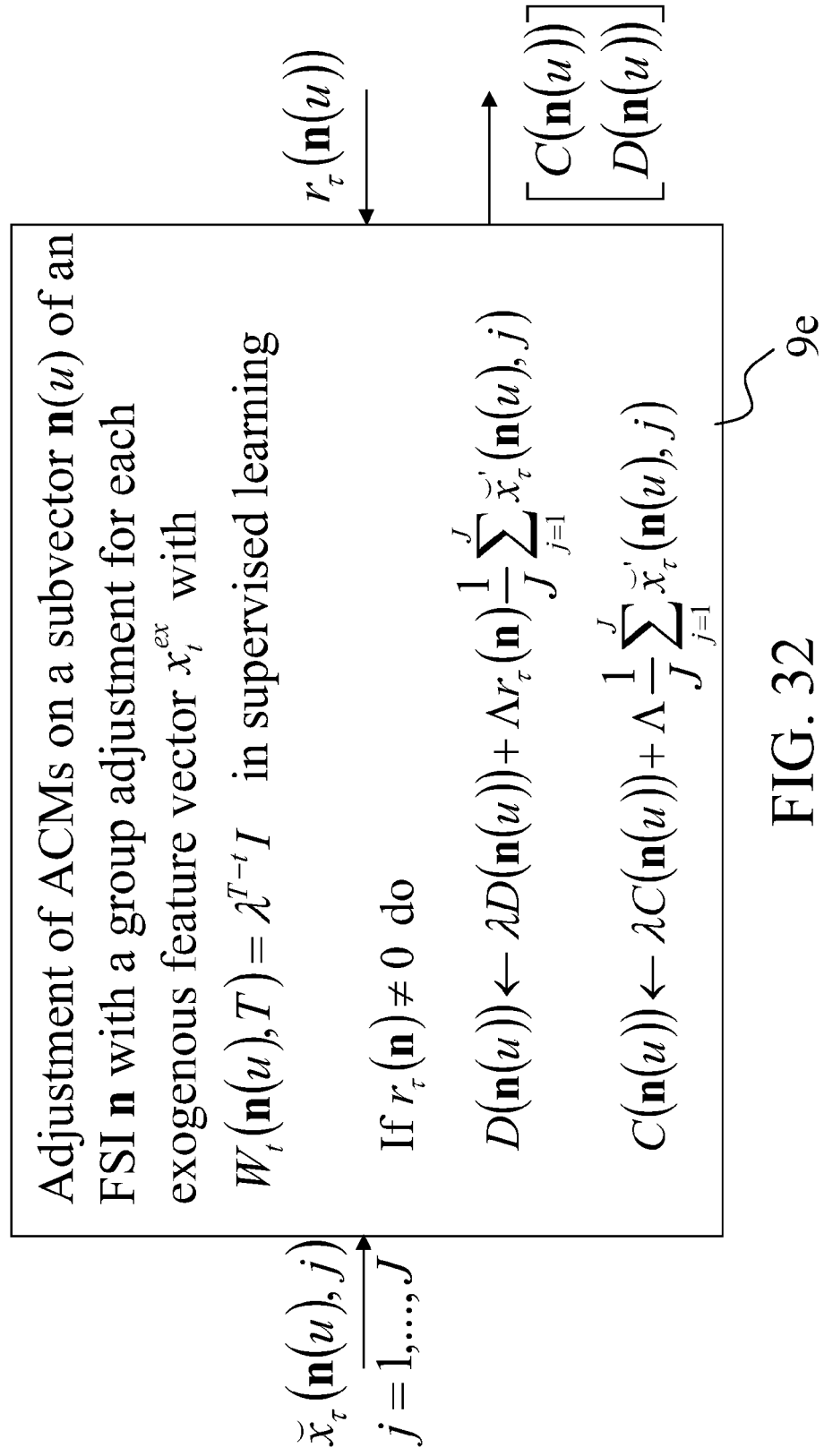

FIG. 32 shows how a group adjustment of ECMs on an FSI for each exogenous feature vector in supervised learning is performed for $W_t(n(u), j)=\lambda^{T-t}I$. These ECMs form the block columns of the GECMs on n as shown in FIG. 31.

FIG. 33 shows multiple generations of GOEs and a group adjustment of GECMs on an FSI for each exogenous feature vector in unsupervised learning. For an exogenous feature vector $x_t^{ex}$, the J feature subvectors, $x_t(n,j), j=1, \ldots, J$, input to PU(n) share the same label to be generated by the PU. The ternary vector $x\{y_t(n,j)\}$ that is generated from converting the most "informative" probability distribution $p_t(n,j)$ should be used as the common label. The variance of a random variable with the probability distribution $p_{tk}(n,j)$ is $p_{tk}(n,j)(1-p_{tk}(n,j))$. The sum of variances, $$\sum_{k=1}^{K} p_{tk}(n, j)(1 - p_{tk}(n, j)),$$

is a measure of variability of $p_t(n,j)$. Roughly speaking, the more variability a random variable has, the less information it contains. Therefore, the minimizer $p_t(n,j^*)$ of the sum of variances is most informative, and $x\{y_t(n,j^*)\}$ should be used as the common label of the J feature subvectors.

Figure 34:
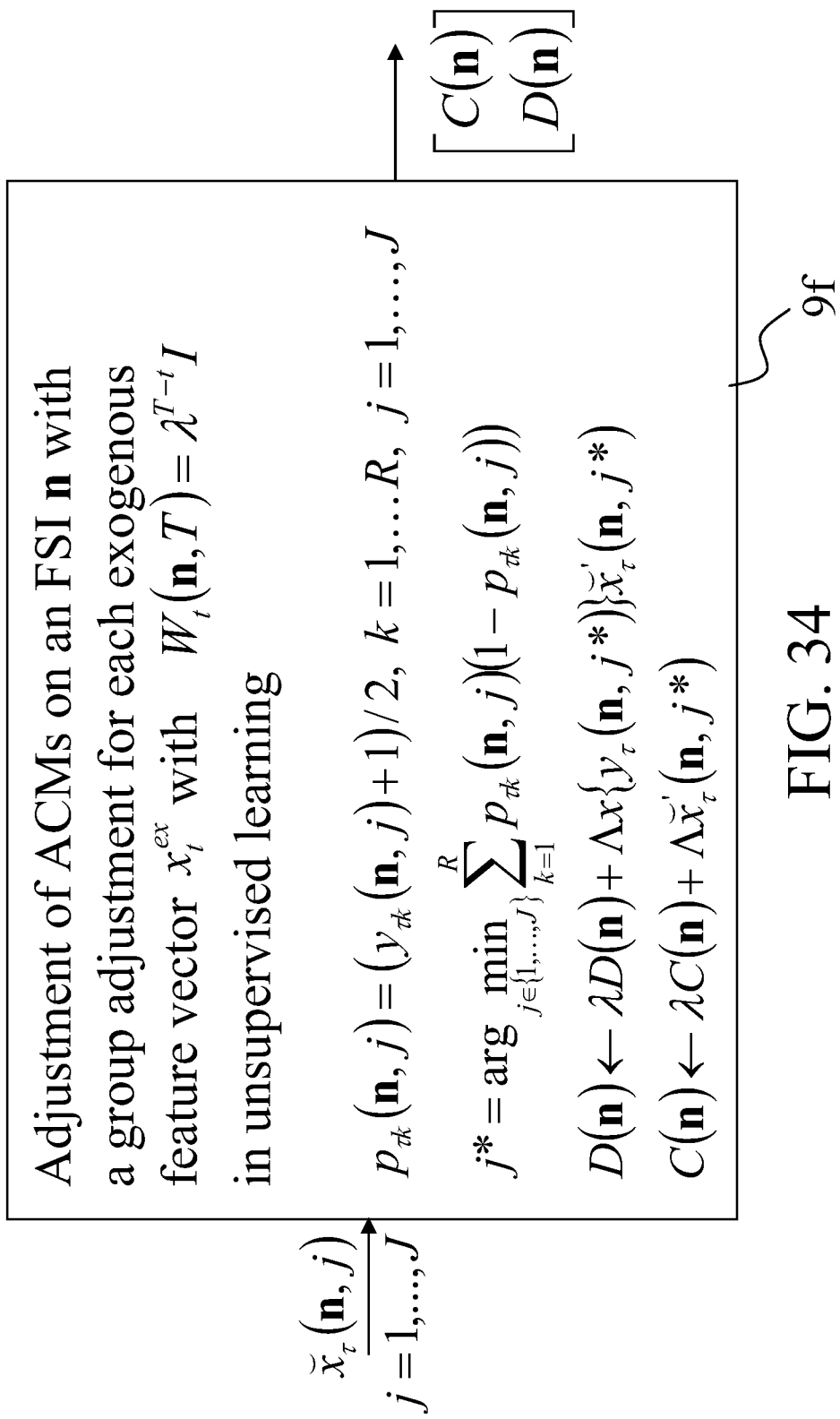

FIG. 34 shows how a group adjustment of GECMs on an FSI for each exogenous feature vector, which are shown in FIG. 33, is performed in unsupervised learning for $W_t(n(u), j)=\lambda^{T-t}I$.

FIG. 35 shows multiple generations of GOEs and multiple/ group adjustment of GECMs on an RTS suite $\Omega(n)$ of an FSI n for each exogenous feature vector in supervised learning. In FIG. 35, the j-th feature subvector input to PU(n) is denoted by $x_t(n,j)$ while an exogenous feature vector $x_t^{ex}$ is received and held constant before the next exogenous feature vector arrives. The GOE on $\Omega(n)$ of $x_t(n,j)$ is denoted by $\check{x}_t(n,\Omega,j)$. In the definition of C(n) and D(n), labels $r_\tau(n)$ are not zero, because if a label $r_\tau(n)$ is zero, the corresponding pair, $\check{x}_\tau(n,j)$ and $r_\tau(n)$, is discarded. The weight factor 1/J is an example. Other weight factor can be used.

Figure 36:
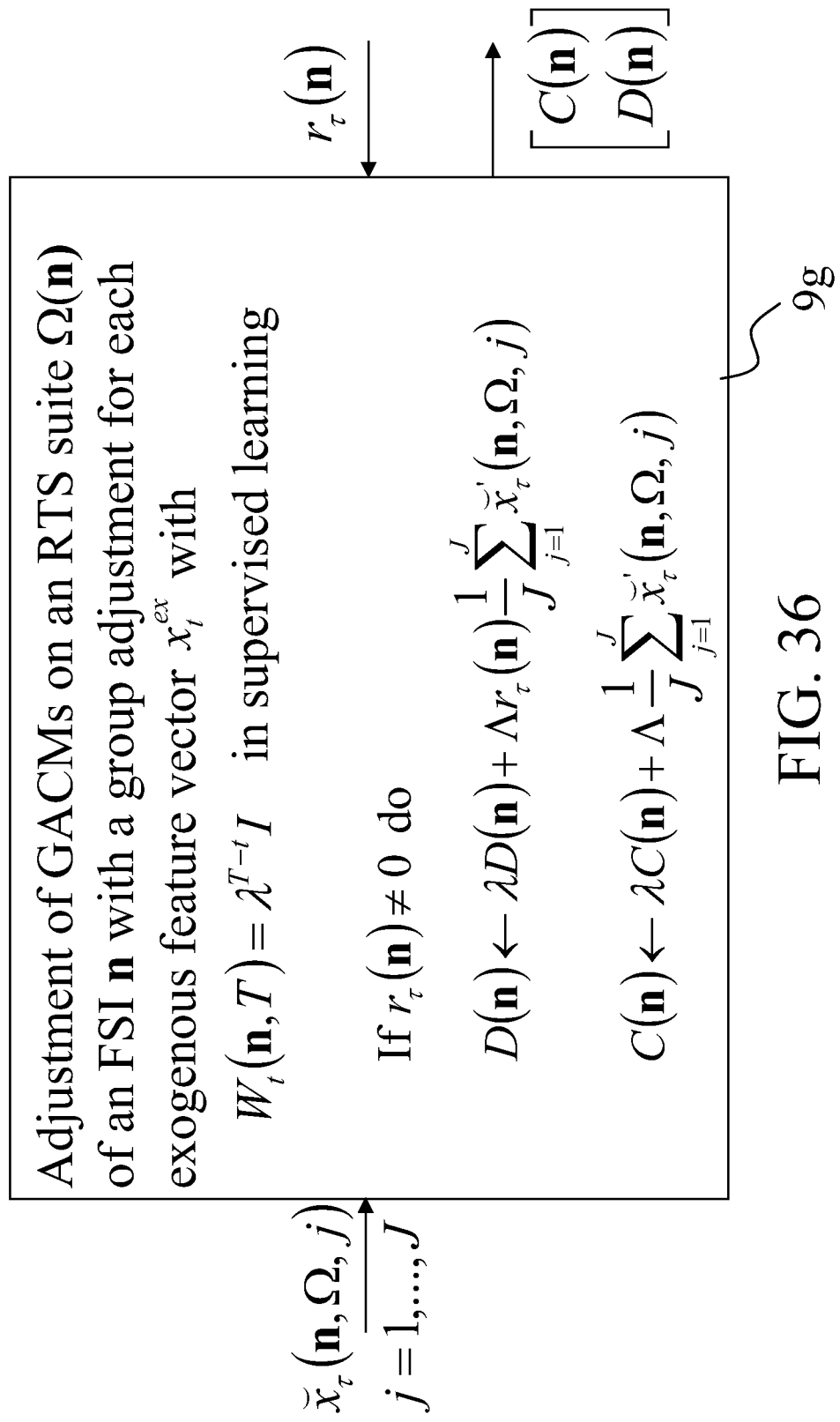

FIG. 36 shows how a group adjustment of GECMs on an RTS suite $\Omega(n)$ of an FSI n for each exogenous feature vector in supervised learning is performed for $W_t(n(u), j)=\lambda^{T-t}I$.

FIG. 37 shows multiple generations of GOEs and multiple/ group adjustment of GECMs on an RTS suite $\Omega(n)$ of an FSI n for each exogenous feature vector in unsupervised learning. For an exogenous feature vector $x_t^{ex}$, the J feature subvectors, $x_t(n,j), j=1, \ldots, J$, input to PU(n) share the same label to be generated by the PU. See the remark concerning j* in the description of FIG. 33.

Figure 38:
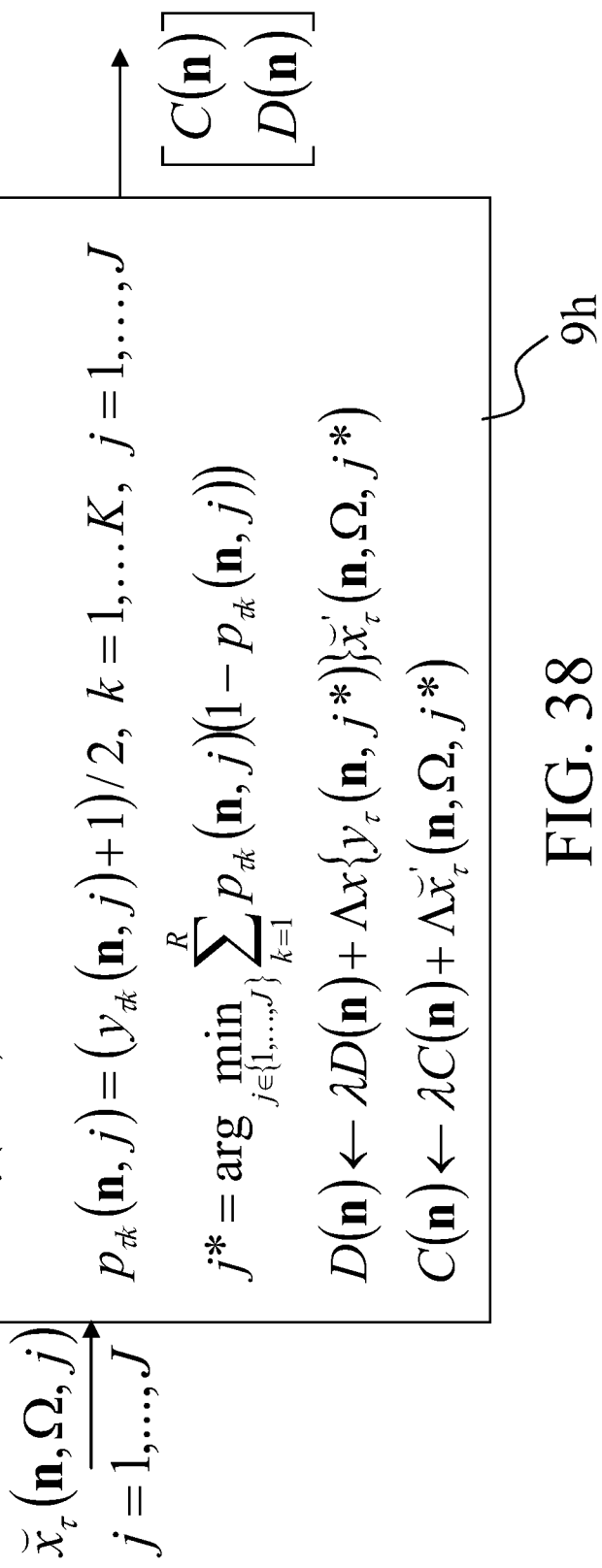

FIG. 38 shows how a group adjustment of GECMs on an RTS suite $\Omega(n)$ of an FSI n for each exogenous feature vector, which are shown in FIG. 37, is performed in unsupervised learning for $W_t(n(u),j)=\lambda^{T-t}I$.

DESCRIPTION OF PREFERRED EMBODIMENTS

In the terminology of pattern recognition, a feature vector is a transformation of a measurement vector, whose components are measurements or sensor outputs, and a label of said feature vector is a label of said measurement vector. A subvector of a feature vector is called a feature subvector. A feature subvector is itself a feature vector. As a special case, the transformation is the identity transformation, and the feature vector is the measurement vector. Example measurement vector are digital pictures, frames of a video, segments of speech, handwritten characters/words. This invention is mainly concerned with processing feature vectors and sequences of related feature vectors for detecting and recognizing spatial and temporal causes or patterns.

In this invention disclosure, a cortex-like learning machine, called a probabilistic associative memory (PAM), is disclosed that processes feature vectors or sequence of feature vectors, each feature vector being a ternary feature vector. Such feature vectors input to a PAM are called exogenous feature vectors. A PAM can be viewed as a new neural network paradigm, a new type of learning machine, or a new type of pattern recognizer. A PAM is a network of processing units (PUs). In a multilayer PAM with or without feedback connections, the vector input to a layer is a feature vector, because it is a transformation of exogenous feature vectors input to the PAM, and in turn a transformation of the measurement vector. In a PAM with (delayed) feedback connections (or feedback means), called a recurrent PAM, a feature vector input to layer/comprises a vector output from layer l-1 and vectors output and feedbacked from PUs in other layers. For example, if there is a feedback connection to layer 1, then an exogenous feature vector is not an entire feature vector input to layer 1, but only a subvector of said entire feature vector.

A PU may comprise expansion means, estimation means, conversion means, adjustment means, feedback means, supervised learning means, unsupervised learning means, and/or storage means. A feature vector input to a PU is usually a subvector of a feature vector input to the layer to which said PU belongs. The subvector input to a PU is called a feature subvector to distinguish it from the feature vector input to the layer to which said PU belongs. If no confusion is likely, the vector input to a PU is still called a feature vector. A label of a feature vector (or subvector) input to a PU in a PAM is a label of the subvector of the exogenous feature vector that is transformed in the PAM into said feature vector (or subvector) input to the PU. A PU may have one or both of two functions—retrieving the label of a feature subvector from the memory (i.e., expansion correlation memories or general expansion correlation memories disclosed in this invention) and learning a feature subvector and its label that is either provided from outside the PU (in supervised learning) or generated by the PU itself (in unsupervised learning). In performing retrieval, a feature subvector input to a PU is first expanded into a general orthogonal expansion by the expansion means (to be described later on). The general orthogonal expansion is then processed by the estimation means, using the memory from the storage, into a representation of a probability distribution of the label of said feature subvector. The conversion means converts said representation into a ternary vector, which is an output of the PU. If said representation is needed for use outside the PU, it is also output from the PU.

There are three types of PU according to how they learn—supervised PUs, unsupervised PUs, and supervised/unsupervised PU. A supervised PU performs supervised learning, if a label of a feature subvector input to the PU is provided from outside the PU (or the PAM) and learning is wanted. An unsupervised PU performs unsupervised learning if a label of a feature subvector input to the PU is not provided from outside the PU but learning the feature subvector is wanted. A supervised/unsupervised PU can perform both supervised learning and unsupervised learning. Both supervised and unsupervised learning follow a Hebb rule of learning. During the process of learning, supervised or unsupervised, the PU is said to be performing learning.

A PU with a general masking matrix (to be described later on) has good generalization capability. A PU that has learned feature subvectors on a rotation/translation/scaling suite (to be described later on) has good capability for recognizing rotated, translated and scaled patterns.

In this invention disclosure, prime ' denotes matrix transposition. Vectors whose components are 0's, 1's and −1's are called ternary vectors. Thus, the components of ternary vectors are elements of the ternary set, $\{-1, 0, 1\}$. Bipolar binary vectors are vectors whose components are elements of the binary set, $\{-1, 1\}$. Unipolar binary vectors are vectors whose components are elements of the binary set, $\{0, 1\}$. Since $\{-1, 1\}$ and $\{0, 1\}$ are subsets of the ternary set, bipolar and unipolar binary vectors are ternary vectors. For example, the bipolar binary vector $[1\ -1\ 1\ -1]'$ and the unipolar binary vector $[1\ 0\ 1\ 0]'$ are ternary vectors.

In the present invention disclosure, exogenous feature vectors input to a PAM are ternary vectors. 0's are usually used to represent unknown, unavailable, or corrupted part or parts of exogenous feature vectors. A vector whose components are the numberings (or subscripts) of the components of a feature vector that constitute a feature subvector and are ordered by the magnitudes of the numberings is called the feature subvector index of the feature subvector. For example, $[v_2\ v_4]'$ is a feature subvector of the feature vector $v=[v_1\ v_2\ v_3\ v_4]'$, and the feature subvector index of the feature subvector is $[2\ 4]'$. As usual, one of the subvectors of a vector is said vector itself. Labels in the present invention disclosure are also ternary vectors. 0's are usually used to represent unavailable, unknown or unused part or parts of labels. For instance, if we start out with labels with different dimensionalities (or different numbers of components) in an application, the dimensionalities of those with smaller dimensionalities can be increased by inserting 0's at the tops or bottoms as additional components so that all the labels have the same dimensionality in the application.

An orthogonal expansion and a general orthogonal expansion of a ternary vector are described in the next subsection. A general orthogonal expansion has, as its block column(s), at least one orthogonal expansion. An orthogonal expansion is a special case of a general orthogonal expansion. A sum or weighted sum of products of values of a vector-valued function evaluated at labels of feature subvectors and transposes of general orthogonal expansions of these feature subvectors (with the same feature subvector index) is called an expansion correlation matrix (on the feature subvector index). Note that if the vector-valued function of the label is one-dimensional, the feature subvector expansion correlation matrix is a vector, sometimes called a expansion correlation vector.

In the present invention disclosure, probabilities are usually subjective probabilities, and therefore variances; estimations; distributions and statements based on probabilities are usually those based on subjective probabilities, whether the word "subjective" is used or not, unless indicated otherwise.

There are many ways to convert discrete numbers into bipolar binary vectors. A standard way to convert a base-10 number into a unipolar binary number is to convert the base-10 representation into a base-2 representation. For instance, $(51)_{10}=(110011)_2$. A unipolar binary number can be converted into a bipolar binary vector by changing every 0 to −1. For instance, $(110011)_2$ is converted into [1 1 −1 −1 1 1]'. An example of converting a representation of a probability distribution, which is a R-vector with real-valued components, is illustrated in FIG. 11, wherein each component is approximated by a 3-component unipolar binary number before being converted into a bipolar binary number by changing every 0 to −1.

The Hamming distance between the standard unipolar binary representations of two integers is not "consistent" with their real value distance in the sense that a larger Hamming distance may correspond to a smaller real-value distance. For instance, consider $(10000)_2=(16)_{10}$, $(01111)_2=(15)_{10}$, and $(00000)_2=(0)_{10}$. The Hamming distance between 10000 and 01111 is 5, and the real-value distance between 15 and 16 is only 1. However, the Hamming distance between 00000 and 01111 is 4, but the real-value distance between 15 and 0 is 15.

In some applications of the disclosed invention, the "consistency" with Hamming distance is important to ensure that the disclosed pattern classifier has better generalization ability. For "consistency" with Hamming distance, "grey level unipolar binary representations" can be used. For instance, the integers, 6 and 4, are represented by the grey level representations, 00111111 and 00001111, instead of the unipolar binary numbers, 110 and 100, respectively. The 8-dimensional bipolar binary vectors representing these grey level unipolar binary representations are, respectively,

[−1 −1 1 1 1 1 1 1]'
[−1 −1 −1 −1 1 1 1 1]' n-dimensional bipolar binary vectors are also called n-component bipolar binary vectors. For example, the above two 8-dimensional vectors are also called 8-component bipolar binary vectors. An obvious disadvantage of such a bipolar binary vector representation is the large number of components required.

For reducing this disadvantage, the well-known Gray encoding can be used (John G. Proakis, *Digital Communication*, Third Edition, McGraw-Hill, 1995). The Gray code words of two adjacent integers differ by one component. For example, the Gray code words of the integers, 0 to 15, are, respectively, 0000, 0001, 0011, 0010, 0110, 0111, 0101, 0100, 1100, 1101, 1111, 1110, 1010, 1011, 1001, 1000. The corresponding bipolar binary vector representations are easily obtained as before. For example, the Gray code word of the integer 12 is 1010, and the bipolar binary vector representation of it is [1, −1, 1, −1]. Gray code is not completely "consistent" with the Hamming distance. For instance, the Hamming distance between the Gray code words of the integers, 0 and 2, is 2, but the Hamming distance between those of the integers, 0 and 3, is only 1. However, compared with the grey level representation, the representation from Gray encoding requires much smaller number of components.

There are other methods of transforming measurement vectors or feature vectors that are not ternary vectors into bipolar binary feature vectors, which can then be transformed into ternary feature vectors. Feature vectors used by PAMs are ternary feature vectors.

For simplicity and clarity, all feature vectors are ternary feature vectors in the rest of this invention disclosure unless indicated otherwise; column and row vectors are special matrices and also called matrices; and a matrix is considered to consist of row or column vector(s).

5.1 Orthogonal Expansion of Ternary Vectors

We now show how ternary vectors are expanded into orthogonal ternary vectors by a method recently discovered by this inventor. In this invention disclosure, the transpose of a matrix or a vector is denoted by an apostrophe ' (i.e., a prime).

Given an m-dimensional ternary vector $v=[v_1\ v_2\ \ldots\ v_m]'$, the first-stage expansion of v is defined as $\check{v}(1)=[1\ v_1]'$, and the second-stage expansion is defined as $$\check{v}(1,2) = \left[\check{v}'(1)\ v_2\check{v}'(1)\right]'$$
$$= [1\ v_1\ v_2\ v_2v_1]'$$

In general, the (j+1)-th-stage expansion is recursively defined as $$\check{v}(1,\ldots,j+1)=[\check{v}(1,\ldots,j)\ v_{j+1}\check{v}(1,\ldots,j)]' \quad (1)$$

The m-th stage expansion, which includes all the different powers of the components of v, is a $2^m$-dimensional ternary vector:

$$\check{v}[1\ v_1\ v_2v_2v_1\ v_3v_1v_3V_2v_3v_2v_1 \ldots v_m \ldots v_1]' \quad (2)$$

which is called the orthogonal expansion of v. Reordering the components of $\check{v}$ in accordance with the powers of the components, we obtain an alternative orthogonal expansion:

$$\check{v}[1v_1 \ldots v_mv_1v_2 \ldots v_1v_mv_2v_3 \ldots v_1 \ldots v_m]'$$

which can also be used in this invention disclosure. In fact, many other orthogonal expansions of v are possible by different orderings of the components, but are all denoted by $\check{v}$. The use of the same symbol $\check{v}$ is not expected to cause confusion. The components of any orthogonal expansion of v form the set, $$\{v_1^{i_1}v_2^{i_2} \ldots v_m^{i_m}|i_j\in\{0,1\}, j=1,2,\ldots,m\}$$

which has $2^m$ elements. The components in $\check{v}$ are actually the terms in the expansion of $(1+v_1)(1+v_2)\ldots(1+v_m)$. Subvectors of orthogonal expansions are sometimes used instead for reducing storage or memory space and/or computation requirements.

Theorem 1.

Let $a=[a_1 \ldots a_m]'$ and $b=[b_1 \ldots b_m]'$ be two m-dimensional ternary vectors. Then the inner product $\check{a}'\check{b}$ of their orthogonal expansions, $\check{a}$ and $\check{b}$, can be expressed as follows:

$$\check{a}'\check{b} = \prod_{j=1}^{m}(1-a_jb_j)$$

The following properties are immediate consequences of this formula:

1. If $a_kb_k=-1$ for some $k\in\{1,\ldots,m\}$, then $\check{a}'\check{b}=0$.
2. If $a_kb_k=0$ for some k in $\{1,\ldots,m\}$, then $$\check{a}'\check{b} = \prod_{j=1, j\neq k}^{m}(1-a_jb_j).$$

3. If $\check{a}'\check{b}\neq 0$, then $\check{a}'\check{b}=2^{a'b}$.

4. If a and b are bipolar binary vectors, then $\breve{a}'\breve{b}=0$ if $a \neq b$; and $\breve{a}'\breve{b}=2^m$ if $a=b$. Proof. Applying the recursive formula (I), we obtain $$\breve{a}'(1, \ldots, j+1)\breve{b}(1, \ldots, j+1) =$$
$$[\breve{a}'(1, \ldots, j)a_{j+1}\breve{a}'(1, \ldots, j)][\breve{b}'(1, \ldots, j)b_{j+1}\breve{b}'(1, \ldots, j)]' =$$
$$\breve{a}'(1, \ldots, j)\breve{b}(1, \ldots, j) + a_{j+1}b_{j+1}\breve{a}'(1, \ldots, j)\breve{b}(1, \ldots, j) =$$
$$\breve{a}'(1, \ldots, j)\breve{b}(1, \ldots, j)(1 + a_{j+1}b_{j+1})$$

It follows that $\breve{a}'\breve{b}=(1+a_1b_1)(1+a_2b_2)\ldots(1+a_mb_m)$. The four properties above are easy consequences of this formula.

We remark that if some components of a are set equal to zero to obtain a vector c and the nonzero components of c are all equal to their corresponding components in b, then we still have $\breve{c}'\breve{b} \neq 0$. This property is used by learning machines disclosed herein to learn and recognize corrupted, distorted and occluded patterns and to facilitate generalization on such patterns.

The following notations and terminologies are used in this invention disclosure: For $v=[v_1\ v_2\ \ldots\ v_m]'$ considered above, let $n=[n_1\ \ldots\ n_k]$ be a vector whose components are different integers from the set $\{1, \ldots, m\}$ such that $1 \leq n_1 < \ldots < n_k \leq m$. The vector $v(n)=[v_{n_1}\ \ldots\ v_{n_k}]'$ is a subvector, called a k-component or k-dimensional subvector, of the vector v. The vector n is called a subvector index. $v(n)$ is said to be on the subvector index n or have the subvector index n. $\breve{v}(n)$ denotes the orthogonal expansion of $v(n)$.

5.2 Expansion Correlation Matrices

A PAM is a network of PUs (processing units) organized in one or more layers. A typical layer is shown in FIG. 14. The feature vector input to layer l at time or numbering $\tau$ is denoted by $x_\tau^{l-1}$, and the output from the layer at $\tau$ is denoted by $x\{y_\tau^l\}$, which is a point estimate of the label of the feature vector $x_\tau^{l-1}$. The symbols, $y_\tau^l$ and $x\{y_\tau^l\}$, are defined and explained in detail below. A multilayer PAM without feedbacks is shown in FIG. 15 and is called a hierarchical PAM (HPAM). Note that the feature vector $x_\tau^0$ input to layer 1 of an HPAM is the exogenous feature vector $x_\tau^{ex}$, and that for $l>1$, the feature vector $x_\tau^{l-1}$ input to layer l is the output $x\{y_\tau^{l-1}\}$ from layer l-1. An example multilayer PAM with feedbacks is shown in FIG. 16 and is called a temporal HPAM (THPAM). Note that the feature vector $x_\tau^0$ input to layer 1 of an THPAM comprises the exogenous feature vector $x_\tau^{ex}$ and the feedbacks from the same or higher-ordered layers (e.g., $x\{y_{\tau-1}^1\}$ and $x\{y_{\tau-1}^2\}$ in FIG. 16) and that the feature vector $x_\tau^{l-1}$ input to layer l comprises the output $x\{y_\tau^{l-1}\}$ from layer l-1 and feedbacks from the same or higher-ordered layers (e.g., $x_\tau^2$ comprises $x\{y_\tau^2\}$, $x\{y_{\tau-1}^5\}$ and $x\{y_{\tau-1}^3\}$ in FIG. 16). HPAMs and THPAMs are described in more detail in the subsection on "Multilayer and Recurrent Networks." Before said subsection, this and the next 6 subsections describe essentially the PUs (processing units) in those networks. For notational simplicity, the superscript l-1 in $x_\tau^{l-1}$ and dependencies on l-1 or l in other symbols are usually suppressed in these 7 subsections when no confusion is expected.

Let $x_t$, $t=1, 2, \ldots$, denote a sequence of M-dimensional feature vectors $x_t=[x_{t1}\ \ldots\ x_{tM}]'$, whose components are ternary numbers. The feature vectors $x_t$, $t=1, 2, \ldots$, are not necessarily different. The ternary entry $x_{tm}$ is called the m-th component of the feature vector $x_t$. Let $n=[n_1\ \ldots\ n_k]'$ be a subvector $[1\ \ldots\ M]'$ such that $n_1 < \ldots < n_k$. The subvector $x_t(n)=[x_{tm_1}\ \ldots\ x_{tm_k}]'$ is a feature subvector of the feature vector $x_t$. n is called a feature subvector index (FSI), and $x_t(n)$ is said to be a feature subvector on the FSI n or have the FSI n. However, we stress that $x_t(n)$ is itself a feature vector. When a PU is discussed regardless of the layer of the PAM that the PU belongs, an input vector to the PU is referred to as a feature vector. Each PU is associated with a fixed FSI n and denoted by PU(n). Using these notations, the sequence of subvectors of $x_t$, $t=1, 2, \ldots$, that is input to PU(n) is $x_t(n)$, $t=1, 2, \ldots$. An example of a group of ternary "pixels" that is identified with a feature subvector index n is shown in FIG. 3. An FSI n of a PU usually has subvectors, $n(u)$, $u=1, \ldots, U$, on which subvectors $x_t(n(u))$ of $x_t(n)$ are separately processed by PU(n) at first. The subvectors, $n(u)$, $u=1, \ldots, U$, are not necessarily disjoint, and their components are usually randomly selected from those of n. An example of such a subvector $n(u)$ is shown in FIG. 3 and indicated by 46.

A PU in a PAM has a "receptive field" in the exogenous feature vector and a "receptive field" in the measurement vector. These receptive fields can be found by tracing the feedforward connections in the PAM backforward from a feature vector input to the PU (or the feature subvector index of the PU) to an exogenous feature vector (or the input terminals) of the PAM, and then tracing the transformation, that maps the measurement vector into the exogenous feature vector, backwards from the exogenous feature vector to the measurement vector. The components of the measurement vector that can be reached by this backward tracing from a PU to the exogenous feature vector and then to the measurement vector are called the "receptive field" of the PU in the measurement vector. The components of the exogenous feature vector that can be reached by this backward tracing from a PU to the exogenous feature vector are called the "receptive field" of the PU in the exogenous feature vector. The label of a feature vector input to a PU is the label of the corresponding components of the measurement vector in the receptive field of the PU in the measurement vector. The label of the corresponding components of the exogenous feature vector in the receptive field of the PU in the exogenous feature vector is also this label.

Let a label of the feature vector $x_t(n)$ be denoted by $r_t(n)$, which is an R-dimensional ternary vector. If R is 1, $r_t(n)$ is real-valued. All subvectors, $x_t(n(u))$, $u=1, \ldots, U$, of $x_t(n)$ share the same label $r_t(n)$. In supervised learning by PU(n), $r_t(n)$ is provided from outside the PAM, and in unsupervised learning by PU(n), $r_t(n)$ is generated by the PU itself.

The pairs $(x_t(n(u)), r_t(n))$, $t=1, 2, \ldots$, are learned by the PU to form two of expansion correlation matrices, ECMs, D(n(u)), C(n(u)), A (n(u)), B(n(u)) on n(u). After the first T pairs are learned, these matrices are $$D(n(u)) = \Lambda \sum_{t=1}^{T} W_t(n(u), T) r_t(n) \breve{x}_t'(n(u)) \quad (3)$$

$$C(n(u)) = \Lambda \sum_{t=1}^{T} W_t(n(u), T) I \breve{x}_t'(n(u)) \quad (4)$$

$$A(n(u)) = \frac{1}{2}\Lambda \sum_{t=1}^{T} W_t(n(u), T)(I + r_t(n)) \breve{x}_t'(n(u)) \quad (5)$$

$$B(n(u)) = \frac{1}{2}\Lambda \sum_{t=1}^{T} W_t(n(u), T)(I - r_t(n)) \breve{x}_t'(n(u)) \quad (6)$$

where $\breve{x}_t(n(u))$ are orthogonal expansions of $x_t(n(u))$, $I=[1\ \ldots\ 1]'$ with R components, $\Lambda$ is a scaling constant that is selected to keep all numbers involved in an application of a PAM manageable, $W_t(n(u), T)$ is a weight matrix, which is usually an diagonal matrix, diag($w_{t1}(n(u), T) w_{t2}(u), T) \ldots w_{tR}(n(u), T)$), that is selected to place emphases on components of the label, place emphases on $(x_t(n(u)), r_t(n))$ of different numberings t, and keep the entries in the ECMs bounded. For example, $W_t(n(u), T) = \lambda^{T-t} 2^{-dim\, n(u)} h(n(u))I$, where $\lambda$ ($0<\lambda<1$) is a forgetting factor, $2^{-dim\, n(u)}$ eliminates the constant $2^{dim\, n(u)}$ arising from $\check{x}_t(n(u))\check{x}_t'(n(u)) = 2^{dim\, n(u)}$, and $h(n(u))$ assigns emphases to subvectors $x_t(n(u))$ on $n(u)$. There are many other possible weight matrices, depending on applications of the present invention.

Any two of the above four expansion correlation matrices (ECMs) can be obtained from the other two. We usually use $D(n(u))$ and $C(n(u))$ in this invention disclosure. They can be combined into one ECM $[C'(n(u))\ D'(n(u))]'$. If $W_t(n(u), T) = w_t(n(u), T) I$, where $w_t(n(u), T)$ is a real-valued function, all rows of $C(n(u))$ are equal, and only one needs to be stored.

ECMs, $D(n(u))$ and $C(n(u))$, can be adjusted to learn a pair $(x_\tau(n(u)), r_\tau(n))$. For example, if $W_t(n(u), T) = \lambda^{T-t} I$, the ECMs are adjusted as follows: If $r_\tau(n) \neq 0$, $D(n(u))$ and $C(n(u))$ are replaced respectively with $\lambda D(n(u)) + \Lambda r_\tau(n)\check{x}_\tau'(n(u))$ and $\lambda C(n(u)) + \Lambda \check{x}_\tau'(n(u))$, which are each a weighted sum of a ECM and $r_\tau(n)\check{x}_\tau'(n(u))$ or $\check{x}_\tau'(n(u))$. If $r_\tau(n)=0$, then $D(n(u))$ and $C(n(u))$ are unchanged. Note that $W_t(n(u), T)$ is a diagonal matrix, and $C(n(u))$ is a row vector here. This adjustment of the ECMs is shown in FIG. 5.

If $W_t(n(u), T) = I/\sqrt{T}$, the ECMs are adjusted as follows: If $r_\tau(n) \neq 0$, $D(n(u))$ and $C(n(u))$ are replaced respectively with $(\sqrt{T}D(n(u)) + \Lambda r_\tau(n)\check{x}_\tau'(n(u)))/\sqrt{T+1}$ and $(\sqrt{T}C(n(u)) + \Lambda \check{x}_\tau'(n(u)))/\sqrt{T+1}$, which are each a weighted sum of a ECM and $r_\tau(n)\check{x}_\tau'(n(u))$ or $\check{x}_\tau'(n(u))$, and $\sqrt{T}$ is replaced with $\sqrt{T+1}$. If $r_\tau(n)=0$, then $D(n(u))$ and $C(n(u))$ are unchanged. Note that $W_t(n(u), T)$ is a diagonal matrix, and $C(n(u))$ is a row vector here. This adjustment of the ECMs is shown in FIG. 6.

Orthogonal expansions (OEs) $\check{x}_t(n(u))$ and ECMs, $D(n(u))$, $C(n(u))$, $A(n(u))$, $B(n(u))$, $u=1, \ldots, U$, are assembled into a general orthogonal expansion (GOE) $\check{x}_t(n)$ and general expansion correlation matrices (GECMs), $D(n)$, $C(n)$, $A(n)$, $B(n)$, for PU(n) (the PU on the feature subvector index n) as follows:

$$\check{x}_t(n) = [\check{x}_t'(n(1))\check{x}_t'(n(2)) \ldots \check{x}_t'(n(U))]' \tag{7}$$

$$D(n) = [D(n(1))D(n(2)) \ldots D(n(U))] \tag{8}$$

$$C(n) = [C(n(1))C(n(2)) \ldots C(n(U))] \tag{9}$$

$$A(n) = [A(n(1))A(n(2)) \ldots A(n(U))] \tag{10}$$

$$B(n) = [B(n(1))B(n(2)) \ldots B(n(U))] \tag{11}$$

The GOE $\check{x}_t(n)$ and the GECMs, $D(n)$ and $C(n)$, are shown in FIG. 8.

5.3 Representations of Probability Distributions

Let us define the symbols $a_\tau(n(u))$, $b_\tau(n(u))$, $c_\tau(n(u))$, $d_\tau(n(u))$ by $$a_\tau(n(u)) := A(n(u))\check{x}_\tau(n(u)) \tag{12}$$

$$b_\tau(n(u)) := B(n(u))\check{x}_\tau(n(u)) \tag{13}$$

$$c_\tau(n(u)) := C(n(u))\check{x}_\tau(n(u)) \tag{14}$$

$$d_\tau(n(u)) := D(n(u))\check{x}_\tau(n(u)) \tag{15}$$

and the symbols $a_\tau(n)$, $b_\tau(n)$, $c_\tau(n)$, $d_\tau(n)$ by $$a_\tau(n) := A(n)\check{x}_\tau(n) = \sum_{u=1}^{U} A(n(u))\check{x}_\tau(n(u)) = \sum_{u=1}^{U} a_\tau(n(u)) \tag{16}$$

$$b_\tau(n) := B(n)\check{x}_\tau(n) = \sum_{u=1}^{U} B(n(u))\check{x}_\tau(n(u)) = \sum_{u=1}^{U} b_\tau(n(u)) \tag{17}$$

$$c_\tau(n) := C(n)\check{x}_\tau(n) = \sum_{u=1}^{U} C(n(u))\check{x}_\tau(n(u)) = \sum_{u=1}^{U} c_\tau(n(u)) \tag{18}$$

$$d_\tau(n) := D(n)\check{x}_\tau(n) = \sum_{u=1}^{U} D(n(u))\check{x}_\tau(n(u)) = \sum_{u=1}^{U} d_\tau(n(u)) \tag{19}$$

where $\check{x}_t(n)$ is a general orthogonal expansion (GOE) and $D(n)$, $C(n)$, $A(n)$ and $B(n)$ are general expansion correlation matrices (GECMs) for PU(n). It is easy to see that $d_\tau(n(u)) = 2a_\tau(n(u)) - c_\tau(n(u))$, and $d_\tau(n) = 2a_\tau(n) - c_\tau(n)$.

To illustrate the use of $a_\tau(n)$, $b_\tau(n)$, $c_\tau(n)$, $d_\tau(n)$, two examples are given in the following: Example 1. Assume that $x_t(n)$ and $x_\tau(n)$ are bipolar vectors, and $W_t(n(u), T) = I/\sqrt{T}$. By Theorem 1, $\check{x}_k(n(u))\check{x}_\tau(n(u)) = 0$ or $\check{x}_k(n(u))\check{x}_\tau(n(u)) = 2^{dim\, n(u)}$, depending on whether $x_k(n(u)) \neq x_\tau(n(u))$ or $x_k(n(u)) = x_\tau(n(u))$. It follows that $$a_{\tau j}(n(u)) = \Lambda 2^{dim\, n(u)} |G_{\tau j}(n(u), +)|/\sqrt{T} \tag{20}$$

$$b_{\tau j}(n(u)) = \Lambda 2^{dim\, n(u)} |G_{\tau j}(n(u), -)|/\sqrt{T} \tag{21}$$

$$G_{\tau j}(n(u), +) = \{t \in [0, T] | x_t(n(u)) = x_\tau(n(u)), r_{tj}(n) = 1\} \tag{22}$$

$$G_{\tau j}(n(u), -) = \{t \in [0, T] | x_t(n(u)) = x_\tau(n(u)), r_{tj}(n) = -1\} \tag{23}$$

where $|G_{\tau j}(n(u), +)|$ and $|G_{\tau j}(n(u), -)|$ are the numbers of elements in the sets $G_{\tau j}(n(u), +)$ and $G_{\tau j}(n(u), -)$, respectively. If $a_{\tau j}(n(u)) = b_{\tau j}(n(u))$ (i.e., $c_{\tau j}(n(u)) = 0$, or $c_{\tau j}(n(u)) \neq 0$, but $a_{\tau j}(n(u)) = b_{\tau j}(n(u))$), the ECMs for $n(u)$ have no information or no preference about the value of the component $r_{\tau j}(n)$ of the label $r_\tau(n)$ of the feature subvector $x_\tau(n)$.

It follows that $$a_{\tau j}(n) = \frac{\Lambda}{\sqrt{T}} \sum_{u=1}^{U} 2^{dim\, n(u)} |G_{\tau j}(n(u), +)|$$

$$b_{\tau j}(n) = \frac{\Lambda}{\sqrt{T}} \sum_{u=1}^{U} 2^{dim\, n(u)} |G_{\tau j}(n(u), -)|$$

$$c_{\tau j}(n) = \frac{\Lambda}{\sqrt{T}} \sum_{u=1}^{U} 2^{dim\, n(u)} (|G_{\tau j}(n(u), +)| + |G_{\tau j}(n(u), -)|)$$

$$d_{\tau j}(n) = 2a_{\tau j}(n) - c_{\tau j}(n)$$

(This shows that if dim $n(u_1) = $ dim $n(u_2) + k$, then $a_{\tau j}(n(u_1))$ and $c_{\tau j}(n(u_1))$ are weighted $2^k$ times as much as $a_{\tau j}(n(u_2))$ and $c_{\tau j}(n(u_2))$ in $a_{\tau j}(n)$ and $c_{\tau j}(n)$. This weighting can be changed by using $W_t(n(u), T) = 2^{-dim\, n(u)} h(n(u))I/\sqrt{T}$.)

For simplicity and clarity, assume that dim $n(u)$, $u=1, \ldots, U$, are all the same. If $c_{\tau j}(n) \neq 0$, then $$\frac{a_{\tau j}(n)}{c_{\tau j}(n)} = \frac{\sum_{u=1}^{U} |G_{\tau j}(n(u), +)|}{\sum_{u=1}^{U} (|G_{\tau j}(n(u), +)| + |G_{\tau j}(n(u), -)|)} \quad (24)$$

can be viewed as a probability that $r_{\tau j}(n)=1$. This probability is a subjective probability, because it is based on "experience" represented by the GECMs C(n) and A(n), or C(n) and D(n)= 2A(n)−C(n), which are learned from (or constructed with) $(x_t(n(u)), r_t(n))$, t=1, 2, ..., T.

Example 2

Assume that all $x_t(n)$ and $x_\tau(n)$ are bipolar binary vectors, and $W_t(n(u), T) = \lambda^{T-t} I$.

$$a_{\tau j}(n(u)) = \Lambda \sum_{t \in G_{\tau j}(n(u),+)} 2^{dim n(u)} \lambda^{T-t}$$

$$b_{\tau j}(n(u)) = \Lambda \sum_{t \in G_{\tau j}(n(u),-)} 2^{dim n(u)} \lambda^{T-t}$$

Assume further that dim n(u), u=1, U are all the same. Then if $c_\tau(n) \neq 0$, $$\frac{a_{\tau j}(n)}{c_{\tau j}(n)} = \frac{\sum_{u=1}^{U} \sum_{t \in G_{\tau j}(n(u),+)} \lambda^{T-t}}{\sum_{u=1}^{U} \sum_{t \in G_{\tau j}(n(u),+) \cup G_{\tau j}(n(u),-)} \lambda^{T-t}} \quad (25)$$

can be viewed as a subjective probability that the label r (n)=1, based on the GECMs C(n) and A(n), or C(n) and D(n)=2A (n)−C(n), which are constructed with pairs $(x_t(n(u)), r_t(n))$, t=1, 2, ..., T. The forgetting factor λ de-emphasizes past pairs gradually.

In both of the above examples, $W_t(n(u), T)$ is a diagonal matrix with equal diagonal entries. In this case, all components $c_{\tau j}(n)$ of $C_\tau(n)$ are equal and all rows of C(n) are equal. Therefore, only one row of C(n), say $C_1(n)$, and one component of $C_\tau(n)$, say $c_{\tau 1}(n)$, are sufficient. If only $C_1(n)$ is used, it is also denoted by C(n).

In general, the ratio $a_{\tau j}(n)/c_{\tau j}(n)$ can be viewed as a subjective probability that $r_{\tau j}(n)=1$ based on the pairs $(x_t(n), r_t(n))$ that have been learned by PU(n) and the weight matrices $W_t(n(u), T)$. All the statements concerning a probability in this invention disclosure are statements concerning a subjective probability, and the word "subjective" is usually omitted. If $c_{\tau j}(n) \neq 0$, then $a_{\tau j}(n)/c_{\tau j}(n)$ is the probability $p_{\tau j}(n)$ that the j-th component r (n) of the label $r_\tau(n)$ of $x_\tau(n)$ is +1 based on D(n) and C(n). If $c_{\tau j}(n)=0$, then we set $p_{\tau j}(n)=1/2$. The vector $$p_\tau(n) = [p_{\tau 1}(n) p_{\tau 2}(n) \ldots p_\tau R(n)]'$$

is a representation of a probability distribution of the label $r_\tau(n)$ of the feature subvector $x_\tau(n)$ input to PU(n). Since D(n)=2A(n)−C(n), if $c_{\tau j}(n) \neq 0$, the ratio $d_{\tau j}(n)/c_{\tau j}(n)$ is equal to $2p_{\tau j}(n)-1$. If $c_{\tau j}(n)=0$, set $2p_{\tau j}(n)-1=0$. Denote $2p_{\tau j}(n)-1$ by $y_{\tau j}(n)$. Then the vector $r_\tau(n) = 2p_\tau(n)-I$ satisfies $$y_\tau(n) = [2p_{\tau 1}(n)-1 \cdots 2p_{\tau R}(n)-1]'$$
$$= [d_{\tau 1}(n)/c_{\tau 1}(n) \; d_{\tau 2}(n)/c_{\tau 2}(n) \cdots d_{\tau R}(n)/c_{\tau R}(n)]'$$

and is also a representation of a probability distribution of the label $r_\tau(n)$ of the feature subvector $x_\tau(n)$. Here, I=[1 1 ... 1]'.

5.4 Masking Matrices

Let a subvector $x_\tau(n(u))$ be a slightly different (e.g., corrupted, modified, deviated) version of $x_\varsigma(n(u))$, which is one of the subvectors, $x_t(n(u))$, t=1, 2, ..., T, stored in ECMs, D(n(u)) and C(n(u)) (or any two of the four ECMs, D(n(u)), C(n(u)), A (n(u)) and B(n(u)), on n(u)). Assume that $x_\tau(n(u))$ is very different from other subvectors stored in the ECMs. Since $\check{x}_\varsigma'(n(u))\check{x}_\tau(n(u))=0$, the information stored in D(n(u)) and C(n(u)) about the label r (n) cannot be obtained from $d(n(u))=D(n(u))\check{x}_\tau(n(u))$ and $c(n(u))=C(n(u))\check{x}_\tau(n(u))$. This is viewed as failure of d (n(u)) and c (n(u)) or the ECMs to generalize or adequately generalize on $x_\tau(n(u))$. Because of property 2 in Theorem 1, if the corrupted, distorted and occluded components in $x_\tau(n(u))$ are set equal to zero, then the information stored in the ECMs about the label $r_\varsigma(n)$ can be obtained in part from the remaining components of $x_\tau(n(u))$. This observation motivated masking matrices described in this section.

Let us denote the vector $v=[v_1 \, v_2 \ldots v_n]'$ with its $i_1$-th, $i_2$-th, ..., and $i_j$-th components set equal to 0 by $v(i_1^-, i_2^-, \ldots, i_j^-)$, where $1 \leq i_1 < i_2 < \ldots < i_j \leq n$. For example, if v=[1 −1 −1 1]', then $v(2^-, 4^-)$=[1 0 −1 0]'. Denoting the n-dimensional vector [1 1 ... 1]' by I and denoting the orthogonal expansion of $v(i_1^-, i_2^-, \ldots, i_j^-)$ by $\check{v}(i_1^-, i_2^-, \ldots, i_j^-)$, we note that $v(i_1^-, i_2^-, \ldots, i_j^-) = \text{diag}(I(i_1^-, i_2^-, \ldots, i_j^-)) v$ and $\check{v}(i_1^-, i_2^-, \ldots, i_j^-) = \text{diag}(\check{I}(i_1^-, i_2^-, \ldots, i_j^-)) \check{v}$, were $\check{v}(i_1^-, i_2^-, \ldots, i_j^-)$ and $\check{I}(i_1^-, i_2^-, \ldots, i_j^-)$ denote the orthogonal expansions of $v(i_1^-, i_2^-, \ldots, i_j^-)$ and $I(i_1^-, i_2^-, \ldots, i_j^-)$ respectively (not the orthogonal expansions of v and I with their $i_1$-th, $i_2$-th, ..., and $i_j$-th components set equal to 0).

Using these notations, a feature subvector x (n(u)) with its $i_1$-th, $i_2$-th, ..., and $i_j$-th components set equal to 0 is $x_t(n(u))$ $(i_1^-, i_2^-, \ldots, i_j^-)$, and the orthogonal expansion of $x_t(n(u))$ $(i_1^-, i_2^-, \ldots, i_j^-)$ is $\text{diag}(\check{I}(i_1^-, i_2^-, \ldots, i_j^-))\check{x}_t(n(u))$. Hence, the matrix $\text{diag}(\check{I}(i_1^-, i_2^-, \ldots, i_j^-))$, as a matrix transformation, sets the $i_1$-th, $i_2$-th, ..., and $i_j$-th components of $x_t(n(u))$ equal to zero in transforming $\check{x}_t(n(u))$ (i.e., $\text{diag}(\check{I}(i_1^-, i_2^-, \ldots, i_j^-))\check{x}_t(n(u))$). Therefore, $\text{diag}(\check{I}(i_1^-, i_2^-, \ldots, i_j^-))$ is called a masking matrix.

An important property of the masking matrix $\text{diag}(\check{I}(i_1^-, i_2^-, \ldots, i_j^-))$ is the following: If $$\text{diag}(\check{I}(i_1^-,i_2^-,\ldots,i_j^-))\check{x}_t(n(u)) = \text{diag}(\check{I}(i_1^-,i_2^-,\ldots,i_j^-)) \check{x}_\tau(n(u))$$

then $$\check{x}_t(n(u))\text{diag}(\check{I}(i_1^-,i_2^-,\ldots,i_j^-))\check{x}_\tau(n(u)) = 2^{dim n(u)-j}.$$

If $$\text{diag}(\check{I}(i_1^-,i_2^-, \ldots, i_j^-)) \check{x}_t(n(u)) \neq \text{diag}(\check{I}(i_1^-, i_2^-, \ldots, i_j^-)) \check{x}_\tau(n(u)) \text{ then } (n(u))\text{diag}(\check{I}(i_1^-, i_2^-, \ldots, i_j^-)) \check{x}_\tau(n(u)) = 0.$$

Using this property, we combine all such masking matrices that set less than or equal to a selected positive integer J (n(u)) of components of $x_t(n(u))$ equal to zero into the following masking matrix $$M(n(u)) = I + \sum_{j=1}^{J(n(u))} \sum_{i_j=1}^{\dim n(u)} \cdots \sum_{i_2=2}^{i_3-1} \sum_{i_1=1}^{i_2-1} 2^{-8j} 2^j \mathrm{diag}(\tilde{I}(i_1^-, i_2^-, \ldots, i_j^-)) \quad (26)$$

where $2^j$ is used to compensate for the factor $2^{-j}$ in $2^{\dim n(u)-j}$ in the important property stated above, and $2^{-8j}$ is an example weight selected to differentiate between different levels j of maskings. Some other examples are $2^{-6j}, 2^{-7j}, 2^{-9j}, 10^{-2}$, etc. The weight should be selected to suit the application. $M(n(u))$ is shown in FIG. 7 and FIG. 9. Because $\mathrm{diag}(\check{I}(i_1^-, i_2^-, \ldots, i_j^-))$ appears in a summand $2^{-8j} 2^j \mathrm{diag}(\check{I}(i_1^-, i_2^-, \ldots, i_j^-))$ in (26) for the masking matrix $M(n(u))$, the matrix $\mathrm{diag}(\check{I}(i_1^-, i_2^-, \ldots, i_j^-))$ is called a summand masking matrix in $M(n(u))$.

Let us denote $M(n(u))$ by $M$ here for abbreviation. Note that for $j=1, \ldots, R$, we have the following:

If $C_j(n(u))\check{x}_\tau(n(u)) \neq 0$, then $$D_j(n(u))\check{x}_\tau(n(u)) \approx D_j(n(u))M\check{x}_\tau(n(u))$$

$$C_j(n(u))\check{x}_\tau(n(u)) \approx C_j(n(u))M\check{x}_\tau(n(u))$$

$$A_j(n(u))\check{x}_\tau(n(u)) \approx A_j(n(u))M\check{x}_\tau(n(u))$$

$$B_j(n(u))\check{x}_\tau(n(u)) \approx B_j(n(u))M\check{x}_\tau(n(u))$$

If $C_j(n(u))\check{x}_\tau(n(u))=0$, but $$C_j(n(u)) \sum_{i_1=1}^{\dim n(u)} \mathrm{diag}(\tilde{I}(i_1^-))\check{x}_\tau(n(u)) \neq 0,$$

then $$D_j(n(u)) \sum_{i_1=1}^{\dim n(u)} \mathrm{diag}(\tilde{I}(i_1^-))\check{x}_\tau(n(u)) \approx D_j(n(u))M\check{x}_\tau(n(u))$$

$$C_j(n(u)) \sum_{i_1=1}^{\dim n(u)} \mathrm{diag}(\tilde{I}(i_1^-))\check{x}_\tau(n(u)) \approx C_j(n(u))M\check{x}_\tau(n(u))$$

$$A_j(n(u)) \sum_{i_1=1}^{\dim n(u)} \mathrm{diag}(\tilde{I}(i_1^-))\check{x}_\tau(n(u)) \approx A_j(n(u))M\check{x}_\tau(n(u))$$

$$B_j(n(u)) \sum_{i_1=1}^{\dim n(u)} \mathrm{diag}(\tilde{I}(i_1^-))\check{x}_\tau(n(u)) \approx B_j(n(u))M\check{x}_\tau(n(u)).$$

If $C_j(n(u)) x_\tau(n(u))=0$, $$C_j(n(u)) \sum_{i_1=1}^{\dim n(u)} \mathrm{diag}(\tilde{I}(i_1^-))\check{x}_\tau(n(u)) = 0,$$

but $$C_j(n(u)) \sum_{i_2=2}^{\dim n(u)} \sum_{i_1=1}^{i_2-1} \mathrm{diag}(\tilde{I}(i_1^-, i_2^-))\check{x}_\tau(n(u)) \neq 0,$$

then $$D_j(n(u)) \sum_{i_2=2}^{\dim n(u)} \sum_{i_1=1}^{i_2-1} \mathrm{diag}(\tilde{I}(i_1^-, i_2^-))\check{x}_\tau(n(u)) \approx D_j(n(u))M\check{x}_\tau(n(u))$$

$$C_j(n(u)) \sum_{i_2=2}^{\dim n(u)} \sum_{i_1=1}^{i_2-1} \mathrm{diag}(\tilde{I}(i_1^-, i_2^-))\check{x}_\tau(n(u)) \approx C_j(n(u))M\check{x}_\tau(n(u))$$

$$A_j(n(u)) \sum_{i_2=2}^{\dim n(u)} \sum_{i_1=1}^{i_2-1} \mathrm{diag}(\tilde{I}(i_1^-, i_2^-))\check{x}_\tau(n(u)) \approx A_j(n(u))M\check{x}_\tau(n(u))$$

$$B_j(n(u)) \sum_{i_2=2}^{\dim n(u)} \sum_{i_1=1}^{i_2-1} \mathrm{diag}(\tilde{I}(i_1^-, i_2^-))\check{x}_\tau(n(u)) \approx B_j(n(u))M\check{x}_\tau(n(u)).$$

Continuing in this manner, it is seen that $D_j(n(u))M\check{x}_\tau(n(u))$, $C_j(n(u))M\check{x}_\tau(n(u))$, $A_j(n(u))M\check{x}_\tau(n(u))$, $B_j(n(u))M\check{x}_\tau(n(u))$ always use the greatest number of uncorrupted, undeviated or unmodified components of $x_\tau(n(u))$ in estimating $d_{\tau j}(n(u))$, $c_{\tau j}(n(u))$, $a_{\tau j}(n(u))$, $b_{\tau j}(n(u))$, respectively.

Corresponding to $\check{x}_\tau(n)$, $D(n)$, $C(n)$, $A(n)$, $B(n)$ defined in (7), (8), (9), (10), (11), a general masking matrix is defined as follows:

$$M(n) = \mathrm{diag}[M(n(1))M(n(2))\ldots M(n(U))] \quad (27)$$

where the right side is a matrix with $M(n(u))$, $u=1, 2, \ldots, U$, as diagonal blocks and zero elsewhere. $M(n)$ is shown in FIG. 9.

If the masking matrix $M(n(u))$ is used, the symbols $a_\tau(n(u))$, $b_\tau(n(u))$, $c_\tau(n(u))$, $d_\tau(n(u))$ are defined as follows:

$$a_\tau(n(u)) := A(n(u))M(n(u))\check{x}_\tau(n(u)) \quad (28)$$

$$b_\tau(n(u)) := B(n(u))M(n(u))\check{x}_\tau(n(u)) \quad (29)$$

$$c_\tau(n(u)) := C(n(u))M(n(u))\check{x}_\tau(n(u)) \quad (30)$$

$$d_\tau(n(u)) := D(n(u))M(n(u))\check{x}_\tau(n(u)) \quad (31)$$

If the masking matrix $M(n)$ is used, the symbols $a_\tau(n)$, $b_\tau(n)$, $c_\tau(n)$, $d_\tau(n)$ are defined as follows:

$$a_\tau(n) := A(n)M(n)\check{x}_\tau(n) = \sum_{u=1}^{U} A(n(u))M(n(u))\check{x}_\tau(n(u)) \quad (32)$$

$$b_\tau(n) := B(n)M(n)\check{x}_\tau(n) = \sum_{u=1}^{U} B(n(u))M(n(u))\check{x}_\tau(n(u)) \quad (33)$$

$$c_\tau(n) := C(n)M(n)\check{x}_\tau(n) = \sum_{u=1}^{U} C(n(u))M(n(u))\check{x}_\tau(n(u)) \quad (34)$$

$$d_\tau(n) := D(n)M(n)\check{x}_\tau(n) = \sum_{u=1}^{U} D(n(u))M(n(u))\check{x}_\tau(n(u)) \quad (35)$$

where $\check{x}_\tau(n)$ is a general orthogonal expansion (GOE) and $D(n)$, $C(n)$, $A(n)$ and $B(n)$ are general expansion correlation matrices (GECMs) for $PU(n)$. It follows that $$a_\tau(n) = \sum_{u=1}^{U} a_\tau(n(u)) \quad (36)$$

-continued $$b_\tau(n) = \sum_{u=1}^{U} b_\tau(n(u)) \quad (37)$$

$$c_\tau(n) = \sum_{u=1}^{U} c_\tau(n(u)) \quad (38)$$

$$d_\tau(n) = \sum_{u=1}^{U} d_\tau(n(u)) \quad (39)$$

It is easy to see that $d_\tau(n(u))=2a_\tau(n(u))-c_\tau(n(u))$, and $d_\tau(n) = 2a_\tau(n)-c_\tau(n)$. If $c_{\tau j}(n)=0$, then we set $d_{\tau j}(n)/c_{\tau j}(n)=0$. If $c_{\tau j}(n) \neq 0$, then $d_{\tau j}(n)/c_{\tau j}(n)=2p_{\tau j}(n)-1$, where $p_{\tau j}(n)$ is the probability that the j-th component $r_{\tau j}(n)$ of the label $r_\tau(n)$ of $x_\tau(n)$ is +1 based on D(n) and C(n). It follows that $$2p_\tau(n)-1 = [d_{\tau 1}(n)/c_{\tau 1}(n) d_{\tau 2}(n)/c_{\tau 2}(n) \ldots d_{\tau R}(n)/c_{\tau R}(n)]' \quad (40)$$

is a representation of a probability distribution of the label $r_\tau(n)$ of $x_\tau(n)$.

An estimation means for generating this representation of a probability distribution is shown in FIG. 10: For j=1, 2, ..., R, if $c_{\tau j}(n)=0$, then set $y_{\tau j}(n)=0$, else set $y_{\tau j}(n)=d_{\tau j}(n)/c_{\tau j}(n)$. The output of the estimation means is $y_\tau(n)=[y_{\tau 1}(n) y_{\tau 2}(n) \ldots y_{\tau R}(n)]'$, which is a representation $2p_{\tau(n)}-1$ of a probability distribution of the label $r_\tau(n)$ of $x_\tau(n)$.

5.5 Conversion of Probabilities into Ternary Numbers

In a multilayer PAM, a feature vector into layer l is a ternary vector denoted by $x_t^{l-1}$, where t denotes a numbering of the feature vector or a time instant. In this subsection, two methods of converting a representation of a probability distribution, $y_\tau(n)=[y_\tau 1(n) y_\tau 2(n) \ldots y_\tau R(n)]'$, generated by a PU (processing unit) into a ternary vector are described. Recall $y_{\tau k}(n)=2p_{\tau k}(n)-1$, where $P_{\tau k}(n)$ is a probability that $r_{\tau k}(n)$ is +1. $p_\tau(n)=[p_\tau 1(n) p_\tau 2(n) \ldots p_\tau R(n)]'$ is an alternative representation of probability distribution of $p_\tau(n)$. $y_\tau(n)$ and $p_\tau(n)$ are related by $y_\tau(n)=2p_\tau(n)-I$.

FIG. 11 shows an example conversion means 13a for converting $y_\tau(n)$ into a ternary vector $x\{y_\tau(n)\}$. Every component $y_{\tau k}(n)$ of $y_\tau(n)$ is converted into a one-dimensional ternary vector (i.e., a ternary number) $x\{y_{\tau k}(n)\}$ by the following steps: For k=1, ..., R, set $y_{\tau k}(n)=2p_{\tau k}(n)-1$, and generate a pseudo-random number in accordance with the probability distribution of a random variable v: P (v=1)=$p_{\tau k}(n)$ and P (v=-1)=1-$p_{\tau k}(n)$, and set $x\{y_{\tau k}(n)\}$ equal to the resultant pseudo-random number. Assemble $x\{y_{\tau k}(n)\}$, k=1, ..., R, into a vector $x\{y_\tau(n)\}=[x\{y_{\tau 1}(n)\} x\{y_{\tau 2}(n)\} \ldots x\{y_{\tau R}(n)\}]'$. Note that this vector is a bipolar binary vector, which is a ternary vector.

FIG. 12 shows an alternative conversion means 13b for converting a representation $y_\tau(n)=2p_\tau(n)-I$ of a probability distribution into a ternary vector $x\{y_\tau(n)\}$. Assume that each component $y_{\tau k}(n)$ of $y_\tau(n)$ is to be converted into a three-dimensional ternary vector. Recall that $-1 \leq y_{\tau k}(n) \leq 1$. If $y_{\tau k}(n)$ is very close to 0, the probability $p_{\tau k}(n)$ is very close to ½ and contains little information about the label $r_{\tau k}(n)$. To eliminate it from further processing, the conversion means converts it into $x\{y_{\tau k}(n)\}=[0\ 0\ 0]$. If $y_{\tau k}(n)$ is not very close to 0, we convert it into a 3-component ternary vector $x\{y_{\tau k}(n)\}$ as shown in FIG. 12. The output $x\{y_\tau(n)\}$ of the converter is a 3R-dimensional concatenation of $x\{y_{\tau k}(n)\}$, k=1, ..., R. The method of converting a component $y_{\tau k}(n)$ of $y_\tau(n)$ into a 3-dimensional ternary vector can easily be generalized to a method of converting $y_{\tau k}(n)$ into a ternary vector of any dimensionality.

5.6 Processing Units and Supervised/Unsupervised Learning

An example PU(n) (processing unit on a feature subvector index n) is shown in FIG. 13. The PU comprises expansion means 2, estimation means 54, conversion means 13, adjustment means 9 and storage means 56. A PU has essentially two functions, retrieving an estimate of the label of a feature subvector from the memory (i.e., ECMs or GECMs) and learning a feature subvector and its label that is either provided from outside the PU (in supervised learning) or generated by itself (in unsupervised learning). In performing retrieval, a feature subvector $x_\tau(n)$ on the FSI n is first expanded into a general orthogonal expansion $\check{x}_\tau(n)$ by the expansion means 2. $\check{x}_\tau(n)$ is then processed by the estimation means, using the general expansion correlation matrices, C(n) and D(n), from the storage means 56, into a representation of a probability distribution $y_\tau(n)$ of the label of $x_\tau(n)$. The conversion means converts $y_\tau(n)$ into a ternary vector $x\{y_\tau(n)\}$, which is an output of the PU. If a representation of a probability distribution of $x_\tau(n)$ is needed for use outside the PU, $y_\tau(n)$ is also output by the PU. The dashed line in the arrow 55 indicates "output as needed." $y_\tau(n)$ and $x\{y_\tau(n)\}$ are the products of retrieval.

C(n) and D(n) model the synaptic weights in a cortex. The estimation means and conversion means constitute a processing node, which models a group of R neurons in a cortex.

Recall that a PU in a PAM has a "receptive field" in the exogenous feature vector and a "receptive field" in the measurement vector. These receptive fields can be found by tracing the feedforward connections in the PAM backforward from a feature subvector input to the PU (or the feature subvector index of the PU) to an exogenous feature vector (or the input terminals) of the PAM, and then tracing the transformation, that maps the measurement vector into the exogenous feature vector, backward from the exogenous feature vector to the measurement vector. The components of the measurement vector that can be reached by this backward tracing from a PU to the exogenous feature vector and then to the measurement vector are called the "receptive field" of the PU in the measurement vector. The components of the exogenous feature vector that can be reached by this backward tracing from a PU to the exogenous feature vector are called the "receptive field" of the PU in the exogenous feature vector. The label of a feature vector input to a PU is the label of the corresponding components of the measurement vector in the receptive field of the PU in the measurement vector. The label of the corresponding components of the exogenous feature vector in the receptive field of the PU in the exogenous feature vector is also this label If a label $r_\tau(n)$ of $x_\tau(n)$ from outside the PU is available for learning, supervised learning can be performed by the PU. In the supervised learning mode, the label $r_\tau(n)$ is received through a lever represented by a thick solid line with a solid dot in the position 48 by a general expansion correlation matrix (GECM) adjustment means 9, which receives also $\check{x}_\tau(n)$ and uses a method of adjusting ECMs such as those depicted in FIG. 5 and FIG. 6 and assembles the resultant ECMs $$C(n)=[C(n(1)) C(n(2)) \ldots C(n(U))]$$

$$D(n)=[D(n(1)) D(n(2)) \ldots D(n(U))]$$

These C(n) and D(n) are then stored, after a one-numbering delay (or a unit-time delay) 33, in the storage 56, from which they are sent to the estimation means 54. The one-numbering delay is usually a time delay that is long enough for the estimation means to finish using current C(n) and D(n) in generating and outputting $y_\tau(n)$, but short enough for getting the next C(n) and D(n) generated by the adjustment means available for the estimation means to use for processing the next orthogonal expansion or general orthogonal expansion from the expansion means.

Supervised learning means of the PU comprises adjustment means 9 for adjusting at least one GECM (general expansion correlation matrix) by receiving a GOE (general orthogonal expansion) $\check{x}_\tau(n)$ generated by expansion means 2 and a label $r_\tau(n)$ of $x_\tau(n)$ provided from outside the PAM and replacing said at least one GECM with a weighted sum of said at least one GECM and a product of said label $r_\tau(n)$ and the transpose of said GOE $\check{x}_\tau(n)$.

If a label $r_\tau(n)$ of $x_\tau(n)$ from outside the PU is unavailable, unsupervised learning can be performed by the PU. In this case, the lever (shown in position 48 in FIG. 13) should be in the position 50. The feature subvector $x_\tau(n)$ is first processed by the expansion means 2, estimation means 54, conversion means 13 as in performing retrieval described above. The resultant ternary vector $x\{y_\tau(n)\}$ is received, through the lever in position 50, and used by the adjustment means 9 as the label $r_\tau(n)$ of $x_\tau(n)$. The adjustment means 9 uses $r_\tau(n)=x\{y_\tau(n)\}$ and $\check{x}_\tau(n)$ to adjust C(n) and D(n) and store the resultant C(n) and D(n) in the storage 56 after a one-numbering delay (or a unit-time delay) 33.

It is sometimes expensive or impossible to provide labels to feature subvectors $y_\tau(n)$ especially for PUs in lower layers of a PAM. If a label $r_\tau(n)$ of $x_\tau(n)$ is not provided from outside the PU(n), unsupervised learning can be performed by the PU. In this case, the lever in position 48 should be switched to the position 50. The ternary vector $x\{y_\tau(n)\}$ generated by the conversion means in performing retrieval is received and used by the adjustment means 9 as the label $r_\tau(n)$ of $x_\tau(n)$. As in supervised learning described above, the adjustment means 9 uses $r_\tau(n)$ and $X_\tau(n)$ to adjust C(n) and D(n) and store the resultant C(n) and D(n) in the storage 56.

This unsupervised learning method is consistent with the Hebb rule of learning: The synaptic weight between two neurons is increased if the neurons fire at the same time, and the synaptic weight decreases otherwise. Nevertheless, the orthogonal expansion 2 of $x_\tau(n(u))$, the masking matrix $M(n(u))$ 11a, the conversion 13 and the estimation 54 used in this invention are new.

If a feature subvector $x_\tau(n)$ or a slightly different version of it has not been learned by PU(n), and C(n) $\check{x}_\tau(n)=0$, then $y_\tau(n)=0$ and $p_\tau(n)=(\frac{1}{2})I$, where $I=[1\ 1\ \ldots\ 1]'$. The conversion means shown in FIG. 11 converts $y_\tau(n)$ into a purely random label $r_\tau(n)=x\{y_\tau(n)\}$, with the probability that $x\{y_{\tau k}(n)\}=+1$ being equal to $\frac{1}{2}$ for k=1, 2, ..., R. Once this $x_\tau(n)$ has been learned and stored in C(n) and D(n), if $x_\tau(n)$ is input to PU(n) and to be learned without supervision for the second time, then $x\{y_\tau(n)\}=r_\tau(n)$ and one more copy of the pair $(x_\tau(n), r_\tau(n))$ is included in C(n) and D(n). Note that the conversion means 13b shown in FIG. 12 converts $y_\tau(n)=0$ into $x\{y_{\tau k}(n)\}=0$. Hence, this conversion means 13b in FIG. 12 cannot be used for unsupervised learning.

Assume a feature subvector $x_\tau(n)$ is a noise vector and is given a label in unsupervised learning by PU(n). If the noise vector is not repeatedly fed to the PU, as is usually the case, this noise vector and other noise vectors distruct themselves in C(n) and D(n).

If no learning is to be performed by the PU, the lever represented by a thick solid line with a solid dot is placed in the position 49, through which 0 is sent as the label $r_\tau(n)$ of $x_\tau(n)$ to the adjustment means, which then keeps C(n) and D(n) unchanged or stores the same C(n) and D(n) in the storage 56 after a one-numbering delay (or a unit time delay).

There are three types of PU:
1. Supervised PU. This type of PU is only capable of performing supervised learning. In a PU of this type, the position, 50, in FIG. 13 does not exist. If a label $r_\tau(n)$ of $x_\tau(n)$ from outside the PU is available and wanted for learning, the lever represented by a thick solid line with a solid dot is placed in the position 48, through which $r_\tau(n)$ is sent to the adjustment means 9. If $r_\tau(n)$ is not available or wanted for learning, the lever is placed in the position 49, through which 0 is sent to the adjustment means 9. A condition under which learning is not wanted is given below. It is understood that the "lever" is simply a symbol used here to explain which "label" to use by the adjustment means 9.
2. Unsupervised PU. This type of PU is only capable of performing unsupervised learning. In a PU of this type, the position, 48, in FIG. 13 does not exist. If unsupervised learning is wanted, then the output $x\{y_\tau(n)\}$ is used as a label $r_\tau(n)$ of $x_\tau(n)$, and the lever represented by a thick solid line with a solid dot is placed in the position 50, through which $r_\tau(n)$ is sent as to the adjustment means 9. If no learning is wanted, the lever is placed in the position 49, through which 0 is sent to the adjustment means 9. A condition under which learning is not wanted is given below. It is understood that the "lever" is simply a symbol to explain which "label" to use by the adjustment means 9.
3. Supervised/Unsupervised PU. This type of PU is capable of performing both supervised and unsupervised learning. In a PU of this type, all the three positions, 48, 49 and 50, in FIG. 13 coexist. If a label $r_\tau(n)$ of $x_\tau(n)$ from outside the PU is available and wanted for learning, the lever represented by a thick solid line with a solid dot is placed in the position 48. If a label $r_\tau(n)$ of $x_\tau(n)$ from outside the PU is unavailable, but expected to become available, and $y_\tau(n)$ generated by the PU's estimation means in its performing retrieval mode is a zero vector or sufficiently close to it by some criterion, then the lever is placed in the position 49 and no learning is performed. This avoids generating and establishing a randomly selected label in unsupervised learning, which may turn out to be difficult to "unlearn" through supervised learning. If a label $r_\tau(n)$ of $x_\tau(n)$ from outside the PU is unavailable, $y_\tau(n)$ generated by the PU's estimation means in its performing retrieval is neither a zero vector nor sufficiently close to it by some criterion, and unsupervised learning for strengthening learned the knowledge stored in the GECMs (general expansion correlation matrices) or ECMs in the PU is wanted, then the lever is placed in the position 50 and unsupervised learning is performed. A condition under which learning is not wanted is given below.

A condition under which the lever is placed in the position 49 and no learning is performed is the following: If $y_\tau(n)$ generated by a PU's estimation means in retrieving is a bipolar vector or sufficiently close to a bipolar vector by some criterion, which indicates that the input feature subvector $x_\tau(n)$ is adequately learned, then the lever is placed in the position 49 and no learning is performed. This avoids "saturating" the expansion correlation matrices with one feature subvector and its label.

It is understood that the "lever" and "lever positions" are simply a symbol used here to explain which label to use by the adjustment means 9. In application of the present invention, the "lever" and "lever positions" are implemented usually by software to select among supervised learning, unsupervised learning and no learning. Of course, hardware implementation is also possible.

Note that the learning methods for the three types of PE described above are valid for both batch learning and online learning and jointly or separately, and are suitable for semi-autonomous or autonomous learning. Note also that a PU in a PAM usually has a "receptive field" in the measurement vectors which can be found by tracing the feedforward connections in the PAM backforward from the feature subvectors input to the PU (or the feature subvector index of the PU) to the exogenous feature vectors (or the input terminals) of the PAM, and tracing the transformation, that maps the measurement vectors into exogenous feature vectors, backforward from exogenous feature vectors to measurement vectors. For supervised learning, a feature vector input to a PU is usually assigned the same label as (or is assigned a translation of) the label of the subvector of the measurement vector that appears in the receptive field of the PU. It is understood that there are other ways to assign a label to a feature subvector for supervised learning.

5.7 Learning to Recognize Rotated, Translated or Scaled Patterns

In this subsection, we describe methods for PUs (processing units) to learn to recognize rotated, translated and scaled patterns. The methods can be modified for PUs to learn to recognize trans-lated and scaled temporal patterns such as speech and music. The methods are valid for both supervised and unsupervised learning. Therefore, labels $r_t(n)$ to be referred to may be provided from outside the PAM in supervised learning or generated by the PUs in unsupervised learning for the three types of PU, supervised PUs, unsupervised PUs and supervised/unsupervised PUs described at the end of the last Subsection.

It is assumed in this subsection that feature vectors are arrays of ternary pixels. Other types of feature vector must be converted into arrays of ternary pixels for the methods to be described to apply. For example, an image with 8-bit pixels may be converted by using a pseudo-random number generator to generate a bipolar pulse train for each pixel whose average pulse rate (i.e., the rate of +1 pulse) is proportional to 8-bit light intensity of the pixel. Another way to convert an image with 8-bit pixels is to replace an 8-bit pixel with 3 bipolar 2-bit pixels placed at the same location in considering rotation, translation and scaling. After conversion, at any instant of time, the feature vector is an array of ternary pixels.

Locations of ternary pixels in an array are assumed to be dense relative to the locations of the pixels selected as components of a feature subvector $x_t(n)$ input to a PU. We identify the FSI (feature subvector index) n of a feature subvector with the locations of the pixels in $x_t(n)$. In other words, the components of n are also the numberings of the locations of the pixels included as components of $x_t(n)$.

Consider a PU with an FSI n shown in FIG. 3 and FIG. 17a. Imagine a thin rubber rectangle with small holes at the locations n of the pixels of the feature subvector with the FSI n. We translate the rectangle in some directions (e.g., 0, 15, 30, 45, ..., 330, 345 degrees) (FIG. 17b) a number of steps (e.g., 0, 1, 2, ...), rotate the rectangle clockwise and counterclockwise a number (e.g., 0, 1, 2, ...) of angles (e.g., 0, 5, 10, 15 degrees) at each translation (FIG. 17c), and expand and compress the rubber rectangle uniformly for a number of times (e.g., 0, 1, 2, ...) at each translation for some percentages (e.g., 0%, 5%, 10%, ...) (FIG'S. 17d and 17e), to obtain other feature subvector indices of the same dimensionality as n. Note that in using the rubber rectangle to determine an FSI, if a hole in the rubber rectangle contains more than one pixel in the image, the one nearest to the center of the hole is included in the FSI.

Let $\Omega(n)=\{w(i), i=1, \ldots, |\Omega(n)|\}$ be a set of FSIs $w(i)$ identified with such rotations, translations, and scalings of n including n. $\Omega(n)$ is called a rotation/translation/scaling (RTS) suite of n, and $|\Omega(n)|$ denotes the number of elements in $\Omega(n)$. Note that an RTS suite may contain only rotations, or only translations, or only scalings, or a combination thereof. (Notice the digit 0 in the parentheses (e.g., 0, 1, 2, ...) in the last paragraph. It indicates a rotation, a translation, or a scaling that is the feature subvector itself.) As a special case of $\Omega(n)$, there is only one element in the set $\Omega(n)$ that is n itself. In this special case, $|\Omega(n)|=1$.

Although $w(i)$ is a rotation, translation, or scaling of n, this dependence on n is not indicated in the symbol $w(i)$ for notational simplicity. As n is rotated, translated or scaled into $w(i)$, $n(u)$ as a subvector of n is rotated, translated or scaled into a subvector of $w(i)$. This subvector of $w(i)$ is denoted by $n(u,w(i))$. The set $\{n(u,w(i)), i=1, \ldots, |\Omega(n)|\}$ of such subvectors of $w(i)$, $i=1, \ldots, |\Omega(n)|$, is denoted by $\Omega(n(u))$ and called a rotation/translation/scaling (RTS) suite of $n(u)$. Note that $|\Omega(n(u))|=|\Omega(n)|$. The set $\{x_t(n(u,w(i))), i=1, \ldots, |\Omega(n)|\}$, which is also denoted by $\{x_t(n(u,w)), w \in \Omega(n)\}$, is called the rotation/translation/scaling (RTS) suite of $x_t(n(u))$ on $\Omega(n(u))$. In generating and summing orthogonal expansions on an RTS suite $\Omega(n(u))$, elements in the RTS suite of $x_t(n(u))$ on $\Omega(n(u))$ first go through orthogonal expansion 1. The resultant orthogonal expansions $\check{x}_t(n(u,w(i)))$ are then added up to form the sum $\tau_{w \in \Omega(n)} \check{x}_t(n(u,w))$ on the RTS suite $\Omega(n(u))$ of $n(u)$ (FIG. 18).

In both the supervised learning and unsupervied learning, the subvectors, $x_t(n(u,w))$, $w \in \Omega(n)$, on $\Omega(n(u))$ are assigned the label $r_t(n)$ of $x_t(n)$. ECMs (expansion correlation matrices), $C(n(u))$, $D(n(u))$, $A(n(u))$ and $B(n(u))$, on $\Omega(n(u))$ are defined by $$C(n(u)) = \Lambda \sum_{t=1}^{T} W_t(n(u), T) I \sum_{\omega \in \Omega(n)} \check{x}_t'(n(u, \omega)) \qquad (41)$$

$$D(n(u)) = \Lambda \sum_{t=1}^{T} W_t(n(u), T) r_t(n) \sum_{\omega \in \Omega(n)} \check{x}_t'(n(u, \omega)) \qquad (42)$$

$$A(n(u)) = \Lambda \sum_{t=1}^{T} W_t(n(u), T)(1 + r_t(n)) \sum_{\omega \in \Omega(n)} \check{x}_t'(n(u, \omega)) \qquad (43)$$

$$B(n(u)) = \Lambda \sum_{t=1}^{T} W_t(n(u), T)(1 - r_t(n)) \sum_{\omega \in \Omega(n)} \check{x}_t'(n(u, \omega)) \qquad (44)$$

Definitions of $C(n(u))$ and $D(n(u))$ are shown in FIG. 19.

$C(n(u))$ and $D(n(u))$ for the weight matrix $W_t(n(u), T)=\lambda^{T-t} I$ can be adjusted to learn a pair $(x_t, r_t(n))$, where $\lambda$ is a forgetting factor, and $\Lambda$ is a scaling constant. If $r_\tau(n) \neq 0$, $D(n(u))$ and $C(n(u))$ are replaced respectively with $\lambda D(n(u))+\Lambda r_\tau(n) \tau_{w \in \Omega(n)} \check{x}_t'(n)(u,w))$ and $\lambda C(n(u))+\Lambda \tau_{w \in \Omega(n)} \check{x}_t'(n(u,w))$, which are each a weighted sum of a ECM and $r_\tau(n) \tau_{w \in \Omega(n)} \check{x}_t'(n(u,w))$ or $\tau_{w \in \Omega(n)} \check{x}_t'(n(u,w))$. If $r_\tau(n)=0$, then $D(n(u))$ and $C(n(u))$ are unchanged. Note that $W_t(n(u), T)$ is a diagonal matrix, and $C(n(u))$ is a row vector here. This adjustment of the ECMs is shown in FIG. 20.

If $W_t(n(u), T)=I/\sqrt{T}$, the ECMs are adjusted as follows: If $r_\tau(n) \neq 0$, $D(n(u))$ and $C(n(u))$ are replaced with $(\sqrt{T}D(n(u))+\Lambda r_\tau(n)\check{x}_t'(n(u)))/\sqrt{T+1}$ and $(\sqrt{T}C(n(u))+\Lambda\check{x}_t'(n(u)))/\sqrt{T+1}$, which are each a weighted sum of a ECM and $r_\tau(n)\tau_{w\in\Omega(\eta)\check{x}_t}'(n(u,w))$ or $\Sigma_{w\in\Omega(n)}\check{x}_t'(n(u,w))$, and $\sqrt{T}$ is replaced with $\sqrt{T+1}$. If $r_\tau(n)=0$, then $D(n(u))$ and $C(n(u))$ are unchanged. Note that $W_t(n(u), T)$ is a diagonal matrix, and $C(n(u))$ is a row vector here. This adjustment of the ECMs is shown in FIG. 21.

Sums $\tau_{w\in\Omega(n)}\check{x}_t(n(u,w))$ of orthogonal expansions (OEs), and ECMs, $D(n(u))$, $C(n(u))$, $A(n(u))$, $B(n(u))$, $u=1, \ldots, U$, are respectively assembled into a general orthogonal expansion (GOE) $\check{x}_t(n)$ and general expansion correlation matrices (GECMs), $D(n)$, $C(n)$, $A(n)$, $B(n)$, for PU(n) (the PU on the feature vector n) as follows:

$$\check{x}_t'(n,\Omega)=[\Sigma_{w\in\Omega(n)}\check{x}_t'(n(1,w)) \ldots \Sigma_{w\in\Omega(n)}\check{x}_t'(n(2,w))])) \quad (45)$$

$$D(n)=[D(n(1))D(n(2)) \ldots D(n(U))] \quad (46)$$

$$C(n)=[C(n(1))C(n(2)) \ldots C(n(U))] \quad (47)$$

$$A(n)=[A(n(1))S(n(2)) \ldots A(n(U))] \quad (48)$$

$$B(n)=[B(n(1))B(n(2)) \ldots B(n(U))] \quad (49)$$

where these definitions of $\check{x}_t(n,\Omega)$, $D(n)$ and $C(n)$ are shown in FIG. 22.

How a GOE (general orthogonal expansion) $\check{x}_t(n,\Omega)$ on an RTS suite $\Omega(n)$, is generated is shown in FIG. 23.

5.8 Processing Units for Recognizing Rotated, Translated and Scaled Patterns An example PE (processing unit) that is capable of recognizing rotated, translated and scaled images of causes (e.g., objects) is given in FIG. 24. Notice that FIG. 24 is essentially the same as FIG. 13 except that the input feature subvector $x_\tau(n)$, box 2 (expansion means for generating GOEs on n) and box 9 (adjustment means for adjusting GECMs) in FIG. 13 are respectively replaced with $x_\tau$, box 18 (expansion means for generating GOEs on n and GOEs on $\Omega(n)$) and box 9 (adjustment means for adjusting GECMs on $\Omega(n)$) in FIG. 24.

The feature vector $x_\tau$ that is input to PE in FIG. 24 is first used 18 to generate the GOE (general orthogonal expansion) $\check{x}_t(n)$ defined in (7) (FIG. 8) and GOE $\check{x}_t(n,\Omega)$ on the RTS suite $\Omega(n)$ defined in (45) (FIG. 22). The GOE $\check{x}_t(n)$ is then sent to the estimation means 54, and the GOE $\check{x}_t(n,\Omega)$ on $\Omega(n)$ is sent to the adjustment means 9.

Responsible to $\check{x}_\tau(n,\Omega)$ and the label $r_\tau(n)$, which is provided from outside the PU in supervised learning or generated by the conversion means 13, the adjustment means 9 adjusts GECMs (general expansion correlation matrices) $D(n)$ and $C(n)$ on $\Omega(n)$, which are defined in (46) and (47) (FIG. 22). The adjustment is performed by replacing $D(n(u))$ with a weighted sum of $D(n(u))$ and $r_\tau(n)$ $\tau_{w\in\Omega(n)}\check{x}_t'(n(u,w))$ and replacing $C(n(u))$ with a weighted sum of $C(n(u))$ and $I\tau_{w\in\Omega(n)}\check{x}_t'(n(u,w))$. If $W_t(n(u),T)=w_t(n(u),T)$ I, all rows of $C(n(u))$ are the same and only one row is needed to represent $C(n(u))$, and $I\Sigma_{w\in\Omega(n)}\check{x}_t'(n(u,w))$ used for adjusting $C(n(u))$ can be replaced with $I\Sigma_{w\in\Omega(n)}\check{x}_t'(n(u,w))$. Two examples of the adjustment means are given in FIG. 20 and FIG. 21.

Other than the foregoing differences between the PUs in FIG. 13 and FIG. 24, these PUs' estimation means 54, conversion means 13, supervised learning means 48, 9, unsupervised learning means 49, 9, storage 56 of the GECM $[C'_{(n)} D'(n)]'$ function in much the same way.

If more capability of recognizing rotated, translated and scaled images is required of the PU, an additional RTS suite, $\Omega_1(n)$, is used. Instead of generating the GOE $\check{x}_\tau(n)$, another GOE $\check{x}_t(n,\Omega_1)$ on the RTS suite $\Omega_1(n)$ is generated and sent to the estimation means 54. In generating a representation $y_\tau(n)$ of a probability distribution, $\check{x}_t(n,\Omega_1)$ is used here in box 54. Such a PU is shown in FIG. 25.

There are also three types of PU, supervised PUs, unsupervised PUs and supervised/unsupervised PUs as discussed at the end of the Subsection on "Processing Units and Supervised/Unsupervised Learning."

5.9 Multilayer and Recurrent Networks

An embodiment of the present invention comprises at least one layer of PUs, which are discussed in the Subsection on "Processing Units and Supervised/Unsupervised Learning" and the Subsection on "Processing Units for Recognizing Rotated, Translated and Scaled Images." A typical layer, layer l, is shown in FIG. 14. A feature vector $x_\tau^0$ input to layer 1 comprises an exogenous feature vector $x_\tau^{ex}$ input to the network. In this Subsection, l is used in superscripts to emphasize dependency on layer numberings such as l-1 and l.

There are at least one PU in layer l (5 in FIG. 14). The PUs in layer l have FSIs (feature subvector indices) denoted by $1^l$, $2^l, \ldots, N^l$. Upon receiving a feature vector $x_\tau^{l-1}$ by layer l, the feature subvectors, $x_\tau^{l-1}(1^l)$, $x_\tau^{l-1}(2^l), \ldots, x_\tau^{l-1}(N^l)$, are formed and processed by the PUs (15 in FIG. 14), $PU(1^l)$, $PU(2_l), \ldots, PU(N^l)$ to generate $x\{y_\tau^l(1^l)\}, x\{y_\tau^l(2^l)\}, \ldots, x\{y_\tau^l(N^l)\}$, respectively. These ternary vectors are then assembled (42 in FIG. 14) into the output vector $x\{y_\tau^l\}$ of layer l. If needed, $y_\tau^l(1^l), y_\tau^l(2^l), \ldots, y_\tau^l(N^l)$, are also assembled and output from layer l.

If an embodiment of the present invention comprises a plurality of layers (5 in FIG. 14) with only feedforward connections and no feedback connections as shown in FIG. 15, the embodiment is called a hierarchical probabilistic associative memory (HPAM). The feature vector input to layer l=1 is the exogenous feature vector $x_\tau^{ex}$ input to the embodiment. If l>1, the components of a feature vector $x_\tau^{l-1}$ input to layer l are components of ternary vectors, $x\{y_\tau^{l-1}(1^{l-1})\}$, $x\{y_\tau^{l-1}(2^{l-1})\}, \ldots, x\{y_\tau^{l-1}(N^{l-1})\}$, generated by $PU(1^{l-1})$, $PU(2^{l-1}), \ldots, PU(N^{l-1})$ in layer l-1.

If the above embodiment further comprises feedback connections, it is called a temporal hierarchical probabilistic associative memory (THPAM). An example THPAM is shown in FIG. 16. Two types of feedback connections are shown, namely same-layer feedback connections (371, 372, 373, 374 in FIG. 16) and 1-layer feedback connections (352, 353, 354 in FIG. 16). The components of a feature vector $x_\tau^{l-1}$ input to layer l at time (or with numbering) $\tau$ comprise components of ternary vectors generated by PUs in layer l-1 and generated at a previous time (or for a feature vector with a lower numbering) by PUs in the same layer l or PUs in higher-ordered layers with layer numberings l+k for some positive integers k. Example 1: The components of the feature vector $x_\tau^2$ input to layer 3 in the example THPAM are components of $x\{y_\tau^2\}$ generated by PUs in layer 2 and components of $x\{y_{\tau-1}^4\}$ and $x\{y_{\tau-1}^3\}$, which are generated by PUs in layer 4 and layer 3 for the exogenous feature vector $x_{\tau-1}^{ex}$ input to the THPAM at time $\tau-1$. Note that the small boxes 33 enclosing 1 in FIG. 16 are delay devices. Example 2: The feature vector $x_\tau^0$ input to layer 1 comprises the exogenous feature vector $x_\tau^{ex}$ and the feedbacked ternary vectors (e.g., $x\{y_{\tau-1}^2\}$ and $x\{y_{\tau-1}^1\}$ in FIG. 16).

Once an exogenous feature vector is received by an HPAM or THPAM, the PUs perform functions of retrieving and/or learning from layer to layer starting with layer 1, the lowest-ordered layer. After the PUs in the highest-ordered layer, layer L, complete performing their functions, the HPAM or THPAM is said to have completed one round of retrievings and/or learnings (or memory adjustments).

It is understood that an HPAM may further comprises feedforward connections with delay devices, and that the delay devices in a THPAM or an HPAM may effect delays of more than one unit of time (or one numbering) or even different lengths.

5.10 Processing Units for Recognizing Extensively Translated Images

Assume that FSIs, $1^l, 2^l, \ldots, N^l$, in layer l are translations of one another, and hence so are their subvectors $1^l/(u)$, $2^l(u), \ldots, N^l(u)$, for each $u=1, \ldots, U^l$, where $U^l$ denotes the number of FSIs in layer l. Recall that the GOE (general orthogonal expansion) $\check{x}_t^{l-1}(n)$ defined in (7) (FIG. 8) and the GOE $\check{x}_t^{l-1}(n,\Omega)$ on the RTS suite $\Omega(n)$ are defined in (45) (FIG. 22). The general orthogonal expansion on $n^l$ is $$\check{x}_t^{l-1}(n^l)=[\check{x}_t^{l-1}(n^l(1))\check{x}_t^{l-1}(n^l(2))\ldots\check{x}_t^{l-1}(n^l(U))]'$$

and the general orthogonal expansion on $\Omega(n^l)$ is $$\check{x}_t^{l-1}(n^l,\Omega)=[\Sigma_{w\in\Omega(n^l)}\check{x}_t^{l-1}(n^l(1,w))\ldots\Sigma_{w\in\Omega(n^l)}\check{x}_t^{l-1}(n^l(2,w))]$$

Here, l is used in superscripts to emphasize dependency on layer l-1 or layer l.

To enable recognition of an object or cause in an image translated across the receptive field of a PAM, GECMs (general expansion correlation matrices) on all RTS suites $\Omega(n^l)$ in layer/are summed up to be used in every PU in the layer. Such sums are called common GECMs (CGECMs) on all RTS suites $\Omega(n^l)$ in layer l. More specifically, the CGECMs on all RTS suites $\Omega(n^l)$ in layer l are defined by (FIG. 26):

$$D^l = \sum_{n^l=1^l}^{N^l} D^l(n^l) \quad (50)$$

$$C^l = \sum_{n^l=1^l}^{N^l} C^l(n^l) \quad (51)$$

$$A^l = \sum_{n^l=1^l}^{N^l} A^l(n^l) \quad (52)$$

$$B^l = \sum_{n^l=1^l}^{N^l} B^l(n^l) \quad (53)$$

where $D^l(n^l)$, $C_j(n^l)$, $A^l(n^l)$, $B^l(n^l)$ are GECMs on $\Omega(n^l)$ defined in (46), (47), (48), (49), and shown in FIG. 22.

A PU (processing unit) on FSI $n^l$ that can recognize rotated, translated and scaled objects or causes and can recognize objects and causes translated across its receptive field is shown in FIG. 27. The PU is the same as that shown in FIG. 24 except that the GECMs, $D^l(n^l)$ and $C^l(n^l)$, generated by the adjustment means 9 are output from the PU, and the CGECMs, $D^l/$and $C^l$, defined in (50) and (51), are received from outside the PU and delayed for one unit of time (or one numbering) 33 before stored 56 and used by the estimation means 54.

To acquire more capability to recognize rotated, translated and scaled objects or causes in images, a GOE (general orthogonal expansion) $\check{x}_t^{l-1}(n^l,\Omega_1)$ on a RTS suite $Q_1(n^l)$, which may be different from the RTS suite $\Omega(n^l)$, is generated and used by the estimation means in PU($n^l$). Such a PU is shown in FIG. 28.

A layer of PUs mentioned above is shown in FIG. 29. The GECMs $D^l(n^l)$, $C^l(n^l)$, $A^l(n^l)$, $B^l(n^l)$ are GECMs on $\Omega(n^l)$ defined in (46), (47), (48), (49) (FIG. 22). $D^l(n^l)$ and $C^l(n^l)$, $n^l=1^l, 2^l, \ldots, N^l$, are summed up 64 to form $D^l$ and $C^l$, which are distributed to every PU($n^l$), $n^l=1^l, 2^l, \ldots, N^l$.

An example hierarchical probabilistic associative memorys (HPAMs) and an example temporal hierarchical probabilistic associative memorys (THPAMs) with PEs described above are shown in FIG. 15 and FIG. 16, respectively.

It is understood that an HPAM may further comprises feedforward connections with delay devices, and that the delay devices in a THPAM or an HPAM may effect delays of more than one unit of time (or one numbering) or even different lengths.

5.11 Pulse Trains for Each Exogenous Feature Vector

Recall that a ternary vector $x\{y_t(n)\}$ output from a processing unit, PU(n), is obtained by converting a representation $y_t(n)$ of a probability distribution of a label $r_t(n)$ of a feature subvector $x_t(n)$. If conversion means in PU(n) uses a pseudo-random number generator as shown in FIG. 11 and if some components of $y_t(n)$ are greater than $-1$ and less than 1, then the corresponding components of $x\{y_t(n)\}$ contain uncertainty, which reflects probabilistic information contained in $y_t(n)$. When a PU, say PU(n), receives a feature subvector with such components with uncertainty, it uses masking matrices or general masking matrices to suppress or "filter out" those components that make the received feature subvector inconsistent with those stored in its ECMs or GECMs in trying to find a match between the received feature subvector and feature subvectors stored in those ECMs or GECMs. (Masking matrices are described in the Subsections on "Masking Matrices.")

To give PU(n) more pseudo-random outcomes or realizations of $x\{y_t(n)\}$ to learn and find a match, it is sometimes desirable or necessary to use said conversion means to generate a sequence of ternary vectors denoted by $x\{y_t(n,j)\}$, $j=1, 2, \ldots, J$, for the same exogenous feature vector $x_t^{ex}$. This increases the chance for the estimation means in PUs using these ternary components to find a match in its ECMs or GECMs. Here J is a preselected positive integer. If all PUs in a PAM generate J ternary vectors for an exogenous feature vector $x_t^{ex}$, there are J possibly different feature subvectors input to each PU, that is not in layer 1, for the exogenous feature vector.

With the exogenous feature vector $x_t^{ex}$, labels $r_t(n)$ provided from outside the PAM, and delayed feedbacks $x\{y_{t-1}(n)\}$ held constant, each PU(n) in the PAM generates J ternary vectors $x\{y_t(n,j)\}$, $j=1, 2, \ldots, J$, during the time period between the time instances two consecutive exogenous feature vectors $x_t^{ex}$ and $x_{t+1}^{ex}$ are received by the PAM. If said time period is called 1 unit of time, each of the J ternary vectors $x\{y_t(n,j)\}$, $j=1, 2, \ldots, J$, is generated in 1/J unit of time. In $x\{y_t(n,j)\}$, $j=1, 2, \ldots, J$, the k-th components of each ternary vector in this sequence forms a ternary pulse train for $k=1, 2, \ldots, R$.

5.11.1 GECMs with Multiple/Group Adjustments on an FSI n for Each Exogenous Feature Subvector For an exogenous feature vector $x_t^{ex}$, let the J feature subvectors input to PU(n) be denoted by $x_t(n,j)$, $j=1, 2, \ldots, J$, and their GOEs (general orthogonal expansions) be denoted by $\check{x}_t(n,j)$, $j=1, 2, \ldots, J$. Note that $$\check{x}_t(n,j)=[\check{x}_t(n(1),j)\check{x}_t(n(2),j)\ldots\check{x}_t(n(U),i)]$$

By supervised learning, the GECMs, C(n) and D(n), on an FSI n adjusted for these J GOEs for each exogenous feature subvector $x_t^{ex}$, $t=1, \ldots, T$, are the following:

$$C(n) = \Lambda \sum_{t=1}^{T} W_t(n, T) I \frac{1}{J} \sum_{j=1}^{J} \check{x}'_t(n, j) \quad (54)$$

$$D(n) = \Lambda \sum_{t=1}^{T} W_t(n, T) r_t(n) \frac{1}{J} \sum_{j=1}^{J} \check{x}'_t(n, j) \quad (55)$$

where the labels $r_t(n)$ are provided from outside the PAM (FIG. 31).

There are two ways to adjust $C(n(u))$ and $D(n(u))$ in supervised learning. First, they are adjusted for each $\check{x}_t(n,j)$, and hence are adjusted J times for each exogenous feature vector $x_t^{ex}$. Second, $C(n(u))$ and $D(n(u))$ are adjusted only once, after $\check{x}_t(n,j), j=1, \ldots, J$, are all received and $$\frac{1}{J} \sum_{j=1}^{J} \check{x}_t(n, j)$$

is obtained. In the first way, $\check{x}_t(n,j), j=1, \ldots, J$, input to PU(n) have been generated with different GECMs by other PUs. In the second way, all PUs in the PAM keep their GECMs unchanged for $j=1, \ldots, J$. The first way involves multiple adjustments of GECMs, and the second one group adjustment of the same. To faciliate multiple adjustments, we need a delay device in each PU that holds the GECMs for 1/J unit of time, before sends them to the storage (FIG. 31).

A example of the second way, which involves a group adjustment is the following: If $W_t(n,T)=\lambda^{T-t}I$, the GECMs are adjusted as follows: If $r_t(n) \neq 0$, $D(n)$ and $C(n)$ are replaced respectively with $$\lambda D(n) + \Lambda r_t(n) \frac{1}{J} \sum_{j=1}^{J} \check{x}'_t(n, j)$$

and $$\lambda C(n(u)) + \Lambda \frac{1}{J} \sum_{j=1}^{J} \check{x}'_t(n, j),$$

which are each a weighted sum of a GECM and $$r_t(n) \frac{1}{J} \sum_{j=1}^{J} \check{x}'_t(n, j)$$

or $$\frac{1}{J} \sum_{j=1}^{J} \check{x}'_t(n, j).$$

If $r_t(n)=0$, then $D(n)$ and $C(n)$ are unchanged. Note that $W_t(n,T)$ is a diagonal matrix, and $C(n)$ is a row vector here. Adjustment of ECMs that are block columns of $D(n)$ and $C(n)$ is shown in FIG. 32.

Another example of the second way is the following: If $W_t(n,T)=I/\sqrt{T}$, the GECMs are adjusted as follows: If $r_t(n) \neq 0$, $D(n)$ and $C(n)$ are replaced respectively with $$\left( \sqrt{T} D(n) + \Lambda r_t(n) \frac{1}{J} \sum_{j=1}^{J} \check{x}'_t(n, j) \right) / \sqrt{T+1}$$

and $$\left( \sqrt{T} C(n) + \Lambda \frac{1}{J} \sum_{j=1}^{J} \check{x}'_t(n, j) \right) / \sqrt{T+1},$$

which are each a weighted sum of a GECM and $$r_t(n) \frac{1}{J} \sum_{j=1}^{J} \check{x}'_t(n, j)$$

or $$\frac{1}{J} \sum_{j=1}^{J} \check{x}'_t(n, j),$$

and $\sqrt{T}$ is replaced with $\sqrt{T+1}$. If $r_t(n)=0$, then $D(n(u))$ and $C(n(u))$ are unchanged and T is not replaced with T+1. Note that $W_t(n,T)$ is a diagonal matrix, and $C(n)$ is a row vector here. Note here that $$\frac{1}{J}$$

above is an example weight, which can be replaced by a weight more suitable for an application.

In unsupervised learning by PU(n), the $y_t(nX)$ that is closest to a bipolar vector among $y_t(n,j), j=1, 2, \ldots, J$, is first determined with respect to a certain criterion, and the corresponding $x\{y_t(n,j_t^*)\}$ is used as the label of its GOE $\check{x}_t(n, j_t^*)$ to adjust $C(n)$ and $D(n)$, which are defined as follows (FIG. 33):

$$C(n) = \Lambda \sum_{t=1}^{T} W_t(n, T) I \check{x}'_t(n, j_t^*) \quad (56)$$

$$D(n) = \Lambda \sum_{t=1}^{T} W_t(n, T) x\{y_t(n, j_t^*)\} \check{x}'_t(n, j_t^*) \quad (57)$$

where an example of said certain criterion is the following:

$$j_t^* = \arg \min_{j \in \{1, \ldots, J\}} \sum_{k=1}^{R} p_{tk}(n, j)(1 - p_{tk}(n, j)) \quad (58)$$

For example, if $W_t(n,T)=\lambda^{T-t}I$, the GECMs are adjusted as follows (FIG. 34): Receiving $x_t(n,j), j=1, \ldots, J$, PU(n)

generates the probabilities $p_{tk}(n,j)$, $k=1, \ldots, K$, $j=1, \ldots, J$, first. Then $j_t^*$ is determined by (58) or another criterion. $D(n)$ and $C(n)$ are replaced respectively with $\lambda D(n)+\Lambda x\{y_t(n,j_t^*)\}\check{x}_t'(n,j_t^*)$ and $\lambda C(n(u))+\Lambda \check{x}_t'(n,j_t^*)$, which are each a weighted sum of a GECM and $x\{y_t(n,j_t^*)\}\check{x}_t'(n,j_t^*)$ or $\check{x}_t'(n, j_t^*)$. Note that $W_t(n,T)$ is a diagonal matrix, and $C(n)$ is a row vector here.

If $W_t(n,T)=I/\sqrt{T}$, the GECMs are adjusted as follows: If $r_t(n)\neq 0$, $D(n)$ and $C(n)$ are replaced respectively with $(\sqrt{T}D(n)+\Lambda x\{y_t(n,j_t^*)\}\check{x}t'(n,j_t^*))/\sqrt{T+1}$ and $(\sqrt{T}C(n(u))+\Lambda\check{x}_t'(n,j_t^*))/\sqrt{T+1}$, which are each a weighted sum of a GECM and $x\{y_t(n,j_t^*)\}\check{x}_t'(n,j'^*)$ or $\check{x}_t'(n,j_t^*)$, and $\sqrt{T}$ is replaced with $\sqrt{T+1}$. Note that $W_t(n,T)$ is a diagonal matrix, and $C(n)$ is a row vector here.

5.11.2 GECMs on an RTS Suite $\Omega(n)$ with Group/Multiple Adjustments for One Exogenous Feature Subvector For an exogenous feature vector $x_t^{ex}$, let the J GOEs (general orthogonal expansions) on an RTS suite $\Omega(n)$, that are generated in PU(n), be denoted by $x_t(n,\Omega,j)$, $j=1, 2, \ldots, J$. By supervised learning, the GECMs, $C(n)$ and $D(n)$, on an RTS suite $\Omega(n)$ adjusted for these J GOEs for each exogenous feature subvector $x_t^{ex}$, $t=1, T$, are the following (FIG. 35):

$$C(n) = \Lambda \sum_{t=1}^{T} W_t(n, T) I \frac{1}{J} \sum_{j=1}^{J} \check{x}_t'(n, \Omega, j) \tag{59}$$

$$D(n) = \Lambda \sum_{t=1}^{T} W_t(n, T) r_t(n) \frac{1}{J} \sum_{j=1}^{J} \check{x}_t'(n, \Omega, j) \tag{60}$$

where $r_t(n)\neq 0$. Note that in supervised learning, the label $r_t(n)$ is provided from outside the PAM. $C(n)$ and $D(n)$ can be adjusted by multiple adjustments or a group adjustment as GECMs on an FSI n can be. Two examples for a group adjustment are given below.

For example, if $W_t(n,T)=\lambda^{T-t}I$, the GECMs are adjusted as follows (FIG. 36): If $r_t(n)\neq 0$, $D(n)$ and $C(n)$ are replaced respectively with $$\lambda D(n) + \Lambda r_t(n) \frac{1}{J} \sum_{j=1}^{J} \check{x}_t'(n, \Omega, j)$$

and $$\lambda C(n(u)) + \Lambda \frac{1}{J} \sum_{j=1}^{J} \check{x}_t'(n, \Omega, j),$$

which are each a weighted sum of a GECM and $$r_t(n) \frac{1}{J} \sum_{j=1}^{J} \check{x}_t'(n, \Omega, j)$$

or $$\frac{1}{J} \sum_{j=1}^{J} \check{x}_t'(n, \Omega, j).$$

If $r_t(n)=0$, then $D(n(u))$ and $C(n(u))$ are unchanged. Note that $W_t(n,T)$ is a diagonal matrix, and $C(n)$ is a row vector here.

If $W_t(n,T)=I/\sqrt{T}$, the GECMs are adjusted as follows: If $r_t(n)\neq 0$, $D(n)$ and $C(n)$ are replaced respectively with $$\left(\sqrt{T}D(n) + \Lambda r_t(n) \frac{1}{J} \sum_{j=1}^{J} \check{x}_t'(n, \Omega, j)\right) / \sqrt{T+1}$$

and $$\left(\sqrt{T}C(n) + \Lambda \frac{1}{J} \sum_{j=1}^{J} \check{x}_t'(n, \Omega, j)\right) / \sqrt{T+1},$$

which are each a weighted sum of a GECM and $$r_t(n) \frac{1}{J} \sum_{j=1}^{J} \check{x}_t'(n, \Omega, j)$$

or $$\frac{1}{J} \sum_{j=1}^{J} \check{x}_t'(n, \Omega, j),$$

and $\sqrt{T}$ is replaced with $\sqrt{T+1}$. If $r_t(n)=0$, then $D(n(u))$ and $C(n(u))$ are unchanged and the numbering T is not incremented by 1. Note that $W_t(n,T)$ is a diagonal matrix, and $C(n)$ is a row vector here. Note here that $$\frac{1}{J}$$

above is an example weight, which can be replaced by a weight more suitable for an application.

By unsupervised learning, the GECMs, $C(n)$ and $D(n)$, on an RTS suite $\Omega(n)$ with multiple adjustments for each exogenous feature subvector $x_t^{ex}$, $t=1, \ldots, T$, are the following (FIG. 37):

$$C(n) = \Lambda \sum_{t=1}^{T} W_t(n, T) I \check{x}_t'(n, \Omega, j_t^*) \tag{61}$$

$$D(n) = \Lambda \sum_{t=1}^{T} W_t(n, T) x\{y_t(n, j_t^*)\}\check{x}_t'(n, \Omega, j_t^*) \tag{62}$$

where $y_t(n, j_t^*)$ is closest to a bipolar vector among $y_t(n,j)$, $j=1, 2, \ldots, J$ with respect to a certain criterion, say, $$j_t^* = \underset{j}{\operatorname{argmin}} \sum_{k=1}^{R} p_{tk}(n, j)(1 - p_{tk}(n, j))$$

For example, if $W_t(n,T)=\lambda^{T-t}I$, the GECMs are adjusted without supervision as follows: If $r_t(n)\neq 0$, $D(n)$ and $C(n)$ are replaced respectively with $\lambda D(n)+\lambda x\{y_t(n,j_t^*)\}\check{x}_t'(n,\Omega,j_t^*)$ and $\lambda C(n(u))+\lambda \check{x}_t'(n,\Omega,j_t^*)$, which are each a weighted sum of a GECM and $x\{y_t(n,j^*)\}\check{x}_t'(n,\Omega,j_t^*)$ or $\check{x}_t'(n,\Omega,j_t^*)$. If $r_t(n)=0$, then $D(n)$ and $C(n)$ are unchanged. Note that $W_t(n,T)$ is a diagonal matrix, and $C(n)$ is a row vector here. This example is shown in FIG. 38.

If $W_t(n,T)=I/\sqrt{T}$, the GECMs are adjusted without supervision as follows: If $r_t(n)\neq 0$, $D(n)$ and $C(n)$ are replaced respectively with $(\sqrt{T}D(n)+\Lambda x\{y_t(n,j_t^*)\}\check{x}_t'(n,\Omega,j_t^*))/\sqrt{T+1}$ and $(\sqrt{T}C(n(u))+\Lambda\check{x}_t'(n,\Omega,j_t^*))/\sqrt{T+1}$, which are each a weighted sum of a GECM and $x\{y_t(n,j_t^*)\}\check{x}_t'(n,\Omega,j_t^*)$ or $\check{x}_t'(n,\Omega,j_t^*)$, and $\sqrt{T}$ is replaced with $\sqrt{T+1}$. If $r_t(n)=0$, then $D(n)$ and $C(n)$ are unchanged, and T is not increment by 1. Note that $W_t(n,T)$ is a diagonal matrix, and $C(n)$ is a row vector here.

The adjustment of GECMs, $C(n)$ and $D(n)$, on an RTS suite $\Omega(n)$ described above is performed by adjustment means 9 as shown in FIG. 24 and FIG. 25.

The above descriptions and formulas can be easily extended to CGECMs (common general expansion correlation matrices) defined in FIG. 26. To avoid making this description too long, the descriptions and formulas for CGECMs will not be given here. Those skilled in the art should have no difficulty with the extension.

5.12 Combination of Probability Distributions

Let $m_1, m_2, \ldots, m_n$ be FSIs (feature subvector indices), which may come from a single layer or from different layers of PUs, but the labels, $r_\tau(m_1), r_\tau(m_2), \ldots, r_\tau(m_n)$, of the feature vectors, $x_\tau(m_1), x_\tau(m_2), \ldots, x_\tau(m_n)$, on these FSIs are equal. Recall that $p_{\tau k}(n)$ denotes the probability that the k-th component $r_{\tau k}$ of the label $r_T$ of $x_\tau(n)$ is equal to 1, and that $p_{\tau k}(n)=(y_{\tau k}(n)+1)/2$, where $y_{\tau k}(n)$ is generated by the estimation means in the PU on n.

In this subsection, we show how to combine the probabilities, $p_{\tau k}(m_i)$, $i=1, 2, \ldots, j$, into an estimate $\hat{P}_{\tau k}$ of $P_{\tau k}=P(r_{\tau k}=1|d_{\tau k}, c_{\tau k})$ for each $k=1, 2, \ldots, R$, where $P(r_{\tau k}=1|d_{\tau k}, c_{\tau k})$ is the conditional probability that $r_{\tau k}=1$ given $d_{\tau k}$ and $c_{\tau k}$. For simplicity, it is assumed that $c_{\tau k}(m_i)\neq 0$, $i=1, 2, \ldots, j$. Let an estimate of the covariance $V_k$ of $p_{\tau k}=[p_{\tau k}(m_1)\ p_{\tau 2}(m_2)\ \ldots\ p_{\tau k}(m_j)]'$ be denoted by $\hat{V}_k$, which is a j×j matrix. By the weighted least squares method, if $\hat{V}_k$ is invertible, an estimate $\hat{P}_{\tau k}$ of $P(r_{\tau k}=1|d_{\tau k}, c_{\tau k})$ is:

$$\hat{P}_{\tau k} = (I'\hat{V}_k^{-1}I)^{-1}I'\hat{V}_k^{-1}p_{\tau k} \quad (63)$$

where $I:=[1\ \ldots\ 1]'$. This is an unbiased estimate of $P(r_{\tau k}=1|d_{\tau k}, c_{\tau k})$ with the following error variance:

$$s_k^2 = (I'\hat{V}_k^{-1}I)^{-1} \quad (64)$$

If $\hat{V}_k$ is not invertible, a method of treating multicolinearity can be applied. For example, $\hat{V}_k$ may be replaced with $\hat{V}_k+\sigma I$ in (63) and (64) for a small $\sigma$.

The formulas, (63) and (64), are derived under the assumption that $c_{\tau k}(m_i)\neq 0$, $i=1, 2, \ldots, n$. If $c_{\tau k}(m_i)=0$, the feature subvector of $X_T$ with the feature subvector index $m_i$ should be excluded in the determination of $\hat{P}_{\tau k}$ and $s_k^2$. For simplicity, if $c_{\tau k}(m_i)=0$, we set $p_{\tau k}(m_i)=1/2$ and $\hat{V}_{kii}=\hat{V}_{kij}=\hat{V}_{kji}=1000n$ for $j\neq i$, in (63) and (64) to virtually achieve the exclusion of $x_\tau(m_i)$.

A simple way to find an estimate $\hat{V}_k$ is the following: Assume that the off-diagonal entries of $\hat{V}_k$ to be zero, i.e., the i×j-th entry $\hat{V}_{kij}$ of $\hat{V}_k$ is equal to 0 for $i\neq j$. Under this assumption, the weighted least squares estimate of $P_{\tau k}$ and its estimation error variance are easily determined, respectively, by $$\hat{P}_{\tau k} = \left(\sum_{i=1}^{\eta} \hat{V}_{kii}^{-1}\right)^{-1} \sum_{i=1}^{\eta} \hat{V}_{kii}^{-1} p_{\tau k}(m_i) \quad (65)$$

$$s_k^2 = \left(\sum_{i=1}^{\eta} \hat{V}_{kii}^{-1}\right)^{-1} \quad (66)$$

where $\hat{V}_{kii}=p_{\tau k}(m_i)(1-p_{\tau k}(m_i))$, and if $p_{\tau k}(m_i)=a_{\tau k}(m_i)/c_{\tau k}(m_i)>1-\varrho$ or $<\varrho$ for some small positive number $\varrho$, we set $\hat{V}_{kii}=\varrho(1-\varrho)$. Here $\varrho$ is usually set equal to 0.05. If $c_{\tau k}(m_i)=0$, we set $p_{\tau k}(m_i)=1/2$ and $\hat{V}_{kii}=1000n$ in the above two formulas.

A pseudo-program for combining probabilities using is shown in FIG. 30.

A point estimate $\hat{r}_{\tau k}$ of $r_{\tau k}$ is obtained by setting $$\hat{r}_{\tau k} = \operatorname{sgn}\left(\hat{P}_{\tau k} - \frac{1}{2}\right) \quad (67)$$

where sgn is the sign function defined by $\operatorname{sgn}(x)=-1$ for $x<0$; $\operatorname{sgn}(x)=0$ for $x=0$; and $\operatorname{sgn}(x)=1$ for $x>0$.

CONCLUSION, RAMIFICATION, AND SCOPE OF INVENTION

Many embodiments of the present invention are disclosed, which can achieve the objectives listed in the "SUMMARY" of this invention disclosure. While our descriptions hereinabove contain many specificities, these should not be construed as limitations on the scope of the invention, but rather as an exemplification of preferred embodiments. In addition to these embodiments, those skilled in the art will recognize that other embodiments are possible within the teachings of the present invention. Accordingly, the scope of the present invention should be limited only by the appended claims and their appropriately construed legal equivalents.

What is claimed is:

1. A learning machine for processing exogenous feature vectors to recognize patterns, each exogenous feature vector being a feature vector input to said learning machine, said learning machine comprising at least one processing unit that comprises
    (a) expansion means for generating, in response to a first feature vector input to said processing unit, a first orthogonal expansion of a subvector of said first feature vector, said first orthogonal expansion comprising components of said subvector of said first feature vector and a plurality of products of said components of said subvector of said first feature vector;
    (b) at least one first expansion correlation matrix that is a weighted sum of outer products, each being an outer product of a linear combination of a vector with components all equal to 1 and a label of a second feature vector input to said processing unit and a second orthogonal expansion of a subvector of said second feature vector, said second orthogonal expansion comprising components of said subvector of said second feature vector and a plurality of products of said components of said subvector of said second feature vector; and (c) estimation means for using at least said at least one first expansion correlation matrix and at least one third orthogonal expansion of a subvector of a third feature vector input to said processing unit, said third orthogonal expansion being generated by said expansion means in response to said third feature vector, to compute a representation of a probability distribution of a label of said third feature vector.

2. The learning machine defined in claim 1, said processing unit further comprising at least one masking matrix that is a sum of an identity matrix and at least one summand masking matrix multiplied by a weight, said summand masking matrix setting certain components of a fourth orthogonal expansion of a subvector of a fourth feature vector input to said processing unit equal to zero, as said masking matrix is multiplied to said fourth orthogonal expansion, said fourth orthogonal expansion comprising components of said subvector of said fourth feature vector and a plurality of products of said components of said subvector of said fourth feature vector, wherein said estimation means also uses said at least one masking matrix in computing a representation of a probability distribution of a label of said third feature vector.

3. The learning machine defined in claim 1, wherein said linear combination is said vector with components all equal to 1.

4. The learning machine defined in claim 1, wherein said linear combination is said label of said second feature vector.

5. The learning machine defined in claim 1, wherein said linear combination is a sum of said label of said second feature vector and said vector with components all equal to 1.

6. The learning machine defined in claim 1, wherein weights in said weighted sum of outer products are equal.

7. The learning machine defined in claim 1, said processing unit further comprising at least one expansion correlation matrix that is a sum of said first expansion correlation matrices for subvectors in a rotation/translation/scaling suite of a feature subvector index.

8. The learning machine defined in claim 1, said processing unit further comprising supervised learning means for adjusting, in response to a fifth feature vector input to said processing unit, said at least one first expansion correlation matrix by using at least an outer product of a linear combination of a vector with components all equal to 1 and a label of said fifth feature vector input to said processing unit and a fifth orthogonal expansion of a subvector of said fifth feature vector, said fifth orthogonal expansion comprising components of said subvector of said fifth feature vector and a plurality of products of said components of said subvector of said fifth feature vector, wherein said label of said fifth feature vector is provided from outside said learning machine.

9. The learning machine defined in claim 1, said processing unit further comprising conversion means for converting said representation of said probability distribution produced by said estimation means into a vector being output from said processing unit as a label of said third feature vector.

10. The learning machine defined in claim 1, said processing unit further comprising a pseudo-random vector generating means for generating a pseudo-random vector in accordance with said probability distribution produced by said estimation means, said pseudo-random vector being output from said processing unit as a label of said third feature vector.

11. The learning machine defined in claim 10, said processing unit further comprising unsupervised learning means for adjusting, in response to a sixth feature vector input to said processing unit, said at least one first expansion correlation matrix by using at least one outer product of a linear combination of a vector with components all equal to 1 and a label of said sixth feature vector and a sixth orthogonal expansion of a subvector of said sixth feature vector, said sixth orthogonal expansion comprising components of said subvector of said sixth feature vector and a plurality of products of said components of said subvector of said sixth feature vector, wherein said label of said sixth feature vector is a pseudo-random vector generated by said pseudo-random vector generating means as a label of said sixth feature vector.

12. The learning machine defined in claim 10, wherein a plurality of components of a pseudo-random vector that is output from a processing unit are components of a feature vector that is input to another processing unit.

13. The learning machine defined in claim 10 for processing exogenous feature vectors in sequences of exogenous feature vectors, wherein a plurality of components of a pseudo-random vector that is output from a processing unit in processing a certain exogenous feature vector in a sequence of exogenous feature vectors are included as components, after a time delay, in a feature vector that is input to a processing unit in processing an exogenous feature vector subsequent to said certain exogenous feature vector in said sequence.

14. A system for processing exogenous feature vectors to recognize patterns, each exogenous feature vector being a feature vector input to said system, said system comprising a plurality of processing units, each processing unit comprising (d) expansion means for generating, in response to a first feature vector input to said processing unit, a first orthogonal expansion of a subvector of said first feature vector, said first orthogonal expansion comprising components of said subvector of said first feature vector and a plurality of products of said components of said subvector of said first feature vector;

(e) at least one first expansion correlation matrix that is a weighted sum of outer products, each being an outer product of a weighted sum of a vector with components all equal to 1 and a label of a second feature vector input to said processing unit and a second orthogonal expansion of a subvector of said second feature vector, said second orthogonal expansion comprising components of said subvector of said second feature vector and a plurality of products of said components of said subvector of said second feature vector; and (f) estimation means for using at least said at least one first expansion correlation matrix and at least one third orthogonal expansion of a subvector of a third feature vector input to said processing unit, said third orthogonal expansion being generated by said expansion means in response to said third feature vector, to compute a representation of a probability distribution of a label of said third feature vector.

15. The system defined in claim 14, said processing unit further comprising at least one masking matrix that is a sum of an identity matrix and at least one summand masking matrix multiplied by a weight, said summand masking matrix setting certain components of a fourth orthogonal expansion of a subvector of a fourth feature vector input to said processing unit equal to zero, as said masking matrix is multiplied to said fourth orthogonal expansion, said fourth orthogonal expansion comprising components of said subvector of said fourth feature vector and a plurality of products of said components of said subvector of said fourth feature vector.

16. The system defined in claim 15, wherein said weighted sum of a vector with components all equal to 1 and a label of a second feature vector input to said processing unit is said label of a second feature vector.

17. The system defined in claim 15, wherein said weighted sum of a vector with components all equal to 1 and a label of a second feature vector input to said processing unit is a vector with components all equal to 1.

18. The system defined in claim 15, wherein said weighted sum of a vector with components all equal to 1 and a label of a second feature vector input to said processing unit is a sum of said label of said second feature vector and a vector with components all equal to 1.

19. The system defined in claim 15, wherein weights in said weighted sum of outer products are equal.

20. The system defined in claim 15, said processing unit further comprising at least one expansion correlation matrix that is a sum of said first expansion correlation matrices for subvectors in a rotation/translation/scaling suite of a feature subvector index.

21. The system defined in claim 15, wherein, in said processing unit, a plurality of said first expansion correlation matrices are submatrices of a general expansion correlation matrix, a plurality of said masking matrices are submatrices of a general masking matrix, and a plurality of orthogonal expansions generated by said expansion means are subvectors of a general orthogonal expansion.

22. The system defined in claim 15, further comprising combination means for combining a plurality of representations of probability distributions of a common label of feature vectors input to at least one processing unit into a representation of a probability distribution of said common label.

23. The system defined in claim 15, said processing unit further comprising supervised learning means for adjusting, in response to a fifth feature vector input to said processing unit, said at least one first expansion correlation matrix by using at least one outer product of a weighted sum of a vector with components all equal to 1 and a label of said fifth feature vector and a fifth orthogonal expansion of a subvector of said fifth feature vector, said fifth orthogonal expansion comprising components of said subvector of said fifth feature vector and a plurality of products of said components of said subvector of said fifth feature vector, wherein said label of said fifth feature vector is provided from outside said system.

24. The system defined in claim 15, said processing unit further comprising conversion means for converting said representation of said probability distribution produced by said estimation means into a vector being output from said processing unit as a label of said third feature vector.

25. The system defined in claim 15, said processing unit further comprises a pseudorandom vector generating means for generating a pseudo-random vector in accordance with said probability distribution produced by said estimation means, said pseudorandom vector being output from said processing unit as a label of said third feature vector.

26. The system defined in claim 25, said processing unit further comprising unsupervised learning means for adjusting, in response to a sixth feature vector input to said processing unit, said at least one first expansion correlation matrix by using at least one outer product of a weighted sum of a vector with components all equal to 1 and a label of said sixth vector and a sixth orthogonal expansion of a subvector of said sixth feature vector, said sixth orthogonal expansion comprising components of said subvector of said sixth feature vector and a plurality of products of said components of said subvector of said sixth feature vector, wherein said label of said sixth feature vector is a pseudo-random vector generated by said pseudo-random vector generating means as a label of said sixth feature vector.

27. The system defined in claim 25, wherein a plurality of said at least one processing unit form a network with a plurality of ordered layers of said processing units; each exogenous feature vector is input to layer 1 of said network, which is the lowest-ordered layer of said network; and components of a feature vector input to a processing unit in layer l of said network, where l>1, are components of at least one label that is output from at least one processing unit in layer l-1 of said network.

28. The system defined in claim 27 for processing exogenous feature vectors in sequences of exogenous feature vectors, wherein at least one component of a label that is output from a processing unit in layer j in processing a certain exogenous feature vector in a sequence is included as a component, after a time delay, in a feature vector that is input to a processing unit in layer k, where k≦j, in processing an exogenous feature vector subsequent to said certain exogenous feature vector in said sequence.

29. A method for processing feature vectors, said method comprising:
   (g) an expanding step of expanding a subvector of a first feature vector into a first orthogonal expansion that comprises components of said subvector of said first feature vector and a plurality of products of said components of said subvector of said first feature vector, and
   (h) an estimating step of using
      i. at least one orthogonal expansion of a subvector of said first feature vector produced by said expanding step; and
      ii. at least one expansion correlation matrix that is a weighted sum of outer products, each being an outer product of a weighted sum of a vector with components all equal to 1 and a label of a second feature vector and a second orthogonal expansion of a subvector of said second feature vector, said second orthogonal expansion comprising components of said subvector of said second feature vector and a plurality of products of said components of said subvector of said second feature vector;
   to compute a representation of a probability distribution of a label of said first feature vector.

30. The method defined in claim 29, wherein said estimating step also uses at least one masking matrix that is a sum of an identity matrix and at least one summand masking matrix multiplied by a weight, said summand masking matrix setting certain components of a third orthogonal expansion of a subvector of a third feature vector equal to zero, as said masking matrix is multiplied to said third orthogonal expansion, to compute a representation of a probability distribution of a label of said first feature vector, said third orthgonal expansion comprising components of said subvector of said third feature vector and a plurality of products of said components of said subvector of said third feature vector.

31. The method defined in claim 29, wherein said weighted sum of a vector with components all equal to 1 and a label of a second feature vector is said label of said second feature vector.

32. The method defined in claim 29, wherein said weighted sum of a vector with components all equal to 1 and a label of a second feature vector is said vector with components all equal to 1.

33. The method defined in claim 29, wherein said weighted sum of a vector with components all equal to 1 and a label of a second feature vector is a sum of said vector with components all equal to 1 and said label of said second feature vector.

34. The method defined in claim 29, wherein weights in said weighted sum of outer products are equal.

35. The method of claim 29, further comprising a generating step of generating a pseudo-random vector as a label of said first feature vector in accordance with said probability distribution.

36. The method of claim 35, further comprising a feedforward step of including a plurality of components of a pseudorandom vector generated by said generating step as a label of said first feature vector as components in a fourth feature vector and processing said fourth feature vector by said expanding step and said estimating step.

37. The method of claim 35, further comprising a feedback step of including, after a time delay, a plurality of components of a pseudorandom vector generated by said generating step as a label of said first feature vector as components in a fifth feature vector and processing said fifth feature vector by said expanding step and said estimating step.

38. The method of claim 35, further comprising an unsupervised learning step of adjusting said expansion correlation matrix by using at least one outer product of a weighted sum of a vector with components all equal to 1 and a label of a sixth feature vector and an orthogonal expansion of a subvector of said sixth feature vector produced by said expanding step, wherein said label of said sixth feature vector is a pseudo-random vector generated by said generating step as a label of said sixth feature vector.

39. The method of claim 29, further comprising a supervised learning step of adjusting said expansion correlation matrix by using at least an outer product of a weighted sum of a vector with components all equal to 1 and a label of a seventh feature vector and an orthogonal expansion of a subvector of said seventh feature vector produced by said expanding step, wherein said label of said seventh feature vector is provided.

* * * * *